United States Patent
Saito et al.

(10) Patent No.: US 8,469,504 B2
(45) Date of Patent: Jun. 25, 2013

(54) INK SET, INK JET RECORDING METHOD AND INK JET RECORDING APPARATUS

(75) Inventors: Takashi Saito, Kawasaki (JP); Katsuhiro Shirota, Kawasaki (JP); Hirofumi Ichinose, Tokyo (JP); Hiromitsu Kishi, Kawasaki (JP); Masashi Tsujimura, Kawasaki (JP); Fumihiko Mukae, Tokyo (JP); Fumiaki Fujioka, Kawasaki (JP); Katsuhiko Suzuki, Tokyo (JP); Sayoko Nagashima, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 478 days.

(21) Appl. No.: 12/512,481

(22) Filed: Jul. 30, 2009

(65) Prior Publication Data

US 2010/0033522 A1  Feb. 11, 2010

(30) Foreign Application Priority Data

Aug. 8, 2008  (JP) ................................ 2008-205649

(51) Int. Cl.
*B41J 2/01* (2006.01)

(52) U.S. Cl.
USPC ............................... 347/100; 347/95; 347/96

(58) Field of Classification Search
USPC .............. 347/100, 95, 96, 101, 102, 105, 88, 347/99; 523/160, 161; 106/31.6, 31.13, 31.27
See application file for complete search history.

(56) References Cited

U.S. PATENT DOCUMENTS

| 4,723,129 A | 2/1988 | Endo et al. ..................... 346/1.1 |
| 4,740,796 A | 4/1988 | Endo et al. ..................... 346/1.1 |
| 4,804,411 A | 2/1989 | Eida et al. ........................ 106/22 |
| 4,864,324 A | 9/1989 | Shirota et al. .................. 346/1.1 |
| 5,059,246 A | 10/1991 | Yamamoto et al. ............. 106/22 |
| 5,074,914 A | 12/1991 | Shirota et al. ................... 106/22 |
| 5,110,356 A | 5/1992 | Shirota et al. ................... 106/22 |
| 5,118,351 A | 6/1992 | Shirota et al. ................... 106/22 |
| 5,123,960 A | 6/1992 | Shirota et al. ................... 106/22 |
| 5,135,570 A | 8/1992 | Eida et al. ........................ 106/22 |
| 5,135,571 A | 8/1992 | Shirota et al. ................... 106/22 |

(Continued)

FOREIGN PATENT DOCUMENTS

| JP | 06-306317 | 11/1994 |
| JP | 2000-108495 | 4/2000 |

(Continued)

OTHER PUBLICATIONS

D.W. Van Krevelen, Properties of Polymers, 1976, pp. 141-155.

*Primary Examiner* — Manish S Shah
(74) *Attorney, Agent, or Firm* — Fitzpatrick, Cella, Harper & Scinto

(57) ABSTRACT

An object of the invention is to provide an ink set which enables to improve image density and scratch resistance of the images recorded using an ink containing a self-dispersion pigment and an ink containing a modified siloxane compound. An ink set to be used for ink jet recording including plural inks having a first ink and a second ink independently, wherein the first ink contains at least a pigment having functional groups on surface of pigment particles and a compound having adsorptivity to the pigment and the functional group density on the surface of the pigment particles is 1.5 µmol/m$^2$ or more and less than 2.6 µmol/m$^2$ and the second ink contains at least a pigment and a modified siloxane compound.

12 Claims, 7 Drawing Sheets

U.S. PATENT DOCUMENTS

| | | | | |
|---|---|---|---|---|
| 5,139,573 A | 8/1992 | Yamamoto et al. | | 106/22 |
| 5,141,558 A | 8/1992 | Shirota et al. | | 106/22 |
| 5,151,128 A | 9/1992 | Fukushima et al. | | 106/20 |
| 5,190,581 A | 3/1993 | Fukushima et al. | | 106/20 D |
| 5,216,437 A | 6/1993 | Yamamoto et al. | | 346/1.1 |
| 5,220,347 A | 6/1993 | Fukushima et al. | | 346/1.1 |
| 5,221,333 A | 6/1993 | Shirota et al. | | 106/20 D |
| 5,231,417 A | 7/1993 | Shirota et al. | | 346/1.1 |
| 5,248,991 A | 9/1993 | Shirota et al. | | 346/1.1 |
| 5,250,121 A | 10/1993 | Yamamoto et al. | | 106/22 R |
| 5,254,157 A | 10/1993 | Koike et al. | | 106/20 D |
| 5,258,066 A | 11/1993 | Kobayashi et al. | | 106/22 R |
| 5,296,022 A | 3/1994 | Kobayashi et al. | | 106/20 D |
| 5,329,305 A | 7/1994 | Fukushima et al. | | 347/95 |
| 5,358,558 A | 10/1994 | Yamamoto et al. | | 106/22 R |
| 5,427,611 A | 6/1995 | Shirota et al. | | 106/22 A |
| 5,500,023 A | 3/1996 | Koike et al. | | 8/499 |
| 5,515,093 A | 5/1996 | Haruta et al. | | 347/101 |
| 5,540,764 A | 7/1996 | Haruta et al. | | 106/20 R |
| 5,593,757 A | 1/1997 | Kashiwazaki et al. | | 428/195 |
| 5,606,356 A | 2/1997 | Noguchi et al. | | 347/100 |
| 5,614,007 A | 3/1997 | Kurabayashi et al. | | 106/22 R |
| 5,621,447 A | 4/1997 | Takizawa et al. | | 347/88 |
| 5,640,187 A | 6/1997 | Kashiwazaki et al. | | 347/101 |
| 5,656,071 A * | 8/1997 | Kappele et al. | | 347/100 |
| 5,658,376 A | 8/1997 | Noguchi et al. | | 106/31.43 |
| 5,680,165 A | 10/1997 | Takizawa et al. | | 347/88 |
| 5,696,182 A | 12/1997 | Kashiwazaki et al. | | 523/161 |
| 5,698,478 A | 12/1997 | Yamamoto et al. | | 442/153 |
| 5,700,314 A | 12/1997 | Kurbayashi et al. | | 106/31.27 |
| 5,734,403 A | 3/1998 | Suga et al. | | 347/101 |
| 5,764,261 A | 6/1998 | Koike et al. | | 347/100 |
| 5,781,216 A | 7/1998 | Haruta et al. | | 347/106 |
| 5,782,967 A | 7/1998 | Shirota et al. | | 106/31.58 |
| 5,792,249 A | 8/1998 | Shirota et al. | | 106/31.27 |
| 5,804,099 A * | 9/1998 | Heilen et al. | | 106/287.13 |
| 5,900,899 A * | 5/1999 | Ichizawa et al. | | 347/100 |
| 5,902,387 A | 5/1999 | Suzuki et al. | | 106/22 R |
| 5,922,625 A | 7/1999 | Haruta et al. | | 442/75 |
| 6,036,307 A | 3/2000 | Hakamada et al. | | 347/106 |
| 6,084,006 A | 7/2000 | Kashiwazaki et al. | | 523/160 |
| 6,139,939 A | 10/2000 | Haruta et al. | | 428/195 |
| 6,162,510 A | 12/2000 | Kashiwazaki et al. | | 427/511 |
| 6,203,604 B1 | 3/2001 | Kashiwazaki et al. | | 106/31.5 |
| 6,214,963 B1 | 4/2001 | Noguchi et al. | | 528/71 |
| 6,248,482 B1 | 6/2001 | Kashiwazaki et al. | | 430/7 |
| 6,391,947 B1 | 5/2002 | Noguchi et al. | | 524/84 |
| 6,394,597 B1 | 5/2002 | Koike et al. | | 347/106 |
| 6,398,355 B1 | 6/2002 | Shirota et al. | | 347/100 |
| 6,402,316 B1 | 6/2002 | Ichinose | | 347/101 |
| 6,412,936 B1 | 7/2002 | Mafune et al. | | 347/100 |
| 6,426,766 B1 | 7/2002 | Shirota et al. | | 347/106 |
| 6,460,987 B1 | 10/2002 | Katsuragi et al. | | 347/100 |
| 6,474,803 B1 | 11/2002 | Shirota et al. | | 347/100 |
| 6,528,146 B2 | 3/2003 | Okuda et al. | | 428/195 |
| 6,540,344 B2 | 4/2003 | Kashiwazaki et al. | | 347/100 |
| 6,552,156 B2 | 4/2003 | Noguchi et al. | | 528/71 |
| 6,585,366 B2 | 7/2003 | Nagata et al. | | 347/101 |
| 6,605,336 B2 | 8/2003 | Ichinose et al. | | 428/195 |
| 6,619,791 B2 | 9/2003 | Tochihara et al. | | 347/100 |
| 6,659,601 B2 | 12/2003 | Goto et al. | | 347/100 |
| 6,685,999 B2 | 2/2004 | Ichinose et al. | | 428/32.25 |
| 6,686,000 B2 | 2/2004 | Ichinose | | 428/32.32 |
| 6,723,137 B1 | 4/2004 | Hakamada et al. | | 8/549 |
| 6,729,718 B2 | 5/2004 | Goto et al. | | 347/100 |
| 6,779,884 B1 | 8/2004 | Ma et al. | | 347/101 |
| 6,794,427 B2 | 9/2004 | Kurabayashi et al. | | 523/161 |
| 6,802,925 B2 | 10/2004 | Kobayashi et al. | | 156/234 |
| 6,860,593 B2 | 3/2005 | Kashiwazaki et al. | | 347/100 |
| 6,874,881 B2 | 4/2005 | Suzuki et al. | | 347/100 |
| 6,929,362 B2 | 8/2005 | Takada et al. | | 347/100 |
| 6,932,465 B2 | 8/2005 | Nito et al. | | 347/96 |
| 6,935,732 B2 | 8/2005 | Takada et al. | | 347/96 |
| 6,966,944 B2 | 11/2005 | Shimomura et al. | | 106/31.43 |
| 7,029,109 B2 | 4/2006 | Shirota et al. | | 347/100 |
| 7,055,943 B2 | 6/2006 | Suzuki et al. | | 347/100 |
| 7,060,335 B2 | 6/2006 | Ichinose | | 428/32.32 |
| 7,208,032 B2 | 4/2007 | Hakamada et al. | | 106/31.27 |
| 7,276,110 B2 | 10/2007 | Tsujimura et al. | | 106/31.27 |
| 7,285,310 B2 | 10/2007 | Kanke et al. | | 427/466 |
| 7,297,194 B2 | 11/2007 | Shinjo et al. | | 106/31.27 |
| 7,297,202 B2 | 11/2007 | Ichinose et al. | | 106/31.6 |
| 7,297,203 B2 | 11/2007 | Takada et al. | | 106/31.8 |
| 7,354,145 B2 | 4/2008 | Nito et al. | | 347/96 |
| 7,377,631 B2 | 5/2008 | Takada et al. | | 347/100 |
| 7,381,257 B2 | 6/2008 | Takayama et al. | | 106/31.78 |
| 7,503,649 B2 | 3/2009 | Kishi et al. | | 347/100 |
| 7,517,073 B2 | 4/2009 | Nito et al. | | 347/100 |
| 7,517,074 B2 | 4/2009 | Hakamada et al. | | 347/100 |
| 7,601,210 B2 | 10/2009 | Fujioka et al. | | 106/31.28 |
| 2005/0012796 A1 * | 1/2005 | Doi et al. | | 347/100 |
| 2005/0282930 A1 * | 12/2005 | Fu et al. | | 523/160 |
| 2007/0191508 A1 | 8/2007 | Nakagawa et al. | | 523/160 |
| 2007/0242100 A1 * | 10/2007 | Takuhara et al. | | 347/43 |
| 2008/0136875 A1 | 6/2008 | Iwata et al. | | 347/85 |
| 2008/0152827 A1 | 6/2008 | Hakamada et al. | | 427/466 |
| 2008/0187726 A1 * | 8/2008 | Sakai et al. | | 347/100 |
| 2008/0193647 A1 | 8/2008 | Saito et al. | | 427/256 |
| 2008/0193659 A1 | 8/2008 | Takada et al. | | 427/407.1 |
| 2008/0252708 A1 | 10/2008 | Hakamada et al. | | 347/95 |
| 2009/0136680 A1 | 5/2009 | Kishi et al. | | 427/511 |
| 2009/0258145 A1 | 10/2009 | Mukae et al. | | 427/256 |
| 2009/0308279 A1 * | 12/2009 | Koganehira et al. | | 106/31.13 |

FOREIGN PATENT DOCUMENTS

| | | |
|---|---|---|
| JP | 2002-322394 | 11/2002 |
| JP | 2003-192964 | 7/2003 |
| JP | 2003-213170 | 7/2003 |
| JP | 2004-284362 | 10/2004 |
| JP | 2007-099916 | 4/2007 |

* cited by examiner

MOVING
DIRECTION
OF STAGE

INK SET, INK JET RECORDING METHOD AND INK JET RECORDING APPARATUS

BACKGROUND OF THE INVENTION

1. Field of the Invention

The present invention relates to an ink set including plural inks each containing a pigment as a coloring material, an ink jet recording method using the ink set and an ink jet recording apparatus.

2. Description of the Related Art

In late years, a pigment ink containing a pigment as a coloring material is widely applied as an ink for ink jet printing not only to compact printers for office or home use but also to wide format printers used for printing posters and advertisements. A wide variety of recording media is used for the wide format printers, including, for example, glossy paper, mat paper, plain paper and besides, art paper which allows the texture of the base material to be felt.

Examples of the pigment used for the pigment ink include polymer dispersion pigments (see Japanese Patent Application Laid-Open No. H06-306317) dispersed in aqueous media with a dispersion polymer having a hydrophobic moiety and a hydrophilic moiety and self-dispersion pigments (see Japanese Patent Application Laid-Open No. 2002-322394 and Japanese Patent Application Laid-Open No. 2007-099916) formed by introducing hydrophilic groups onto the surface of pigment particles. Images recorded on glossy paper with an ink containing a polymer dispersion pigment are excellent in glossiness. In the meantime, images recorded on plain paper, mat paper, art paper with an ink containing a self-dispersion pigment are high in image density and besides excellent in anti-bleeding properties and character quality. In late years, it has been also proposed to use an ink containing a polymer dispersion pigment and an ink containing a self-dispersion pigment in combination for recording images so as to attain good image quality regardless of the kind of the recording media (see Japanese Patent Application Laid-Open No. 2003-213170).

In addition, considerably large recording media of the size such as A0 size or A1 size are often used in the printing with wide format printers, and when the recording media with images recorded thereon are carried, they are commonly rolled up to a cylindrical form, which may cause the following problems. That is, when a recording medium is rolled up, the images may be scratched with a sharp part such as a corner of the recording medium, and in such a case, there is caused a problem at considerable frequency that the image recorded with a pigment ink is damaged while the coloring material thereof falls off. In addition, when an image recorded with a pigment ink on art paper is stuck as a picture on the wall, the problem that the coloring material falls off is also caused at considerable frequency in a case where the image is strongly scratched with a sharp member such as a nail of a person. As described above, when a pigment ink is selected as an ink used for a wide format printer, it becomes an important problem to be overcome to attain a much higher level of scratch resistance than the conventional pigment ink so as to prevent the coloring material of the image from falling off even when the image is touched with a sharp member.

Meanwhile, because the scratch resistance of the image recorded with a pigment ink has been a problem so far, various methods for solving such a problem have been suggested. However, most of them have been considered as a pigment ink for compact printers used at office and home, what is achieved at best by using related art is to attain scratch resistance of such a degree that the image is not damaged when it is touched with a finger. That is, the problem in scratch resistance as mentioned above which is sufficient to cope with the case where the image is touched with a sharp member has not been still solved.

Needless to say, there have been some suggestions on the methods for attaining a higher level scratch resistance of the images so as to enable to provide images which can satisfy scratch resistance in such a situation that the images may be touched with a sharp member. For example, there is a suggestion for improving the scratch resistance of the images by imparting a specific compound onto the images recorded with an ink for ink jet recording, thereby enhancing slipping properties of the images (see Japanese Patent Application Laid-Open No. 2000-108495 and Japanese Patent Application Laid-Open No. 2004-284362). There is also a suggestion for improving scratch resistance and scratch resistance of the images by using an ink containing a specific polymer and a specific polyether modified organosiloxane (see Japanese Patent Application Laid-Open No. 2003-192964).

The present inventors have performed the following studies in order to provide an ink set formed by independently combining two or more pigment inks which can be applied to a wide format printer. Specifically, the present inventors have conducted studies on pigment inks which enable to record images as unsusceptible as possible when touched with a sharp member such as a nail of a person. The studies have been conducted mainly on the art described in the patent documents mentioned above. It has been found through the studies that slipping properties can be imparted to the images by incorporating a modified siloxane compound in a pigment ink, so as to obtain a pigment ink which enables to record images superior in scratch resistance to the conventional pigment inks. However, it has been also found through the studies that inks containing a self-dispersion pigment cause a new problem to be solved that the scratch resistance of the images is hard to improve when a modified siloxane compound is incorporated as compared to inks containing a polymer dispersion pigment. It has been also found that the problem to be solved mentioned above is more significantly caused particularly when the density of hydrophilic groups, which are introduced to the surface of the pigment particles in order to attain high image density, is reduced.

Further studies by the present inventors have revealed that when images are recorded using an ink set combining an ink containing a self-dispersion pigment and an ink containing a modified siloxane compound together, there is caused a phenomenon that the scratch resistance of the obtained images decreases. That is, when a self-dispersion pigment and a modified siloxane compound mix with each other on a recording medium, there has occurred a phenomenon similar to the phenomenon as mentioned above which occurs in an ink containing a self-dispersion pigment and a modified siloxane compound together. This means that although recording of images with high image density is possible when an ink containing a self-dispersion pigment is used, this effect is not sufficiently obtained when the ink is combined with an ink containing a modified siloxane compound together for the purpose of improving scratch resistance of the recorded images.

Therefore, an object of the present invention is to provide an ink set which enables to obtain images with improved image density and improved scratch resistance together when the images are recorded by combining an ink containing a self-dispersion pigment and an ink containing a modified siloxane compound. Another object of the present invention is to provide an ink jet recording method and an ink jet recording apparatus which achieves image recording having high image density and excellent scratch resistance by using an ink set formed by combining plural inks together.

SUMMARY OF THE INVENTION

The objects mentioned above can be achieved by the following present invention. That is, the present invention is an ink set to be used for ink jet recording including plural inks having a first ink and a second ink independently, wherein the first ink contains at least a pigment having functional groups on surface of pigment particles and a compound having adsorptivity to the pigment and the functional group density on the surface of the pigment is 1.5 µmol/m² or more and less than 2.6 µmol/m², and the second ink contains at least a pigment and a modified siloxane compound.

According to the present invention, an ink set which enables to simultaneously obtain images with high image density and excellent scratch resistance although the ink set has combination of an ink containing a self-dispersion pigment and an ink containing a modified siloxane compound is provided. In addition, according to another embodiment of the present invention, an ink jet recording method and an ink jet recording apparatus by which images recorded with an ink set combining plural inks together realize high image density and excellent scratch resistance are provided.

Further features of the present invention will become apparent from the following description of exemplary embodiments with reference to the attached drawings.

DESCRIPTION OF THE EMBODIMENT

Figure 1:
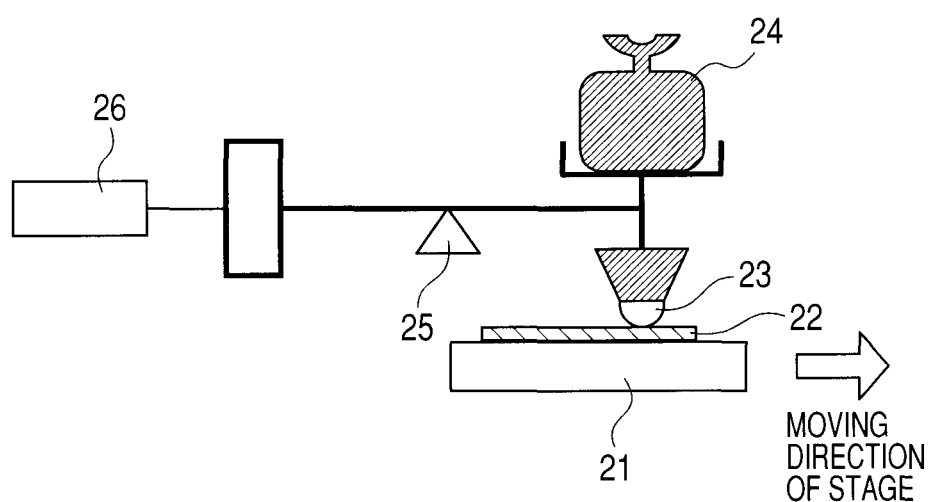
FIG. 1 is a schematic view illustrating the concept of the scratch resistance test.

In the following, the present invention is described in detail by way of embodiments. In the following, the pigment having functional groups on the surface of the pigment particles may be sometimes referred to as a "self-dispersion pigment" in the present invention. That is, the first ink contains a "self-dispersion pigment".

At first, the process before inferring the present invention is described. At first, the present inventors elucidated the phenomenon that the scratch resistance of the images deteriorates when an ink containing a self-dispersion pigment and an ink containing a modified siloxane compound are used and images of a secondary color are recorded with these inks at least partially overlapped. As a result, the present inventors presumed that the following phenomena were caused on the recording medium on which these inks were applied.

When an ink containing a self-dispersion pigment and an ink containing a modified siloxane compound are used and images of a secondary color are recorded with these inks at least partially overlapped, these inks are mixed with each other on the recording medium. Studies of the present inventors have revealed that the modified siloxane compound is adsorbing to the self-dispersion pigment at this time. This can be explained by the following mechanism. That is, the modified siloxane compound having high hydrophobicity tends to coordinate to relatively more hydrophobic site in the ink. Here, the self-dispersion pigment, different from the polymer dispersion pigment, has a large number of exposed sites on the surface of the pigment particles and these exposed parts have high hydrophobicity. Therefore, the modified siloxane compound is easy to adsorb to the exposed sites of the self-dispersion pigment, and it is supposed that, as a result, the modified siloxane compound comes to adsorb to the surface of the self dispersed pigment particles. The modified siloxane compound which has adsorbed to the self-dispersion pigment has a siloxane bond in the molecular structure and has properties to impart slipping properties, which leads to sliding phenomenon of pigment particles (phenomenon of sliding each other) which constitute the images. As a result, it is supposed that the images recorded with an ink containing a self-dispersion pigment and an ink containing a modified siloxane compound have deteriorated scratch resistance.

Accordingly, the present inventors conducted studies on how the adsorption of the modified siloxane compound to the self-dispersion pigment could be suppressed as much as possible when the first ink containing a self-dispersion pigment and the second ink containing a modified siloxane compound mixed on a recording medium. As a result, the present inventors have reached a conclusion that the adsorption of the modified siloxane compound to the self-dispersion pigment can be suppressed by protecting the hydrophobic sites on the surface of the self-dispersion pigment particles beforehand and thus inferred the present invention. Specifically, a compound having adsorptivity to the self-dispersion pigment is incorporated in the first ink containing a self-dispersion pigment and thereby the compound having adsorptivity selectively adsorbs to the self-dispersion pigment. Owing to this, hydrophobic sites on the surface of the self-dispersion pigment particles are protected by the compound having adsorptivity to the self-dispersion pigment, and the adsorption of the modified siloxane compound to the self-dispersion pigment is thereby suppressed. When such a mechanism is considered, it is preferable that the first ink does not contain a modified siloxane compound which is incorporated into the second ink at least, and further, it is more preferable that the first ink does not contain any kind of modified siloxane compounds.

As stated above, the most important point of the present invention is to constitute the first ink by incorporating a self-dispersion pigment and a compound having adsorptivity to the self-dispersion pigment so that a modified siloxane compound in the second ink is hard to adsorb to the self-dispersion pigment. This constitution suppresses deterioration in the scratch resistance of images when the images are recorded with an ink containing a self-dispersion pigment and an ink containing a modified siloxane compound. Consequently, high image density is attained by using a self-dispersion pigment and at the same time, suppression of deterioration in the scratch resistance when the images are recorded using a self-dispersion pigment and a modified siloxane compound is achieved. The present inventors have conducted further studies so as to stably attain the effect mentioned above at a higher level, and as a result, the present inventors have also found that it is effective to use a self-dispersion pigment having specific surface characteristics. That is, the present invention is an ink set to be used for ink jet recording including plural inks having a first ink and a second ink independently, wherein these inks have the following constitution: that the first ink includes a pigment having functional groups on the surface of pigment particles and a compound having adsorptivity to the pigment; that the functional group density on the surface of the particles of the pigment contained in the first ink is 1.5 µmol/m$^2$ or more and less than 2.6 µmol/m$^2$; and that the second ink includes a pigment and a modified siloxane compound. In the following, these components are described.

[First Ink Which Constitutes the Ink Set]

In the following, each of the components incorporated in the first ink which constitutes the ink set of the present invention are described. The first ink contains at least a self-dispersion pigment and a compound having adsorptivity to the self-dispersion pigment, and at first the compound having adsorptivity to the self-dispersion pigment is described.

<Compound Having Adsorptivity to the Self-Dispersion Pigment>

As for the compound having adsorptivity to the self-dispersion pigment, any kind of compound can be used as long as the compound can achieve the purpose of the present invention and does not deteriorate the dispersion stability of the self-dispersion pigment. Examples of the compound adsorbing to the self-dispersion pigment include compounds having a hydrophobic site in the structure thereof. Specific examples thereof include surfactants, preservatives, anti-mold agents and water-soluble polymers having a hydrophobic unit.

(Surfactant)

The surfactant which can be used for this purpose includes anionic surfactants, ampholytic surfactants, cationic surfactants and nonionic surfactants. Specifically, the following can be used but of course, the present invention is not limited to the surfactants given follows.

Specific examples of the anionic surfactant include alkylsulfocarboxylate, α-olefin sulfonate, polyoxyethylene alkyl ether acetate, N-acylamino acid or the salt thereof, N-acylmethyltaurine salt, alkyl sulfate salt polyoxyalkyl ether sulfate salt, alkyl sulfate salt polyoxyethylene alkyl ether phosphate salt, rosin acid soap, castor oil sulfuric ester salt, lauryl alcohol sulfuric ester salt, alkyl phenol-type phosphate, alkyl type phosphate, alkyl allyl sulfonic acid salt, diethylsulfosuccinic acid salt, diethylhexylsulfosuccinic acid salt and dioctylsulfosuccinic acid salt.

Specific examples of the cationic surfactant include 2-vinylpyridine derivatives and poly-4-vinylpyridine derivatives.

Specific examples of the ampholytic surfactant include lauryldimethylaminoacetic acid betaine, 2-alkyl-N-carboxymethyl-N-hydroxyethylimidazolinium betaine, coconut oil fatty acid propyldimethylaminoacetic acid betaine, polyoctylpolyaminoethylglycine and imidazoline derivatives.

Specific examples of the nonionic surfactant include ether compounds such as polyoxyethylene nonylphenyl ether, polyoxyethylene octylphenyl ether, polyoxyethylene dodecylphenyl ether, polyoxyethylene lauryl ether, polyoxyethylene oleyl ether, polyoxyethylene alkyl ether and polyoxyaralkylalkyl ether, ester compounds such as polyoxyethylene oleic acid, polyoxyethylene oleic acid ester, polyoxyethylene distearic acid ester, sorbitan laurate, sorbitan monostearate, sorbitan monooleate, sorbitan sesquioleate, polyoxyethylene monooleate and polyoxyethylene stearate, and acetylene glycol compounds such as, 2,4,7,9-tetramethyl-5-decyne-4,7-diol, 3,6-dimethyl-4-octyne-3,6-diol and 3,5-dimethyl-1-hexyn-3-ol.

(Preservatives/Anti-Mold Agents)

Specific examples of the preservatives and anti-mold agents include organic sulphur compounds, organic nitrogen sulfur compounds, organic halogen compounds such as pentachlorophenol sodium, haloallylsulfone compounds, iodopropargyl compounds, N-haloalkylthio compounds, nitrile compounds, pyridine compounds, 8-oxyquinoline compounds, benzothiazole compounds, isothiazoline compounds such as 1,2-benzisothiazolin-3-one, 2-n-octyl-4-isothiazolin-3-one, 5-chloro-2-methyl-4-isothiazolin-3-one, 5-chloro-2-methyl-4-isothiazolin-3-one magnesium chloride, 5-chloro-2-methyl-4-isothiazolin-3-one calcium chloride, dithiol compounds, pyridine oxide compounds such as 2-pyridinethiol-1-oxide sodium, nitropropane compounds, organotin compounds, phenolic compounds, quaternary ammonium salt compounds, triazine compounds, thiadiazine compounds, anilide compounds, adamantane compounds, dithiocarbamate compounds, brominated indanone compounds, benzylbromacetate compounds and compounds such as inorganic salts such as anhydrous sodium acetate. In addition to these, sodium sorbate and sodium benzoate such as Proxel GXL (S), Proxel XL-2 (S) (manufactured by Avecia) can be included. Of course, the present invention is not limited to these.

(Water-Soluble Polymer Having a Hydrophobic Unit)

Specific examples of the water-soluble polymer having a hydrophobic unit which can be used in the present invention include polymers formed from at least two kinds of monomers selected from the monomers given below. It is necessary that at least one of the units which constitute the polymer is a hydrophobicity unit, and it is more preferable that the polymer has a water-soluble unit and the polymer needs to show water-solubility. The monomers which can be used to synthesize such an water-soluble polymer include the following: hydrophobic monomers such as styrene or the derivatives thereof, vinylnaphthalene or the derivatives thereof and hydrophilic monomers such as aliphatic alcohol esters of α,β-ethylenic unsaturated carboxylic acid, acrylic acid or the derivatives thereof, maleic acid or the derivatives thereof, itaconic acid or the derivatives thereof, fumaric acid or the derivatives thereof, vinyl acetate, vinylpyrrolidone and acrylic amide.

Here, the compound having adsorptivity to the self-dispersion pigment usable as a component of the first ink in the present invention is not limited to the surfactants, preservatives, anti-mold agents, water-soluble polymers mentioned above. That is, any compound can be used as long as the compound can be adsorbing to a self-dispersion pigment and enables to obtain the images which simultaneously achieve suppression of deterioration in scratch resistance and high image density when the images are recorded with an ink containing the said compound combined with an ink containing a modified siloxane compound.

It is preferable in the present invention that the ratio of the content (mass %) of a compound having adsorptivity to the self-dispersion pigment in the first ink to the content (mass %) of the pigment is equal to or less than 0.05 times by the mass ratio. That is, (the content of the compound having adsorptivity to the self-dispersion pigment/the content of the pigment) can be equal to or less than =0.05. In addition, the lower limit of the mass ratio mentioned above can be more than 0.00 time. Here, the content of the compound having adsorptivity to the self-dispersion pigment and the pigment mentioned above is respectively a content of the respective component in the total mass of the first ink. When the mass ratio mentioned above is satisfied, it is enabled that the surface of the above pigment particles can be sufficiently protected with the compound having adsorptivity to the self-dispersion pigment without inhibiting the dispersion of the pigment in the ink.

In the present invention, it is particularly preferable to use a surfactant as a compound having adsorptivity to the self-dispersion pigment. This is because the surfactant has both hydrophobic sites and hydrophilic sites in one molecule and has an excellent effect of protecting the surface of the self dispersed pigment particles mentioned above, and therefore, the effect of the present invention can be obtained particularly significantly.

Further, according to the studies of the present inventors, it is preferable that the surfactant used in this case has stronger adsorptivity to the self-dispersion pigment than the adsorptivity to the self-dispersion pigment of a modified siloxane compound contained in the second ink. The surface of the self dispersed pigment particles can be protected beforehand with a surfactant particularly effectively by allowing the surfactant and the self-dispersion pigment satisfying such relations to be present in one ink. In the present invention, the self-dispersion pigment and the modified siloxane compound are respectively incorporated in different inks. And when the surface of the self-dispersion pigment particle is protected with a surfactant, even if the self-dispersion pigment and the modified siloxane compound are mixed on the recording medium, exchange of the surfactant with the modified siloxane compound is hard to occur. That is, when the first ink and the second ink are overlappingly applied to the recording medium, exchange of the surfactant adsorbed on the surface of the self dispersed pigment particles with the modified siloxane compound will not occur during a short time before the ink seeps into the recording medium and dries. On this account, deterioration in the scratch resistance of the image which is caused when a modified siloxane compound is used for the ink which contains a self-dispersion pigment is particularly significantly suppressed by using the surfactant having characteristics mentioned above. Examples of the surfactant satisfying the relations mentioned above include surfactants such as ethylene oxide adduct of acetylene glycol or polyoxyethylene alkyl ether. Specific examples of the ethylene oxide adduct of acetylene glycol include Acetilenol: E40, E100 (manufactured by Kawaken Fine Chemicals Co., Ltd.). Specific examples of the polyoxyethylene alkyl ether include EMALEX: 105, 110, 115, 120, 125, 130, 505H, 510, 515, 520, 550 (manufactured by Nihon Emulsion Co., Ltd.), BC-20, BO-20V, BO-50V (manufactured by Nikko Chemicals Co., Ltd.).

(Method for Determining Whether a Certain Compound has Adsorptivity to the Self-Dispersion Pigment)

An example of the method for determining whether a certain compound has adsorptivity to the self-dispersion pigment is described by way of an example of a surfactant as a specific example. Hereinbelow, the surfactant which is in a condition of not adsorbing to a pigment is referred to as a "free surfactant".

At first, an ink containing a self-dispersion pigment and a surfactant is centrifuged under the condition of 400, 000 G for 16 hours and the liquid of the supernatant part is collected. Then, the free surfactant is separated by high performance liquid chromatography (HPLC) from the obtained liquid and the content of the free surfactant is calculated from the peak area. The difference between the total content of the surfactant in the ink and the content of the free surfactant calculated by the method mentioned above is the content of the surfactant adsorbing to the self-dispersion pigment. The adsorptivity to the self-dispersion pigment is determined by the value of the content of the surfactant which adsorbs to the self-dispersion pigment obtained by the method mentioned above. For example, when the ratio of the content of the surfactant which adsorbs to a self-dispersion pigment is 10% or more of the total, it can be determined that the compound has adsorptivity to the self-dispersion pigment.

Here, there may be a case where minute pigment particles are contained in the liquid of the supernatant part collected after centrifugation in the method mentioned above. However, since the amount of such a pigment is very few and negligible, the content of the free surfactant calculated by the procedure mentioned above can be assumed as the substantial content of the free surfactant.

When the compound having adsorptivity to the self-dispersion pigment cannot be quantitatively assayed by HPLC, quantitative determination is performed using an analytical instrument and a collection method suitable for the compound including NMR or acid deposition. Except for that, it can be determined whether the compound has adsorptivity to the self-dispersion pigment in the same way as in the procedure mentioned above.

(Method for Determining Whether the Adsorptivity of a Certain Compound to the Self-Dispersion Pigment is Stronger than the Adsorptivity of the Modified Siloxane Compound)

Then, an example of the method for determining whether the adsorptivity of a certain compound to the self-dispersion pigment is stronger than the adsorptivity of the modified siloxane compound to the self-dispersion pigment is described by way of an example of a surfactant as a specific example.

At first, the amount of the surfactant adsorbing to the self-dispersion pigment can be estimated from the difference between the surface tension of an aqueous solution containing only the surfactant and the surface tension of an aqueous solution containing the self-dispersion pigment and the surfactant. In the meantime, the amount of the modified siloxane compound adsorbing to the self-dispersion pigment can be estimated in the similar method as this method.

The method for determining the amount of the surfactant adsorbing to the self-dispersion pigment is described in detail as follows. At first, the surface tension of an aqueous solution A containing only the surfactant in a predetermined concentration and the surface tension of an aqueous solution B containing the surfactant in the same concentration as in the aqueous solution A and the self-dispersion pigment in a predetermined concentration are compared. The surface tension of the aqueous solution A and that of the aqueous solution B approximately equal when most of the surfactants do not adsorb to the self-dispersion pigment in the aqueous solution B. On the contrary, when the surfactant adsorbs to the self-dispersion pigment in the aqueous solution B, the surface tension of the aqueous solution B is higher than the surface tension of the aqueous solution A. That is, as the difference between the surface tension of aqueous solution A and that of the aqueous solution B is larger, it shows that the adsorptivity of the surfactant to the self-dispersion pigment is stronger.

More specifically, the determination can be performed as follows. A liquid [Liquid 1] containing a surfactant and water wherein the concentration of the surfactant is 2 mmol/kg and a liquid [Liquid 2] containing a surfactant, a self-dispersion pigment and water wherein the concentration of self-dispersion pigment is 2 mmol/kg and the concentration of the self-dispersion pigment is 4 mass % are prepared. Next, the surface tension of these liquids is measured. After Liquid 1 and Liquid 2 prepared as above are sufficiently stirred, Surface Tension A (mN/m) of Liquid 1 and Surface Tension B (mN/m) of Liquid 2 at room temperature (25° C.) are respectively measured. When the values of A and B measured in this way satisfy relations of B>A, it can be determined that the surfactant adsorbs to the self-dispersion pigment. Furthermore, when the value of B minus A is 2 or more, it can be determined that the adsorptivity to the self-dispersion pigment of the surfactant is strong.

The degree to which the modified siloxane compound adsorbs to the self-dispersion pigment can be determined by respectively measuring Surface Tension A and Surface Tension B in the same way as above except that a modified siloxane compound is used in place of the surfactant. Furthermore, the value of B minus A can be determined from these values, and this value is compared with the value of B minus A when a surfactant is used. Thereby, it can be determined whether the adsorptivity of the surfactant to the self-dispersion pigment is stronger than the adsorptivity of the modified siloxane compound to the self-dispersion pigment. Specifically, if the value of B minus A when a surfactant is used is larger by 2 or more than the value of B minus A when a modified siloxane compound is used, it is determined that the adsorptivity to the self-dispersion pigment of the surfactant is stronger than the adsorptivity to the above self-dispersion pigment of the modified siloxane compound.

Here, in the case that the self-dispersion pigment is collected from the ink for preparing Liquid 2 mentioned above, it is preferable to remove the components other than the self-dispersion pigment by ultrafiltration and centrifugal separation, drying under environment of reduced pressure/high temperature as much as possible. When there are the components other than the self-dispersion pigment, for example, a water-soluble organic solvent, a surfactant and additives in the ink, in not a little amount, the surface tension of the liquid and the degree of the adsorption of the surfactant to the self-dispersion pigment may be changed by these components. Thereby there may be cases where correct determination results are not obtained. The determination can be performed by preparing Liquid 2 above so that Liquid 2 contains a self-dispersion pigment collected from the ink and water and that the surface tension of the liquid having a concentration of the self-dispersion pigment of 4 mass % is 65 mN/m or more.

<Pigment>

In the present invention, it is necessary that the pigment usable for the first ink has functional groups on the surface of the pigment particles and that the pigment is a self-dispersion pigment in which the functional group density on the surface of the above pigment particles is 1.5 µmol/m$^2$ or more and less than 2.6 µmol/m$^2$. When the functional group density is less than 1.5 µmol/m$^2$, the amount of the functional groups to contribute to the dispersion stability of the pigment is not sufficient, and therefore, the dispersion stability of the pigment in the ink decreases and storage stability of the ink cannot be obtained sufficiently. On the contrary, when the functional group density is 2.6 µmol/m$^2$ or more, the dispersion stability of the pigment increases, and the pigment is easy to come to seep into the recording medium along with the aqueous media at the time when the ink is applied to the recording medium. As a result, the image density of image cannot be obtained sufficiently.

In the present invention, the pigment useful for the first ink is a self-dispersion pigment which is an inorganic pigment or an organic pigment with a specific amount of functional groups bonded to the surface of the particles of the pigment as follows. In the present invention, the term "the functional group" means an ionizable group or an atomic group (—R—) to which at least one ionizable group is bonded. Addition of a dispersing agent to disperse the pigment in the ink can be omitted or the addition amount of the dispersing agent can be reduced to a small amount using such a self-dispersion pigment.

An anionic group is particularly suitable as the ionizable group, and specific examples thereof include —COOM, —SO$_3$M, —PO$_3$HM and —PO$_3$M$_2$. Here, in the formula, M is a hydrogen atom, an alkali metal, ammonium or an organic ammonium. Specific examples of the alkali metal include lithium, sodium and potassium. Specific examples of the organic ammonium include methylammonium, dimethylammonium, trimethylammonium, ethylammonium, diethylammonium, triethylammonium, methanol ammonium, dimethanol ammonium and trimethanol ammonium. The functional groups in the ink may be either in a state that the part thereof is ionized or in a state that the whole thereof is ionized.

Specific examples of the atomic group (—R—) mentioned above include linear or branched alkylene groups having 1 to 12 carbon atom(s) such as a methylene group, an ethylene group and a propylene group, substituted or unsubstituted phenylene groups and substituted or unsubstituted naphthylene groups. Example of the substituent group of the phenylene group or the naphthylene group includes linear or branched alkyl groups having 1 to 6 carbon atom(s). Specific examples of the combination of these atomic groups (—R—) and the ionizable groups include —C$_2$H$_4$—COOM, —C$_6$H$_4$—SO$_3$M, —C$_6$H$_4$—COOM, —C$_6$H$_3$—(COOM)$_2$ (wherein M is defined as above).

The self-dispersion pigment having an anionic group as a functional group can be produced, for example, by the method of subjecting the pigment to oxidation treatment with sodium hypochlorite, and —COONa groups can be chemically bonded to the surface of the pigment particles by this method. In addition, the self-dispersion pigment in which at least one anionic group is bonded to the atomic group as a functional group can be produced, for example, by the method of allowing nitrous acid to act on an aromatic amine having an anionic group to form a diazonium salt and thereby binding the compound to the pigment. By this method, a self-dispersion pigment in which aromatic rings are bonded on the surface of the pigment particles as atomic groups and the aromatic ring has at least one anionic group can be obtained.

In the present invention, the value calculated as follows is used as the functional group density on the surface of the pigment particles. At first, counterions of the functional group (an ionizable group or an atomic group to which at least one ionizable group is bonded) on the surface of the pigment particles in the ink are ion-exchanged with sodium ions as needed by an ordinary method. Then, the pigment is separated from the ink by filtration and dried. This pigment is added to ion-exchange water and sodium ion concentration in this liquid is measured with an ion meter and the value is converted into the functional group density (mmol/g) of the self-dispersion pigment. When the functional group is a group to which plural ionizable groups are bonded to the atomic group, the functional group density of the self-dispersion pigment can be determined by dividing the sodium ion density calculated above with the number of the ionizable group per one atomic group. Conversion from mmol/g to µmol/m$^2$ can be performed using the value of the specific surface area of the pigment which is measured by common BET method.

In the present invention, the pigment content (mass %) in the first ink is preferably 0.1 mass % or more and 15.0 mass % or less, and more preferably 1.0 mass % or more and 10.0 mass % or less based on the total mass of the first ink.

(Inorganic Pigment)

It is preferable to use, as a pigment for a black ink, carbon black such as furnace black, lamp black, acetylene black or channel black. Specifically, the following commercially available products may be used, for example: RAVEN: 1170, 1190 ULTRA-II, 1200, 1250, 1255, 1500, 2000, 3500, 5000 ULTRA, 5250, 5750 and 700 (the foregoing are available from Columbian Carbon Japan Limited); BLACK PEARLS L, REGAL: 330R, 400R and 660R, MOGUL L, MONARCH: 700, 800, 880, 900, 1000, 1100, 1300, 1400 and 2000, and VALCAN XC-72 (the foregoing are available from Cabot Corp.); COLOR BLACK: FW1, FW2, FW2V, FW18, FW200, S150, S160 and S170, PRINTEX: 35, U, V, 140U and 140V, SPECIAL BLACK: 6, 5, 4A and 4 (the foregoing are available from Degussa Corp.); and No. 25, No. 33, No. 40, No. 47, No. 52, No. 900, No. 2300, MCF-88, MA600, MA7, MA8, and MA100 (the foregoing are available from Mitsubishi Chemicals, Inc.).

Carbon black prepared newly may also be used. Of course, in the present invention, examples are by no means limited to these, and any conventionally known carbon black may be used. Without being limited to carbon black, fine magnetic-material particles of magnetite, ferrite or the like, and titanium black may also be used as the pigment.

(Organic Pigment)

In color inks, organic pigments may preferably be used as pigments. Specifically, the following may be used, for example: Water-insoluble azo pigments such as Toluidine Red, Toluidine maroon, Hanza Yellow, Benzidine Yellow and Pyrazolone Red; water-soluble azo pigments such as Lithol Red, Helio Bordeaux, Pigment Scarlet and Permanent Red 2B; derivatives from vat dyes, such as alizarin, indanthrone and Thioindigo maroon; phthalocyanine type pigments such as Phthalocyanine Blue and Phthalocyanine Green; quinacridone type pigments such as Quinacridone Red and Quinacridone Magenta; perylene type pigments such as Perylene Red and Perylene Scarlet; isoindolinone type pigments such as Isoindolinone Yellow and Isoindolinone Orange; imidazolone type pigments such as Benzimidazolone Yellow, Benzimidazolone Orange and Benzimidazolone Red; pyranthrone type pigments such as Pyranthrone Red and Pyranthrone Orange; and indigo type pigments, condensation azo type pigments, thioindigo type pigments, diketopyrrolopyrrole type pigments, Flavanthrone Yellow, Acyl Amide Yellow, Quinophthalone Yellow, Nickel Azo Yellow, Copper Azomethine Yellow, Perinone Orange, Anthrone Orange, Dianthraquinonyl Red, and Dioxazine Violet. Of course, in the present invention, examples are by no means limited to these.

When organic pigments are shown by Color Index (C.I.) Number, the following may be used, for example: C.I. Pigment Yellow: 12, 13, 14, 17, 20, 24, 74, 83, 86, 93, 97, 109, 110, 117, 120, 125, 128, 137, 138, 147, 148, 150, 151, 153, 154, 166, 168, 180, 185, etc.; C.I. Pigment Orange: 16, 36, 43, 51, 55, 59, 61, 71, etc.; C.I. Pigment Red: 9, 48, 49, 52, 53, 57, 97, 122, 123, 149, 168, 175, 176, 177, 180, 192, 215, 216, 217, 220, 223, 224, 226, 227, 228, 238, 240, 254, 255, 272, etc.; C.I. Pigment Violet: 19, 23, 29, 30, 37, 40, 50, etc.; C.I. Pigment Blue: 15, 15:1, 15:3, 15:4, 15:6, 22, 60, 64, etc.; C.I. Pigment Green: 7, 36, etc.; and C.I. Pigment Brown: 23, 25, 26, etc. Of course, in the present invention, examples are by no means limited to these.

<Aqueous Medium>

In the first ink, an aqueous medium may be used which is water or a mixed solvent of water and a water-soluble organic solvent. The content (mass %) of the water-soluble organic solvent in the first ink is preferably 3.0 mass % or more and 50.0 mass % or less based on the total mass of the first ink.

There are no particular limitations on the water-soluble organic solvent, as long as it is water-soluble. Such solvents as enumerated below may be used alone or in combination. Specifically, the following water-soluble organic solvents may be used, for example: alkanediols such as 1,3-butanediol, 1,5-pentanediol, 1,2-hexanediol and 1,6-hexanediol; glycol ethers such as diethylene glycol monomethyl(or -ethyl) ether and triethylene glycol monoethyl(or -butyl) ether; alkyl alcohols having 1 to 4 carbon atoms, such as ethanol, isopropanol, n-butanol, isobutanol, secondary butanol and tertiary butanol; carboxylic acid amides such as N,N-dimethyl formamide and N,N-dimethyl acetamide; ketones or ketoalcohols such as acetone, methyl ethyl ketone and 2-methyl-2-hydroxypentan-4-one; cyclic ethers such as tetrahydrofuran and dioxane; glycerol; ethylene glycols such as ethylene glycol, diethylene glycol, triethylene glycol and tetraethylene glycol; polyethylene glycols having an average molecular weight of from 200 to 1,000, such as 1,2- or 1,3-propylene glycol and 1,2- or 1,4-butylene glycol; glycols such as thiodiglycol, 1,2,6-hexanetriol, and acetylene glycol derivatives; heterocyclic rings such as 2-pyrrolidone, N-methyl-2-pyrrolidone, 1,3-diemthyl-2-imidazolidinone and N-methylmorpholine; and sulfur-containing compounds such as dimethyl sulfoxide.

As the water, it is preferable to use deionized water (ion-exchange water). The content (mass %) of the water in the first ink is preferably 50.0 mass % or more and 95.0 mass % or less based on the total mass of the ink.

<Other Components>

In the present invention, the first ink may contain moisture-retaining solid components such as urea, urea derivatives, trimethylolpropane and trimethylolethane in addition to the components mentioned above. The content (mass %) of the moisture-retaining solid components in the first ink is preferably 0.1 mass % or more and 20.0 mass % or less, and further preferably 3.0 mass % or more and 10.0 mass % or less by based on the total mass of the second ink.

The first ink may also contain various kinds of additives such as a pH regulator, a rust preventing agent, an antioxidant, a reduction inhibitor so as to obtain an ink having desired physical properties as needed.

[Second Ink Which Constitutes the Ink Set]

In the following, each of the components incorporated in the second ink which constitutes the ink set of the present invention are described. The second ink constituting the ink set of the present invention contains a pigment and a modified siloxane compound at least, and the second ink enables to improve the image density and the scratch resistance of the images using in combination with the first ink having the constitution described above. In addition, the second ink can the constitution that the ink contains a specific silicone oil selected from the group described later as a modified siloxane compound and further contains a specific polymer described later. In the present invention, the second ink also can the constitution to use a specific silicone graft polymer described later as a modified siloxane compound.

<Silicone Oil>

Examples of the modified siloxane compound usable for the second ink include compounds selected from a group consisting of the following specific silicone oils. That is, at least one kind of silicone oil selected from a group consisting of a silicone oil represented by the following Formula (1), a silicone oil represented by the following Formula (2) and a silicone oil represented by the following Formula (3) can be included. These silicone oils are compounds having a polysiloxane structure in the main chain. These silicone oils are used as a component of the second ink along with a specific polymer described later. When images of the primary color are recorded, for example, on a recording medium having a coat layer with the second ink of such a constitution, scratch resistance of the images can be particularly significantly improved. Therefore, use of the ink of the constitution mentioned above as the second ink enables to improve not only the scratch resistance of images of the secondary color but also the scratch resistance of images of the primary color, and therefore images more excellent in scratch resistance can be obtained.

In the silicone oils represented by the following Formula (1), Formula (2) and Formula (3), ($C_2H_4O$) represents an ethylene oxide unit and ($C_3H_6O$) represents a propylene oxide unit, respectively. In the respective silicone oils, the form that the ethylene oxide unit and the propylene oxide unit are present in the structure may be in any form. However, in the present invention, it is preferable that they are present in the random form or in the block form. Here, that each of the units mentioned above is present in the random form means that an ethylene oxide unit and a propylene oxide unit are in an irregular disposition. In the meantime, that each of the units mentioned above is present in the block form means that the repeating units of an ethylene oxide unit or a propylene oxide unit respectively constitute blocks and the thus constituted blocks are respectively in a regular disposition.

(Silicone Oil Represented by Formula (1))

Formula (1)

[Chemical structure of Formula (1)]

where the silicone oil represented by Formula (1) has a weight average molecular weight of 8,000 or more and 30,000 or less; in Formula (1), $R_1$ is an alkylene group having 1 to 20 carbon atom(s), $R_2$ is a hydrogen atom or an alkyl group having 1 to 20 carbon atom(s), m is 1 or more and 250 or less, n is 1 or more and 100 or less, a is 1 or more and 100 or less, and b is 0 or more and 100 or less.

It is preferable that $R_1$ is an alkylene group having 1 or more and 10 or less carbon atom(s), and further, an ethylene group, a propylene group and a butylene group are particularly preferable. It is preferable that $R_2$ is an alkyl group having 1 or more and 10 or less carbon atom(s), and further, an ethyl group or a propylene group is particularly preferable. It is preferable that m is 1 or more and 250 or less, and further preferably 1 or more and 100 or less, and particularly 1 or more and 50 or less. It is preferable that n is 1 or more and 100 or less, and further preferably 1 or more and 50 or less. It is preferable that a is 1 or more and 100 or less, and further preferably 1 or more and 50 or less. It is preferable that b is 0 or more and 100 or less, and further preferably 1 or more and 50 or less.

The silicone oil represented by Formula (1) above usable in the present invention can be obtained by the addition reaction of two kinds of compounds represented by the following formulas. That is, the silicone oil can be obtained by the addition reaction of a polysiloxane having n units of hydrogen atom bonded to n units of Si with a compound of a structure having one alkene group and an ethylene oxide unit and/or propylene oxide unit at the terminal end. Specifically, the silicone oil can be obtained by the addition of the alkene group to the hydrogen atoms of the polysiloxane. In the following formulas, m is 1 or more and 250 or less; n is 1 or more and 100 or less; a is 1 or more and 100 or less; b is 0 or more and 100 or less. R is an alkene group having 1 or more and 20 or less carbon atom(s).

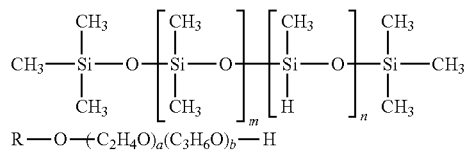

(Silicone Oil Represented by Formula (2))

Formula (2)

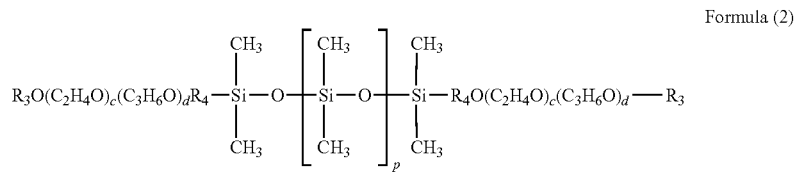

where the silicone oil represented by Formula (2) has a weight average molecular weight of 8,000 or more and less than 50,000; in Formula (2), $R_3$'s are each independently a hydrogen atom or an alkyl group having 1 to 20 carbon atom(s), $R_4$'s are each independently an alkylene group having 1 to 20 carbon atom(s), p is 1 or more and 450 or less, c is 1 or more and 250 or less, and d is 0 or more and 100 or less.

$R_3$ is preferably a hydrogen atom or an alkyl group having 1 or more and 10 or less carbon atom(s) and further preferably a hydrogen atom, an ethyl group or a propyl group. $R_4$ is preferably an alkylene group having 1 or more and 10 or less carbon atom(s) and further, particularly preferably an ethylene group, a propylene group and a butylene group. It is preferable that p is 1 or more and 450 or less, and further preferably 1 or more and 100 or less, and particularly preferably 1 or more and 50 or less.

The silicone oil represented by Formula (2) above usable in the present invention can be obtained by the addition reaction of two kinds of compounds represented by the following formulas. That is, the silicone oil can be obtained by the addition reaction of a polysiloxane having hydrogen atoms bonded to Si at the both terminal ends with a compound of a structure having one alkene group and an ethylene oxide unit and/or propylene oxide unit at the terminal end. Specifically, the silicone oil can be obtained by the addition of the alkene group to the hydrogen atoms of the polysiloxane. In these formulas, p is 1 or more and 450 or less; c is 1 or more and 250 or less; and d is 0 or more and 100 or less. R is an alkene group having 1 or more and 20 or less carbon atom(s).

[Chemical structures]

(Silicone Oil Represented by Formula (3))

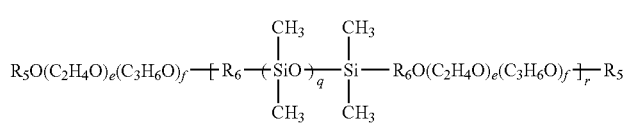

Formula (3)

where the silicone oil represented by Formula (3) has a weight average molecular weight of 8,000 or more and less than 50,000 and an HLB of 1 or more and less than 7; in Formula (3), $R_5$'s are each independently a hydrogen atom or an alkyl group having 1 to 20 carbon atom(s), $R_6$'s are each independently an alkylene group having 1 to 20 carbon atom(s), q is 1 or more and 100 or less, r is 1 or more and 100 or less, e is 1 or more and 100 or less, and f is 0 or more and 100 or less.

$R_5$ is preferably a hydrogen atom or an alkyl group having 1 or more and 10 or less carbon atom(s) and further preferably a hydrogen atom, an ethyl group or a propyl group. $R_6$ is preferably an alkylene group having 1 or more and 10 or less carbon atom(s) and further, particularly preferably an ethylene group, a propylene group and a butylene group. It is preferable that e is 1 or more and 100 or less, and further preferably 1 or more and 50 or less. It is preferable that f is 1 or more and 100 or less, and further preferably 1 or more and 50 or less.

The silicone oil represented by Formula (3) above usable in the present invention can be obtained by the addition reaction of two kinds of compounds represented by the following formulas. That is, the silicone oil can be obtained by the addition reaction of a polysiloxane having hydrogen atoms bonded to Si at the both terminal ends with a compound of a structure having alkene groups and an ethylene oxide unit and/or propylene oxide unit at the both terminal end. Specifically, the silicone oil can be obtained by the addition of the alkene group to the hydrogen atoms of the polysiloxane. In these formulas, q is 1 or more and 100 or less; e is 1 or more and 100 or less; and f is 0 or more and 100 or less. R is an alkene group having 1 or more and 20 or less carbon atom(s).

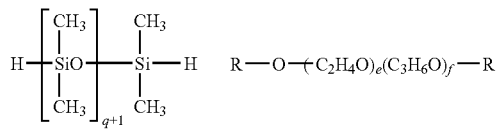

The foregoing results mean that the optimum effect of the scratch resistance of image in the primary color in the primary color can not necessarily be obtained in some cases even in the case of silicone oils having the effect of improving the slipperiness of coating film surfaces. That is, when images in the primary color are formed using, e.g., an ink containing a silicone oil having the value of weight average molecular weight outside the above range, the properties the silicone oil originally has can not sufficiently be obtained in some cases. The reason therefor is not clear, but is presumed to be as follows: As the mechanism by which the scratch resistance of the image in the primary color is remarkably improved with the ink containing the silicone oil represented by Formula (1), (2) or (3) and the polymer, the polymer is considered to adsorb the silicone oil (or vice versa), as stated previously. However, where, e.g., the silicone oil represented by the above Formula (1) has a weight average molecular weight of more than 30,000, it is considered to be difficult for the polymer to adsorb the silicone oil (or vice versa) in some cases because of an influence of steric hindrance or the like. Where, e.g., the silicone oil represented by the above Formula (2) or (3) has a weight average molecular weight of 50,000 or more, it is considered to be difficult for the polymer to adsorb the silicone oil (or vice versa) in some cases because of an influence of steric hindrance or the like. As a result, it is presumable that such a silicone oil penetrates into the recording medium, so that the coefficient of dynamic friction of images can not be lowered in some cases. On the other hand, where the silicone oil represented by any one of the above Formulas (1), (2) and (3) has a weight average molecular weight of less than 8,000, it is presumable that the silicone oil to be provided on the surfaces of images may be in so small quantity that the coefficient of dynamic friction of images can not be lowered in some cases; or where the silicone oil has a weight average molecular weight of less than 8,000, it is presumable that the silicone oil itself penetrates into the recording medium, so that the scratch resistance of image in the primary colors can not be lowered in some cases. In contrast, an improvement effect in scratch resistance of the images of primary color can be obtained with inks containing a silicone oil with a specific weight average molecular weight represented by Formula (1), Formula (2) and Formula (3) mentioned above.

However, according to the studies of the present inventors, it is particularly preferable to use those within the following weight average molecular weight in order to remarkably and stably attain an improvement effect in the scratch resistance of the images of the primary color. Specifically, in the case of the silicone oil represented by the above Formula (1), it has preferably a weight average molecular weight (Mw) of 8,000 or more and 30,000 or less, and further, particularly preferably 8,500 or more and 30,000 or less. In the case of the silicone oil represented by the above Formula (2) or (3), it has preferably a weight average molecular weight (Mw) of 8,000 or more and less than 50,000, and further, particularly preferably 8,500 or more and 30,000 or less. Here, the weight average molecular weight (Mw) is weight average molecular weight in terms of polystyrene in molecular weight distribution as measured by gel permeation chromatography (GPC). The silicone oils represented by Formula (1), Formula (2) and Formula (3) above usable in the present invention can be obtained respectively as described above, but the compounds having polysiloxane and alkene groups used as raw materials are mixtures having various kinds of molecular weight. On this account, the molecular weight of these silicone oils is determined as a mean molecular weight.

Studies made by the present inventors have revealed that, in the silicone oil represented by the above Formula (1), it is preferable to use a silicone oil having a specific HLB (hydrophilic-lipophilic balance; the value calculated by the Griffin method). More specifically, the silicone oil represented by the above Formula (1) may preferably have an HLB of 1 or more and 11 or less, and more preferably 5 or more and 11 or less.

Where the silicone oil represented by the above Formula (1) is used in the second ink, setting its weight average molecular weight and its HLB within the above ranges reduces the silicone oil penetrating into the recording medium when the ink is applied onto the recording medium. As a result, the silicone oil represented by the above Formula (1) is apt to remain on the recording medium. Hence, even where the silicone oil represented by the above Formula (1) is in a small content in the ink, the coefficient of dynamic friction of images can effectively be lowered. Such a silicone oil represented by the above Formula (1) that fulfills the above conditions and is preferably usable in the present invention may include the following: e.g., FZ-2104, FZ-2130 and FZ-2191 (available from Dow Corning Toray Co., Ltd.), KF-615A (available from Shin-Etsu Chemical Co., Ltd.), TSF4452 (available from Momentive Performance Materials Japan Inc.). Of course, in the present invention, examples are by no means limited to these.

Where the silicone oil represented by the above Formula (2) is used in the second ink, setting its weight average molecular weight within the above range reduces the silicone oil penetrating into the recording medium when the ink is applied onto the recording medium. As a result, the silicone oil represented by the above Formula (2) is apt to remain on the recording medium. Hence, even where the silicone oil represented by the above Formula (2) is in a small content in the ink, the coefficient of dynamic friction of images in the primary color can effectively be lowered. Such a silicone oil represented by the above Formula (2) that fulfills the above conditions and is preferably usable in the present invention may include, e.g., BYK333 (available from BYK Chemie Japan KK). Of course, in the present invention, examples are by no means limited thereto.

Studies made by the present inventors have revealed that, of the silicone oil represented by the above Formula (3), it is preferable to use a silicone oil having a specific HLB (hydrophilic-lipophilic balance; the value calculated by the Griffin method). More specifically, the silicone oil represented by the above Formula (3) necessarily has an HLB of 1 or more and less than 7.

Where the silicone oil represented by the above Formula (3) is used in the second ink, setting its weight average molecular weight and its HLB within the above ranges makes the silicone oil less penetrate into the recording medium when the ink is applied onto the recording medium. As a result, the silicone oil represented by the above Formula (3) is apt to remain on the recording medium. Hence, even where the silicone oil represented by the above Formula (3) is in a small content in the ink, the coefficient of dynamic friction of images in the primary color can effectively be lowered. Such a silicone oil represented by the above Formula (1) that fulfills the above conditions and is preferably usable in the present invention may include the following: e.g., FZ-2203, FZ-2207, FZ-2222 and FZ-2231 (available from Dow Corning Toray Co., Ltd.). Of course, in the present invention, examples are by no means limited to these.

As described previously, the weight average molecular weight (Mw) of the silicone oil may be measured by gel permeation chromatography (GPC) using tetrahydrofuran as a mobile phase. A measuring method used in the present invention is as shown below. Measuring conditions such as a filter, columns, a standard polystyrene sample and its molecular weight are by no means limited to the following.

First, a sample for measurement is put in tetrahydrofuran (THF) and left standing for several hours to dissolve to prepare a solution. Thereafter, the solution is filtered with a solvent-resistant membrane filter of 0.45 μm in pore size (e.g.; trade name: TITAN 2 Syringe Filter, PTFE, 0.45 μm; available from SUN-SRi). The concentration of the sample in the sample solution is so controlled that the content of the silicone oil is 0.1 mass % or more and 0.5 mass % or less.

In the GPC, an RI detector (refractive index detector) is used. In order to accurately measure molecular weight within the range of from 1,000 to 2,000,000, it is preferable to use a plurality of commercially available polystyrene gel columns in combination. For example, four columns of Shodex KF-806M (available from Showa Denko K.K.) may be used in combination, or something corresponding thereto may be used. THF as a mobile phase is flowed at a flow rate of 1 mL/min into columns having been stabilized in a 40.0° C. heat chamber, and the above sample solution is injected in an amount of about 0.1 mL. The weight average molecular weight of the sample is determined by using a molecular weight calibration curve having been prepared using the standard polystyrene sample. One having a molecular weight of from about 100 to about 10,000,000 (e.g., one available from Polymer Laboratories Inc.) may be used as the standard polystyrene sample, and it is suitable to use at least about 10 types of standard polystyrene samples.

The content (mass %) of the silicone oil represented by Formulae (1), (2) and (3) respectively in the second ink is preferably 0.2 mass % or more and 5.0 mass % or less, and more preferably 0.5 mass % or more and less than 3.0 mass %, based on the total mass of the second ink. In particular, when the silicone oil represented by the above Formula (2) is used, the content (mass %) of the silicone oil in the ink is preferably 1.0 mass % or more and less than 3.0 mass %. Where the content of the silicone oil is from 0.5 mass % or more, the silicone oil can satisfactorily be left on the recording medium to provide images with especially superior scratch resistance. In addition, where the content of the silicone oil is less than 3.0 mass %, the occurrence of faulty ejection due to, e.g., kogation can be preferably minimized.

<Polymer Usable Together with Silicone Oil>

In the present invention, the polymer to be incorporated in the second ink with the silicone oils represented by Formula (1), Formula (2) and Formula (3) above include at least one kind of polymer selected from the polymer group A and the polymer group B. Polymer group A: polymers having an acid value of 90 mgKOH/g or more and 150 mgKOH/g or less and a hydrogen bond parameter (δh) obtained by solubility parameters of monomers constituting the polymer of 1.0 cal$^{0.5}$/cm$^{1.5}$ or more and 3.7 cal$^{0.5}$/cm$^{1.5}$ or less. Polymer group B: polymers having an acid value of more than 150 mgKOH/g to 200 mgKOH/g or less and a hydrogen bond parameter (δh) obtained by solubility parameters of monomers constituting the polymer of 1.0 cal$^{0.5}$/cm$^{1.5}$ or more and 1.5 cal$^{0.5}$/cm$^{1.5}$ or less. Hereinbelow, polymers belonging to the polymer group A are referred to as Polymer A and polymers belonging to the polymer group B are referred to as Polymer B.

Here, the reason why the present inventors have decided to combine and incorporate the specific silicone oil mentioned above and the specific polymer mentioned above in the ink is described. The present inventors have conducted studies in order to provide a pigment ink which can be applied to wide format printer use, specifically on pigment inks which can record images of the primary color and suppress the damage as much as possible when a sharp member such as a nail of a person is touched. As a result, it has been found that a pigment ink which can impart slipping properties to images and record images superior in scratch resistance to the conventional inks can be obtained by incorporating the specific silicone oil mentioned above and the specific polymer mentioned above into the ink.

As a result of studies of the present inventors, it has been found that the frictional force between the images and a material (for example, a nail of a person) which touches the images, namely, the slipperiness on the image surface, to achieve improvement in scratch resistance of the images of the primary color can be expressed by a dynamic friction coefficient as an index. The dynamic friction coefficient can be measured with an scratch resistance testing equipment as follows. A scheme view to illustrate the scratch resistance test is shown in FIG. 1.

A ball made of polymethyl methacrylate (PMMA) is used as a friction member 23 to generate damage like a scratch mark by a nail of a person in this test. The scratch mark is generated using a surface properties testing machine (product name: Heidon Tribogear TYPE14DR, manufactured by Shinto Scientific Co., Ltd.) as follows. Specifically, as shown in FIG. 1, the image surface is perpendicularly touched with a PMMA ball to which is applied a load from the upper side and the sample 22 on the moving stage 21 is moved at a predetermined speed to generate a scratch mark.

The mass of metal members to fix the friction member 23 is removed by the balance mechanism 25. The scratch resistance of the image surface is evaluated with the load (weight 24) perpendicularly applied to the image surface. The force acted on the friction member 23 in the horizontal direction when the stage 21 is moved can be measured with a load cell 26 connected to the fixing metal members. The dynamic friction coefficient of the image surface against friction member 23 can be measured from the ratio of the force in the horizontal direction to the perpendicular load at the time of moving.

The present inventors have conducted scratch resistance test on images of various kinds of the primary colors by the method described above and performed detailed examination. As a result, in the case of recording images of the primary color on a recording medium having a coat layer, it has been found that images of the primary color having a sufficiently satisfying high level of the scratch resistance can be attained when the dynamic friction coefficient of the images of the primary color is 0.40 or less, further 0.35 or less and particularly 0.30 or less. Here, the lower limit of the dynamic friction coefficient is 0.00 or more.

In order to achieve improvement in scratch resistance of the images of the primary color, the present inventors have conducted studies on the ink containing a silicone oil conventionally supposed to have an effect to improve slip characteristics of the coating surface. However, when the value of the dynamic friction coefficient of the images of the primary color recorded with an ink containing the above specific silicone oil and the value of the dynamic friction coefficient of the images of the primary color recorded with an ink not containing the above specific silicone oil have been compared, it has been found that there is no difference in the value of the dynamic friction coefficient. That is, it has been found that for the inks containing either one of the silicone oils which the present inventors have examined, the use of these inks alone cannot achieve improvement in the scratch resistance of the images of the primary color to a sufficiently satisfying level, and there may be cases where the scratch resistance of the images of the primary color cannot be obtained sufficiently. The present inventors presume as follows the reason why the change in the dynamic friction coefficient of the images of the primary color does not occur although an ink containing the above specific silicone oil supposed to have an effect to improve slip characteristics of the coating surface is used. That is, it is presumed that the silicone oil in the ink permeates into the recording medium along with the aqueous medium also present in the ink, thereby leading to a condition that most of the silicone oil is not present on the recording medium.

Therefore the present inventors performed studies on the method to allow most of the silicone oil in the ink to stay on the recording medium. And at first, the present inventors have thought of using a polymer together with a silicone oil and utilizing a synergistic effect of the characteristics of the silicone oil and the characteristics of the polymer used together. As a result, the present inventors have considered that either of two following constitutions is the most suitable for achieving improvement in the scratch resistance of the images of the primary color and have forwarded the investigation. One constitution is to incorporate into the ink a polymer having characteristics to fix and make a film on the recording medium and thereby clog the innumerable pores present in the ink receiving layer to block the silicone oil from permeating into the recording medium. Another constitution is to utilize the characteristics of the silicone oil that the hydrophobicity is high and allow the pigment or polymer to adsorb the silicone oil and thereby to stay on the recording medium along with the polymer.

First, the present inventors have made studies on the polymer that is a factor common to the above two constitutions. In this case, the present inventors have considered that the polymer capable of achieving the object of the present invention is required to have properties of causing solid-liquid separation immediately after the ink has been applied onto the recording medium, to become fixed on the recording medium together with the pigment. Accordingly, the present inventors have proceeded with the studies with a focus on the selection of polymers having such properties. As a result, the present inventors have come to the conclusion that, as a polymer capable of becoming fixed on the recording medium to form a film having certain high strength, at least one polymer selected from a polymer A and a polymer B having the following properties is most suitable. The polymer A is a polymer which has an acid value of 90 mgKOH/g or more and 150 mgKOH/g or less and in which the hydrogen bond parameter ($\delta$h) of the polymer obtained by the solubility parameters of monomers constituting the polymer is at least $3.7\ \mathrm{cal}^{0.5}/\mathrm{cm}^{1.5}$ or less. The polymer B is a polymer which has an acid value of from more than 150 mgKOH/g and 200 mgKOH/g or less and in which the hydrogen bond parameter ($\delta$h) of polymer obtained by the solubility parameters of monomers constituting the polymer is at least $1.5\ \mathrm{cal}^{0.5}/\mathrm{cm}^{1.5}$ or less. The hydrogen bond parameter ($\delta$h) of a polymer is a value obtained by solubility parameters peculiar to monomers constituting the polymer and this is described later.

Next, the present inventors have recorded images of the primary color using an ink containing a polymer having the characteristics mentioned above and the above specific silicone oil examined earlier and have examined the scratch resistance of the obtained images of the primary color. As a result, dynamic friction coefficients of the images of the primary color has become 0.40 or less and the present inventors have found to obtain the images of the primary color having scratch resistance which exceeds the scratch resistance of the images of the primary color recorded with an ink containing only a polymer having the characteristics mentioned above.

From the results mentioned above, the present inventors have inferred a constitution of an ink containing at least one kind of polymer of Polymer A and Polymer B each having the characteristics described above and the above specific silicone oil together. More specifically, at least one kind of polymer of Polymer A and Polymer B having the following characteristics is used. The polymer A is a polymer which has an acid value of and 90 mgKOH/g or more and 150 mgKOH/g or less and in which the hydrogen bond parameter ($\delta h$) of the polymer obtained by the solubility parameters of monomers constituting the polymer is 1.0 cal$^{0.5}$/cm$^{1.5}$ or more and 3.7 cal$^{0.5}$/cm$^{1.5}$ or less. The polymer B is a polymer which has an acid value of more than 150 mgKOH/g and 200 mgKOH/g or less and in which the hydrogen bond parameter ($\delta h$) of the polymer obtained by the solubility parameters of monomers constituting the polymer is 1.0 cal$^{0.5}$/cm$^{1.5}$ or more and 1.5 cal$^{0.5}$/cm$^{1.5}$ or less. It is enabled to allow the specific silicone oil mentioned above to stay on the recording medium using an ink of such a constitution. As a result, the effect of improving slip characteristics, which the specific silicone oil mentioned above has, of the coating surface is sufficiently exhibited, and images of the primary color having excellent scratch resistance is obtained.

Hereinafter, the "hydrogen bond parameter ($\delta h$) of a polymer obtained by solubility parameters of monomers constituting polymer" which defines the above polymers usable in the present invention is described. First, the solubility parameter will be explained. The solubility parameter is one of the factors determining a solubility of plural compounds or an affinity of the compounds with each other, and when the solubility parameters of these compounds are similar to each other, the solubility of them is tend to become higher. dispersion force parameter In the present invention, the solubility parameter is applied to polymers and as the hydrogen bond parameter ($\delta h$) of a polymer is larger, the affinity of the polymer with water is larger. The hydrogen bond parameter ($\delta h$) of a polymer can be calculated from the solubility parameters of monomers constituting the polymer. Then, the hydrogen bond parameter ($\delta h$) of the polymer obtained by the solubility parameter of a monomer constituting the polymer can be determined by an atomic group summation method proposed by Krevelen in which organic molecules are treated as atomic groups (see Krevelen, Properties of Polymer 2nd Edition, New York, 154 (1976)). This method is described below.

First, the dispersion force parameter ($\delta d$), polarity parameter ($\delta p$), and hydrogen bond parameter ($\delta h$) of the solubility parameter are determined from a dispersion force parameter Fdi per mole, a polarity force parameter Fpi per mole, and a hydrogen bond force parameter Fhi per mole of each atomic group in the organic molecules. The solubility parameter ($\delta$) can be determined by using those values as shown in the following equations:

$\delta d = (\Sigma Fdi)/V.$ $\delta p = (\Sigma Fpi)/V.$ $\delta h = (\Sigma Fhi)/V.$ $\delta = (\delta d^2 + \delta p^2 + \delta h^2)^{1/2}.$ (V is the sum of molar volumes of atomic groups.)

The present inventors have come to a finding that, as to a polymer contained in the ink, it is possible to judge whether the polymer penetrates into a recording medium together with an aqueous medium or remains on the recording medium to become fixed taking into account the hydrogen bond term ($\delta h$) that contributes to the solubility parameter ($\delta$). The relationship between the hydrogen bond parameter ($\delta h$) that contributes to the solubility parameter ($\delta$) and the degree of penetration of polymer into the recording medium is not clear, but is presumes to be as follows: The hydrogen bond parameter ($\delta h$) comes from hydrogen bonds, and there is a tendency that the affinity between the polymer and water increases with an increase in the hydrogen bond parameter ($\delta h$) of the polymer. For example, an ink primarily containing an aqueous medium as in an ink jet recording ink has a tendency that, with an increase in the hydrogen bond parameter ($\delta h$), the polymer becomes more hydrated and the agglomerative properties between polymers become lower. Based on this tendency, the polymer is increasingly apt to penetrate into the recording medium without agglomerating on the recording medium, so that the proportion of the polymer remaining on the recording medium tends to lower.

According to studies made by the present inventors, it is preferable that the polymer A and/or the polymer B, having the value(s) of the hydrogen bond parameter ($\delta h$) of polymer obtained by the solubility parameters of monomers constituting the polymer, is/are used as a constituent(s) of the ink, which value(s) may differ in its preferable range depending on the acid value of the polymer. More specifically, between the polymer (polymer A) having an acid value of 90 mgKOH/g or more and 150 mgKOH/g or less and the polymer (polymer B) having an acid value of more than 150 mgKOH/g and 200 mgKOH/g or less, the preferable range of the hydrogen bond parameter ($\delta h$) differs as shown below. In the case of the polymer A having the acid value within the above range, the value of the hydrogen bond parameter ($\delta h$) of polymer obtained by the solubility parameters of monomers constituting the polymer is preferably 1.0 cal$^{0.5}$/cm$^{1.5}$ or more and 3.7 cal$^{0.5}$/cm$^{1.5}$ or less. In the case of the polymer B, the value of the hydrogen bond parameter ($\delta h$) of polymer obtained by the solubility parameters of monomers constituting the polymer is preferably 1.0 cal$^{0.5}$/cm$^{1.5}$ or more and 1.5 cal$^{0.5}$/cm$^{1.5}$ or less. Thus, the polymer capable of achieving the improvement of the scratch resistance of image in the primary colors in the primary color can accurately be selected.

In the present invention, as for the monomers constituting the above polymer usable for the second ink, any monomer can be used as long as the acid value and hydrogen bond parameter ($\delta h$) of the polymer can have the characteristics described above. Specifically, monomers enumerated below may be used as the monomer making up the polymer. Styrene, and α-methylstyrene; ethyl acrylate, n-butyl acrylate, n-hexyl acrylate, methyl methacrylate, and benzyl methacrylate; monomers having a carboxyl group, such as acrylic acid, methacrylic acid, crotonic acid, ethacrylic acid, propylacrylic acid, isopropylacrylic acid, itaconic acid, and fumaric acid; monomers having a sulfonic acid group, such as styrene sulfonic acid, sulfonic acid-2-propyl acrylamide, acrylic acid-2-ethyl sulfonate, methacrylic acid-2-ethyl sulfonate, and butyl acrylamide sulfonic acid; and monomers having a phosphonic acid group, such as methacrylic acid-2-ethyl phosphonate, and acrylic acid-2-ethyl phosphonate.

In the present invention, in the case when the polymer A is used, it may preferably contain, among the monomers enumerated above, at least one monomer selected from the group consisting of styrene, n-butyl acrylate and benzyl methacrylate. Further, the monomer(s) making up the polymer A may more preferably have both styrene and n-butyl acrylate. In the monomers making up the polymer A, the mass ratio of n-butyl acrylate to styrene (n-butyl acrylate/styrene) is particularly preferably more than 0.2 and less than 0.35. In the case when the polymer B is used, it may preferably contain, among the monomers enumerated above, at least one monomer selected from the group consisting of styrene and α-methylstyrene. Further, the monomer(s) making up the polymer B may more preferably have both styrene and α-methylstyrene. In the monomers making up the polymer B, the mass ratio of α-methylstyrene to styrene (α-methylstyrene/styrene) is particularly preferably 0.90 or less. In the present invention, it is not so desirable to use a monomer having a nonionic group, such as ethylene oxide, because the strength of a film formed on the recording medium may be lessened.

The polymer capable of being used for the second ink in the present invention (at least one polymer selected from the polymer A and the polymer B) may preferably have a weight average molecular weight of 5,000 or more and 15,000 or less, and more preferably 6,000 or more and 9,000 or less. The polymer having weight average molecular weight within the above range can easily remain on the recording medium after the ink has been applied onto the recording medium, and further can not easily be affected by steric hindrance. Hence, the polymer can easily adsorb the silicone oil, so that the coefficient of dynamic friction of images in the primary color can effectively be lowered.

The content (mass %) of the polymer in the second ink is preferably 0.5 mass % or more and 5.0 mass % or less, and more preferably 2.5 mass % or more and 4.0 mass % or less, based on the total mass of the second ink. Inasmuch as the content of the polymer is within the above range, the polymer can be left on the recording medium in such an amount that the scratch resistance of image in the primary colors can satisfactorily be achieved. Further, inasmuch as the content of the polymer is within the above range, the ejection orifice wetting phenomenon due to the polymer can be suppressed and deterioration in ejection property, such as curved flying of ink droplets, is not easily brought about.

Further, where the second ink containing the above specific silicone oil and specific polymer is applied onto a recording medium having a coat layer, the pigment in the ink is present in the state that agglomerates are formed on the recording medium, without penetrating into the recording medium. In this case, the polymer is left on the recording medium in an amount large enough to include the agglomerates, whereby the scratch resistance of image in the primary colors in the primary color can be effectively improved. Accordingly, the content (mass %) of the polymer (at least one polymer selected from the polymer A and the polymer B) in the second ink is preferably at least 1.2 times as much as the content (mass %) of the pigment (the content of polymer/the content of pigment). Especially where the content (mass %) of the pigment in the second ink is 0.1 mass % or more, or further 0.3 mass % or more, and less than 1.2 mass % based on the total mass of the ink, the content of the polymer is particularly preferably 3.0 times or more as much as the content (mass %) of the pigment. In addition, the content (mass %) of the polymer in the second ink is preferably 10.0 times or less as much as the content (mass %) of the pigment (the content of polymer/the content of pigment).

<Silicone Graft Polymer>

Examples of the modified siloxane compound which can be used preferably for the second ink in the present invention include a graft polymer which includes at least a nonionic unit represented by the following General formula (I) and a unit having a polysiloxane structure. When images of the primary color are recorded with an ink containing this graft polymer, the scratch resistance and glossiness of the images of the primary color can be improved particularly significantly. Therefore, use of the ink containing the graft polymer mentioned above as the second ink enables to improve not only the scratch resistance of images of the secondary color but also the scratch resistance of images of the primary color, and therefore images more excellent in scratch resistance can be obtained.

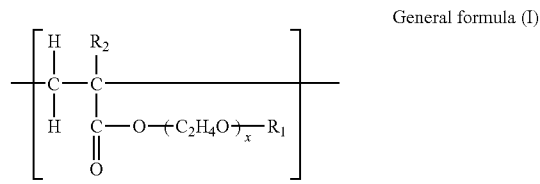

General formula (I)

(In General formula (I), $R_1$ and $R_2$ are each independently a hydrogen atom or a methyl group, and x is 1 or 2.)

The graft polymer used in the second ink of the present invention has at least a nonionic unit represented by the above General formula (I) and a unit having a polysiloxane structure. It should be noted that the term "unit" as used in the present invention hereinafter comprehends both the case where the number of repeating units forming the unit is one and the case where the number is two or more.

In addition, the graft polymer in the present invention is a "polymer having such a structure that branch polymers (side chains) are bonded to one stem polymer (main chain)." In addition, a method of determining whether the structure of a certain polymer is that of a graft polymer is, for example, the following method. That is, whether the structure of the polymer is that of a graft polymer can be determined by measuring the absolute molecular weight and molecular size of the polymer with a combination of gel permeation chromatography and a multi-angle light scattering detector. To be specific, the absolute molecular weight and the value of the molecular size measured by this method become mutually estranged more, the degree of branching of the polymer increases, so one can conclude that the polymer has the morphology of a graft polymer.

The graft polymer used in the present invention is preferably of such a structure that the functions of the unit having a polysiloxane structure and the above nonionic unit are clearly separated from each other in each molecule of the polymer in order that the respective functions may be efficiently exerted. To be specific, the above graft polymer is preferably of such a structure that the nonionic unit and the unit having a polysiloxane structure are each included in a side chain of the polymer in order that the functions of those units may be separated from each other in an additionally clear fashion. That is, one terminal of the above nonionic unit or of the unit having a polysiloxane structure preferably forms part of the main chain of the graft polymer. Further, the graft polymer is more preferably such that its side chains are constituted only of the above nonionic unit and the unit having a polysiloxane structure. The use of the graft polymer of such a structure may provide an improving effect on scratch resistance by the unit having a polysiloxane structure and an improving effect on scratch resistance and glossiness by the above nonionic unit in a particularly efficient fashion. In addition, not a high-molecular-weight unit but a low-molecular-weight unit is preferably used as the above nonionic unit. To be specific, the weight-average molecular weight of the above nonionic unit falls within the range of preferably 70 or more and 190 or less, or more preferably 110 or more and 190 or less. In this case, the molecules of the above nonionic unit can be caused to branch off from the main chain of the graft polymer evenly, in other words, the molecules of the above nonionic unit to branch off from the main chain can be delocalized; the delocalization is particularly effective in achieving compatibility between the scratch resistance and glossiness of an image in the primary color.

In the present invention, the content (mass %) of the above graft polymer in the ink is preferably 0.1 mass % or more and 10.0 mass % or less, more preferably 0.1 mass % or more and 5.0 mass % or less with reference to the total mass of the second ink.

Further, investigations conducted by the inventors of the present invention have found that the following state is important for improving the scratch resistance of an image in the primary color: a proper amount of the ink is applied to a recording medium so that a large amount of the above graft polymer may be oriented toward the surface of the image. In addition, in the present invention, the weight-average molecular weight of the above graft polymer is preferably set to fall within the range of 5,000 or more and 50,000 or less in order that a proper amount of the ink may be applied to the recording medium. When the weight-average molecular weight is higher than 50,000, the viscosity of the ink increases, so the ink cannot obtain sufficient ejection stability, a proper amount of the ink cannot be applied to the recording medium, and hence, the image cannot obtain sufficient scratch resistance in some cases. In addition, when the weight-average molecular weight is lower than 5,000, the above graft polymer as well as an aqueous medium of which the ink is formed permeates into the recording medium, so the image in the primary color cannot obtain sufficient scratch resistance in some cases.

In addition, in the present invention, it is preferred that: the units forming the above graft polymer further include a unit having an acidic group; and the graft polymer have an acid value of 80 mgKOH/g or more and 150 mgKOH/g or less. Examples of the unit having an acidic group include units derived from: monomers each having an acidic group such as monomers each having a carboxyl group such as acrylic acid, methacrylic acid, crotonic acid, itaconic acid, maleic acid, fumaric acid, citraconic acid, and 2-methacryloyloxymethyl-succinic acid, monomers each having a sulfonic group such as styrene sulfonate, and monomers each having a phosphate group such as vinyl phosphonic acid; and the anhydrides and salts of these monomers. In addition, the acid value of the above graft polymer can be adjusted by: forming the graft polymer in such a manner that the polymer contains such a unit having an acidic group as described above; and appropriately setting the structure and mass ratio of the unit having an acidic group. Investigations conducted by the inventors of the present invention have found that, when the acid value is larger than 150 mgKOH/g, the following problem may arise: the viscosity of the ink increases, so the ink cannot obtain sufficient ejection stability, a proper amount of the ink cannot be applied to a recording medium, and hence, the resultant image in the primary color may not obtain sufficient scratch resistance. On the other hand, when the acid value is less than 80 mgKOH/g, the water solubility of the above graft polymer reduces, so the ink cannot obtain sufficient storage stability in some cases. Further, it may be difficult to maintain the ejection stability of an ink containing the above graft polymer having an acid value of less than 80 mgKOH/g upon ejection of the ink by an ink jet recording method utilizing thermal energy.

It should be noted that, when the unit having an acidic group is included in the graft polymer, the unit is preferably included in the main chain of the graft polymer. That is, the unit having an acidic group is preferably prevented from being included in any side chain of the polymer. This is because of the following reason: when the unit having an acidic group is included in a side chain of the polymer, the action of each of the above nonionic unit and the unit having a polysiloxane structure is suppressed, so the scratch resistance and glossiness of an image in the primary color cannot be sufficiently obtained in some cases. On the other hand, when the unit having an acidic group is included in the main chain, the action of each of the above nonionic unit and the unit having a polysiloxane structure is sufficiently exerted, whereby compatibility between the scratch resistance and glossiness of an image in the primary color can be achieved.

Further, in the present invention, the content (mass %) of the pigment in the second ink is preferably 0.2 times or more and 2.0 times or less as large as the content (mass %) of the above graft polymer in the ink in terms of mass ratio: a value for the ratio (the content of the pigment/the content of the above graft polymer) is preferably 0.2 or more and 2.0 or less. It should be noted that, in the present invention, the content of each of the pigment and the above graft polymer is the content of each component in the total mass of the second ink. When the above mass ratio is less than 0.2 times, an image in the primary color formed with the ink cannot obtain sufficient scratch resistance in some cases. A possible reason for the foregoing is as described below. When the above mass ratio is less than 0.2 times, the amount of the above graft polymer becomes large as compared to that of the pigment, so the above graft polymer may be present not only on the surface of the image but also in a pigment layer of which the image is formed. In this case, the above graft polymer is present even between the particles of the pigment forming the image, and aggregates of the particles of the pigment become slippery, with the result that the image cannot obtain sufficient scratch resistance in some cases. On the other hand, when the mass ratio exceeds 2.0 times, the amount of the above graft polymer oriented toward the surface of the image reduces, so the image cannot obtain sufficient scratch resistance in some cases.

Hereinafter, each unit forming the above graft polymer used in the second ink of the present invention is described in more detail.

(Nonionic Unit)

The nonionic unit forming the above graft polymer used in the second ink of the present invention has a structure represented by the following General formula (I). The nonionic unit of the structure is obtained by the copolymerization of a monomer represented by the following General formula (I') and having the following characteristics: the number of repeating units, i.e., ethylene oxide groups is 1 or 2, and the monomer has a polymerizable functional group at one of its terminals. Further, the graft polymer used in the present invention is preferably of such a structure that the vinyl group or vinylidene group of the monomer represented by the following General formula (I') serves as part of the main chain of the graft polymer, and a portion of the monomer ranging from the ester bond to $R_1$ branches off to serve as a side chain of the graft polymer.

General formula (I)

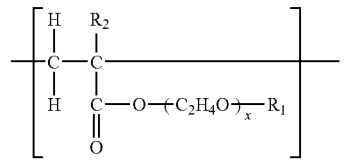

(In the General formula (I), $R_1$ and $R_2$ each independently represent a hydrogen atom or a methyl group, and x represents 1 or 2.)

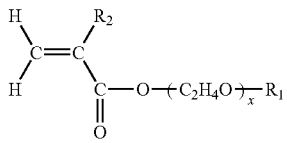

General formula (I')

(In the General formula (I'), $R_1$ and $R_2$ each independently represent a hydrogen atom or a methyl group, and x represents 1 or 2.)

The number of repeating units, i.e., ethylene oxide groups in the nonionic unit represented by the above General formula (I) used in the present invention must be 1 or 2: that is, x in the above General formula (I) needs to represent 1 or 2. When x in the above General formula (I) is 3 or more, in the case where the above nonionic unit is branched off from the main chain of the graft polymer, sites having nonionic property tend to exist locally, so the hydrophilicity of the entirety of the above graft polymer becomes high. As a result, an image in the primary color formed with the ink cannot obtain sufficient scratch resistance, and its water resistance becomes insufficient. In addition, when the hydrophilicity of the entirety of the above graft polymer becomes high as described above, the graft polymer acts like a surfactant in the ink. In this case, the above graft polymer enhances the permeability of the ink into a recording medium, and hence, the amount of the above graft polymer oriented toward the outermost surface of the image reduces, so sufficient scratch resistance of the image in the primary color cannot be obtained.

It should be noted that, when a unit having an ethylene oxide group of a structure different from that of the nonionic unit represented by the General formula (I) is further included in the graft polymer, the number of repeating units, i.e., ethylene oxide groups in the unit is preferably 1 or 2. This is because the water resistance of an image formed with the ink may be insufficient as in the case of x in the nonionic unit represented by the General formula (I) represents 3 or more described above.

In addition, investigations conducted by the inventors of the present invention have found that, even when a silicone graft polymer having an ionic unit instead of the above nonionic unit and a unit having a polysiloxane structure is incorporated into the ink, an improving effect on the glossiness of an image in the primary color cannot be obtained. The inventors consider the reason for the foregoing as described below. For example, when an ink containing a silicone graft polymer having an anionic unit instead of the above nonionic unit is applied to a recording medium, the following phenomenon occurs. That is, a cationic compound in the recording medium, such as alumina, silica, or calcium carbonate, and the anionic unit as part of the constitution of the above polymer react with each other, so the aggregation of the components forming the ink is promoted. In this case, the aggregation of a pigment, the polymer, and the like occurs nonuniformly, with the result that no leveling property is exerted on the surface of an image formed with the ink, and the image in the primary color cannot obtain sufficient glossiness.

The nonionic unit represented by the above General formula (I) is specifically, for example, a copolymer of a (meth) acrylate-based monomer. In addition, the above graft polymer used in the present invention may be formed of one kind of such a nonionic unit as described above, or may be formed of a combination of two or more kinds of such nonionic units as described above.

Examples of the (meth)acrylate-based monomer include 2-hydroxyethyl methacrylate, diethylene glycol monomethacrylate, 2-hydroxyethyl acrylate, diethylene glycol monoacrylate, methoxydiethylene glycol monomethacrylate, and methoxydiethylene glycol monoacrylate. In the present invention, of those monomers, 2-hydroxyethyl acrylate, 2-hydroxyethyl methacrylate, and methoxydiethylene glycol monomethacrylate are preferably used. As the (meth)acrylate-based monomer, for example, commercially available products such as BLEMMER PE-90, AE-90, and PME-100 (all of which are manufactured by NOF CORPORATION), and BHEA and HEMA (both of which are manufactured by NIPPON SHOKUBAI CO., LTD.) can be used.

In the present invention, the proportion of the nonionic unit represented by the above General formula (I) with reference to the total mass of the above graft polymer is preferably 5.0 mass % or more and 45.0 mass % or less. When the proportion is less than 5.0 mass %, the leveling property of the ink reduces, so the surface of an image formed with the ink does not become smooth, and the image in the primary color cannot obtain sufficient glossiness in some cases. On the other hand, when the proportion is larger than 45.0 mass %, the image in the primary color cannot obtain sufficient scratch resistance in some cases. This is because when the above proportion is larger than 45.0 mass %, the hydrophilicity of the above graft polymer becomes high, and the above graft polymer starts to exist stably in the ink, with the result that the above graft polymer is apt to permeate into a recording medium, and the amount of the above graft polymer oriented toward the surface of the image reduces in some cases.

(Unit Having Polysiloxane Structure)

An arbitrary unit may be used as the unit having a polysiloxane structure forming the above graft polymer used in the second ink of the present invention as long as the unit has a polysiloxane structure. In the present invention, a unit represented by the following general formula (V) out of the units each having a polysiloxane structure is particularly preferably used. The unit represented by the general formula (V) is obtained by the copolymerization of a monomer represented by the following general formula (V') and having a polymerizable functional group at one of its terminals. Further, the graft polymer used in the present invention is preferably of such a structure that the vinyl group or vinylidene group of the monomer represented by the following general formula (V') serves as part of the main chain of the graft polymer, and a portion of the monomer ranging from the ester bond to $R_{11}$ branches off to serve as a side chain of the graft polymer. In addition, the above graft polymer used in the present invention may be formed of one kind of a unit having a polysiloxane structure, or may be formed of a combination of two or more kinds of units each having a polysiloxane structure.

General formula (V)

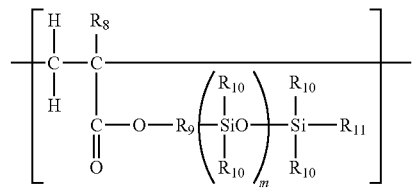

(In the general formula (V), $R_8$ represents a hydrogen atom or a methyl group, $R_9$ represents an alkylene group having 1 to 6 carbon atoms, $R_{10}$'s each independently represent a methyl group or a phenyl group, $R_{11}$ represents an alkyl group having 1 to 6 carbon atoms or a phenyl group, and m represents 1 to 150.)

General formula (V')

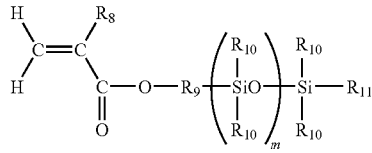

(In the general formula (V'), $R_8$ represents a hydrogen atom or a methyl group, $R_9$ represents an alkylene group having 1 to 6 carbon atoms, $R_{10}$'s each independently represent a methyl group or a phenyl group, $R_{11}$ represents an alkyl group having 1 to 6 carbon atoms or a phenyl group, and m represents 1 to 150.)

In addition, in the present invention, a commercial product such as a SILAPLANE FM-0711, FM-0721, or FM-0725 (manufactured by CHISSO CORPORATION) can be used as the monomer represented by the above general formula (V').

In the present invention, the proportion of the above unit having a polysiloxane structure with reference to the total mass of the above graft polymer is preferably 10.0 mass % or more and 40.0 mass % or less. When the proportion is less than 10.0 mass %, the amount of the above graft polymer oriented toward the surface of an image formed with the ink reduces irrespective of the content of the above graft polymer in the ink, so the image in the primary color cannot obtain sufficient scratch resistance in some cases. On the other hand, when the above proportion is larger than 40.0 mass %, the image in the primary color cannot obtain sufficient scratch resistance in some cases. This is because in contrast to the foregoing, the amount of the above graft polymer oriented on the surface of an image increases, so the above graft polymer may be present not only on the surface of the image but also in a pigment layer of which the image is formed; in other words, the above graft polymer is present even between the particles of the pigment, and aggregates of the particles of the pigment become slippery in some cases.

(Other Units)

The above graft polymer used in the second ink of the present invention must have at least the nonionic unit represented by the above General formula (I) and the unit having a polysiloxane structure described above, and preferably further has the unit having an acidic group described above. In addition, the above graft polymer used in the second ink of the present invention may further have any other unit in addition to those units. In addition, in the present invention, by the same reason as in the case of the above-mentioned unit having an acidic group, other units are particularly preferably included in the main chain of the above graft polymer: that is, the other unit is particularly preferably prevented from being included in any side chain of the polymer.

Other units are, for example, a copolymer of a nonionic monomer such as an ester compound. In addition, the above graft polymer used in the second ink of the present invention may be formed of one kind of such other unit as described above, or may be formed of a combination of two or more kinds of such other units as described above.

Specific examples of the other unit include the units which are copolymerized form of following monomers: acrylates such as methyl acrylate, ethyl acrylate, and butyl acrylate; methacrylates such as methyl methacrylate, ethyl methacrylate, and butyl methacrylate; 3-sulfopropyl(meth)acrylate; bis-(3-sulfopropyl)itaconic ester; vinyl phosphate; bis(methacryloxyethyl)phosphate; diphenyl-2-methacryloloxyethyl phosphate; dibutyl-2-acryloyloxyethyl phosphate; dibutyl-2-methacryloyloxyethyl phosphate; and dioctyl-2-(meth)acryloyloxyethyl phosphate. Of those, methyl acrylate, butyl acrylate, methyl methacrylate, and butyl methacrylate are preferred. It should be noted that a pigment frequently used as a coloring material for an ink jet ink is often dispersed with an anionic polymer dispersant. In consideration of the stability of an ink containing such a pigment, the units forming the graft polymer are preferably free of a unit derived from a cationic monomer capable of reacting with the polymer.

(Water-Soluble Organic Compound)

At least one kind of a water-soluble organic compound selected from the group consisting of compounds represented by the following general formulae (II), (III), and (IV) is preferably further incorporated into the second ink of the present invention in addition to the graft polymer described above. It should be noted that, in the following description, the water-soluble organic compound belonging to the group consisting of the compounds represented by the following general formulae (II), (III), and (IV) may be abbreviated as "specific water-soluble organic compound."

General formula (II)

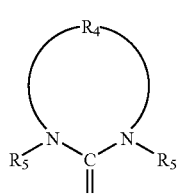

General formula (III)

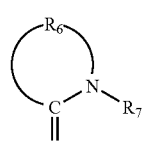

General formula (IV)

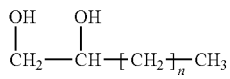

(In the general formula (II), $R_4$ represents an alkylene group which has 2 to 5 carbon atoms and which may have a substituent, and $R_5$'s each independently represent a hydrogen atom or an alkyl group which has 1 to 4 carbon atoms and which may have a substituent. In addition, in the general formula (III), $R_6$ represents an alkylene group which has 2 to 5 carbon atoms and which may have a substituent, and $R_7$ represents a hydrogen atom or an alkyl group which has 1 to 4 carbon atoms and which may have a substituent. In addition, in the general formula (IV), n represents a number of 1 to 3.)

Here, the reason why the above specific water-soluble organic compound is preferably further incorporated into the second ink in addition to the above graft polymer indispensable to the present invention is described. First, as described above, the following state is important for improving the scratch resistance and glossiness of an image in the primary color: a proper amount of the ink is applied to a recording medium so that a large amount of the above graft polymer may be oriented toward the surface of the image. In addition, the above nonionic unit forming the above graft polymer used in the second ink of the present invention has high hydrophilicity, and the unit having a polysiloxane structure forming the graft polymer has high lipophilicity. Accordingly, multiple molecules of the above graft polymer may form an associated body in the ink. In addition, upon application of the ink containing the above graft polymer in such a state to the recording medium, additionally increasing the amount of the above graft polymer oriented toward the surface of the image in the primary color is important for improving the scratch resistance and glossiness of the image in a particularly significant fashion.

In view of the foregoing, the inventors of the present invention have conducted investigations, and as a result, have found that the scratch resistance and glossiness of the image in the primary color can be improved in a particularly significant fashion by providing the ink with such a constitution that the ink contains the above graft polymer and the above specific water-soluble organic compound. In the ink of such a constitution, the associated body of the molecules of the above graft polymer is loosened. Here, a compound represented by the above general formula (II) or (III) as a nitrogen-containing heterocyclic compound has a function of loosening the associated body of the molecules of the above graft polymer in the ink because the compound has a high affinity for the graft polymer having the hydrophilic unit and the lipophilic unit. In addition, the compound represented by the general formula (IV) as a 1,2-alkanediol acts like a surfactant, and has a function of loosening the associated body of the molecules of the above graft polymer in the ink because the compound is of such a molecular structure that a hydrophilic portion and a lipophilic portion are clearly separated from each other. In other words, via such a mechanism, upon application of the ink of the constitution to the recording medium, molecules of the above graft polymer which do not form any associated body are uniformly oriented toward the surface of the image with efficiency, so the scratch resistance and glossiness of the image in the primary color may be improved in a particularly significant fashion.

It should be noted that a state where the associated body of the molecules of the above graft polymer is loosened in the second ink of the present invention can be confirmed by measuring the dynamic surface tension of the ink. For example, the dynamic surface tension of each of an ink into which the above specific water-soluble organic compound as well as the above graft polymer is incorporated and an ink into which the above specific water-soluble organic compound is not incorporated is measured at a certain life time. In this case, the ink in which the associated body of the molecules of the above graft polymer is not formed by virtue of the incorporation of the above specific water-soluble organic compound shows a lower dynamic surface tension at the life time than the ink into which the above specific water-soluble organic compound is not incorporated does. This is because of the following reason: in the case of the ink in a state where the associated body of the molecules of the above graft polymer is loosened, a relatively large amount of molecules of the graft polymer are oriented toward an interface between the ink and the air, so the dynamic surface tension of the ink reduces. In other words, when comparison between the dynamic surface tensions of those inks shows that the dynamic surface tension of the ink into which the above specific water-soluble organic compound is incorporated is lower than that of the other, it can be said that the associated body of the molecules of the above graft polymer is loosened in the ink. It should be noted that, for example, a Bubble Pressure Tensiometer BP2 (manufactured by KRUSS) can be used as an apparatus for measuring a dynamic surface tension.

The compounds represented by the general formula (II) and general formula (III) are nitrogen-containing heterocyclic compounds. Specific examples thereof include 2-pyrrolidone, N-methyl-2-pyrrolidone, 1,3-diemthyl-2-imidazolidinone, and ethylene urea. In addition, the compound represented by the general formula (IV) is 1,2-alkanediol. Specific examples thereof include 1,2-propanediol, 1,2-butanediol, 1,2-pentanediol, and 1,2-hexanediol. Of those compounds, at least one kind selected from 2-pyrrolidone, N-methyl-2-pyrrolidone, ethylene urea, and 1,2-hexanediol is particularly preferably used. Further, it is particularly preferred that the ink include at least one kind selected from 2-pyrrolidone, N-methyl-2-pyrrolidone, and ethylene urea, and 1,2-hexanediol together.

In the present invention, the total content (mass %) of the compounds represented by the above general formulae (II), (III), and (IV) in the second ink is preferably 2.0 times or more times as large as the content (mass %) of the above graft polymer in the ink in terms of mass ratio: a value for the ratio (the total content of the above specific water-soluble organic compound/the content of the above graft polymer) is preferably 2.0 or more. It should be noted that the content of each of the above specific water-soluble organic compound and the above graft polymer is the content of each component in the total mass of the ink. On the other hand, when the mass ratio is less than 2.0 times, the content of the above specific water-soluble organic compound in the ink reduces, and hence, the associated body of the molecules of the above graft polymer cannot be sufficiently loosened, so a significant improving effect on the scratch resistance and glossiness of an image in the primary color formed with the ink cannot be obtained in some cases. In addition, an upper limit for the above mass ratio is preferably 40.0 times or less, more preferably 20.0 times or less, or particularly preferably 10.0 times or less, especially 8.0 times or less. When the upper limit for the above mass ratio is larger than 40.0 times, the viscosity of the ink increases, so the ink cannot obtain sufficient ejection stability. Therefore, it may be unable to apply a proper amount of the ink to a recording medium, and the image in the primary color may be unable to obtain sufficient scratch resistance.

In addition, in the present invention, the total content (mass %) of the compounds represented by the above general formulae (II), (III), and (IV) in the second ink is preferably 2.0 mass % or more with reference to the total mass of the second ink. When the content is less than 2.0 mass %, the content of the above specific water-soluble organic compound in the second ink reduces, and hence, the associated body of the molecules of the above graft polymer cannot be sufficiently loosened, so a significant improving effect on the scratch resistance and glossiness of an image in the primary color formed with the ink cannot be obtained in some cases. In addition, an upper limit for the content of the above specific water-soluble organic compound is preferably 20.0 mass % or less. When the upper limit for the content is larger than 20.0 mass %, the viscosity of the ink increases, so the ink cannot obtain sufficient ejection stability. Therefore, it may be unable to apply a proper amount of the ink to a recording medium, and the image in the primary color may be unable to obtain sufficient scratch resistance.

<Pigment>

In the present invention, it is preferable that the pigment in the second ink is in a form dispersed with a polymer, namely, it is preferable to use a polymer dispersion pigment which is dispersed in the ink with a dispersant. As for the polymer (dispersing agent) to disperse the pigment, any soluble polymer can be used. In particular, it is more preferable to use a polymer which is different from the specific polymer described above or a graft polymer mentioned above as a polymer (dispersing agent) to disperse the pigment.

In the present invention, as for the monomer constituting polymer (dispersing agent) to disperse the pigment, the following can be included, and a polymer consisting of at least two monomers from these is specifically included. In that case, at least one is preferably an anionic monomer. Examples of the monomer include styrene, vinylnaphthalene, aliphatic alcohol esters of α,β-ethylenically unsaturated carboxylic acid, acrylic acid, maleic acid, itaconic acid, fumaric acid, vinyl acetate or the derivatives of these. As for the form of the polymer, block copolymer, random copolymer, graft copolymer or these salts can be included. Furthermore, natural polymers such as rosin, shellac and starch may be used. These polymers are soluble in an aqueous solution having dissolved a base therein, and are alkali soluble type polymers. As for the polymer usable as a dispersing agent, the weight average molecular weight thereof is preferably 1,000 or more and 30,000 or less, further preferably 3,000 or more and 15,000 or less, and the acid value thereof is preferably 100 mgKOH/g or more and 300 mgKOH/g or less. In the present invention, the content (mass %) of the polymer usable as a dispersing agent in the second ink can be 0.1 mass % or more and 10.0 mass % or less based on the total mass of the second ink.

In the present invention, as for the pigment which can be used for the second ink, anything like the inorganic pigment and the organic pigment mentioned in the description of the first ink can be included except that the dispersion method is different. In the present invention, the content (mass %) of the pigment in the second ink is preferably 0.1 mass % or more and 15.0 mass % or less, further preferably 1.0 mass % or more and 10.0 mass % or less based on the total mass of the second ink.

<Aqueous Medium>

In the present invention, an aqueous medium which may be water or a mixed solvent of water and a water-soluble organic solvent can be used for the second ink. For the water-soluble organic solvent which can be used for the second ink, the same solvents as the water-soluble organic solvents described for the first ink can be included. In the present invention, the content (mass %) of the water-soluble organic solvent in the second ink can be 3.0 mass % or more and 50.0 mass % or less based on the total mass of the second ink. Here, the content of this water-soluble organic solvent is a content containing the specific water-soluble organic compound described above. In the present invention, the content (mass %) of water in the second ink can be 50.0 mass % or more and 95.0 mass % or less based on the total mass of the second ink.

<Other Components>

In the present invention, the second ink may contain moisture-retaining solid components such as urea, urea derivatives, trimethylolpropane and trimethylolethane in addition to the components mentioned above. The content (mass %) of the moisture-retaining solid components in the second ink is preferably 0.1 mass % or more and 20.0 mass % or less, and further preferably 3.0 mass % or more and 10.0 mass % or less based on the total mass of the second ink.

The second ink may also contain various kinds of additives such as a pH regulator, a rust preventing agent, an anti-mold agent, an antioxidant, a reduction inhibitor so as to obtain an ink having preferred physical properties as needed.

[Ink Jet Recording Method]

The ink jet recording method of the present invention is characterized in that recording on a recording medium is performed by respectively ejecting plural inks from the recording head wherein the plural inks contains the combination of the first ink and the second ink constituting an ink set of the present invention. As for the ink jet recording method, there are a recording method to eject ink by applying mechanical energy to the ink and a recording method to eject ink by applying thermal energy to the ink. It is particularly preferable in the present invention to use an ink jet recording method using thermal energy.

[Ink Cartridge]

Each of the inks constituting the ink set of the present invention can be contained in the ink containing part of the ink cartridge having the ink containing part for containing inks.

[Recording Unit]

It is preferable that each ink constituting an ink set of the present invention is contained in the ink containing part of the recording unit having the ink containing part for containing inks and a recording head for ejecting inks. In particular, it can be used in the recording unit wherein the recording head ejects an ink by applying thermal energy corresponding to the recording signals to the ink. Furthermore, in the present invention, it is particularly preferable to use in a recording head having heat generating-liquid contacting surface which contains metal and/or metal oxide. Specific examples of the metal and/or the metal oxide constituting the heat generating-liquid contacting surface include metals such as Ta, Zr, Ti, Ni or Al or oxides of these metals.

[Ink Jet Recording Apparatus]

The ink jet recording apparatus of the present invention is characterized in that recording on a recording medium is performed by respectively ejecting plural inks contained in an ink cartridge from the recording head wherein the plural inks contains the combination of the first ink and the second ink constituting an ink set of the present invention. In particular, an ink jet recording apparatus is included wherein the inks are ejected by applying thermal energy corresponding to the recording signals to the ink within the recording head having the ink containing part for containing the inks.

Hereinafter, the schematic constitution of the mechanism portion of an ink jet recording apparatus is described. The ink jet recording apparatus is formed of, for example, a sheet feeding portion, a conveying portion, a carriage portion, a sheet discharge portion, and a cleaning portion, and an external packaging portion for protecting them and providing them with design to achieve a role of each mechanism.

Figure 2:
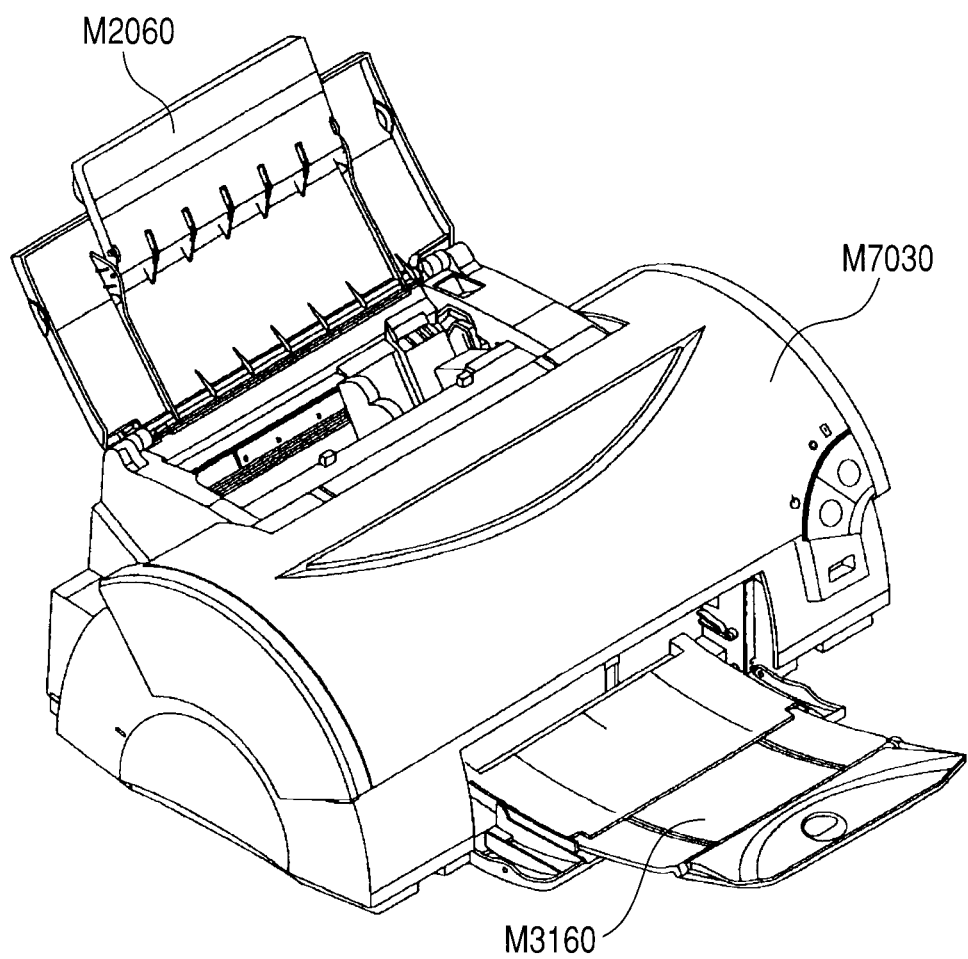
FIG. 2 is a perspective view of an ink jet recording apparatus.
Figure 3:
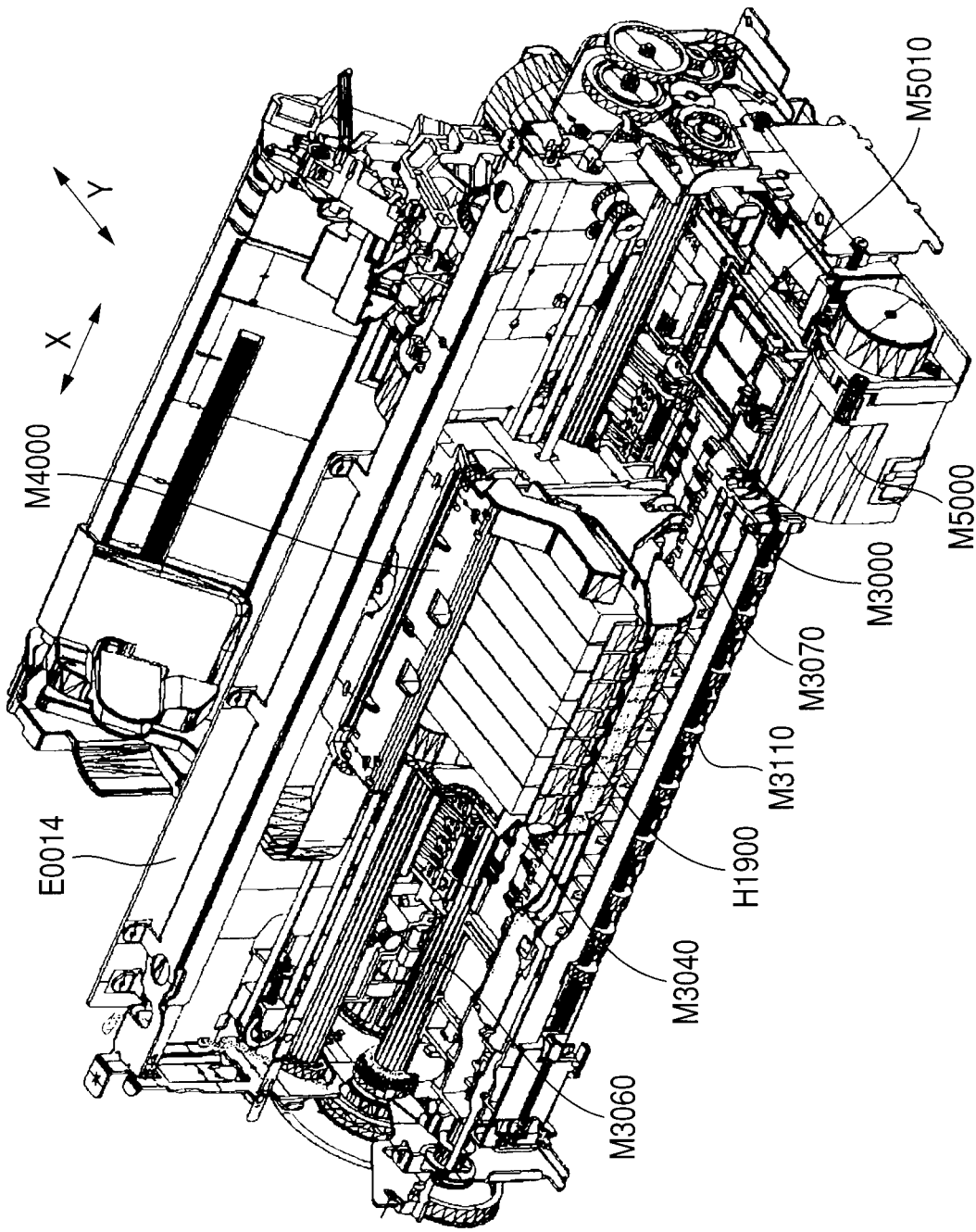
FIG. 3 is a perspective view of the mechanical part of the ink jet recording apparatus.
Figure 4:
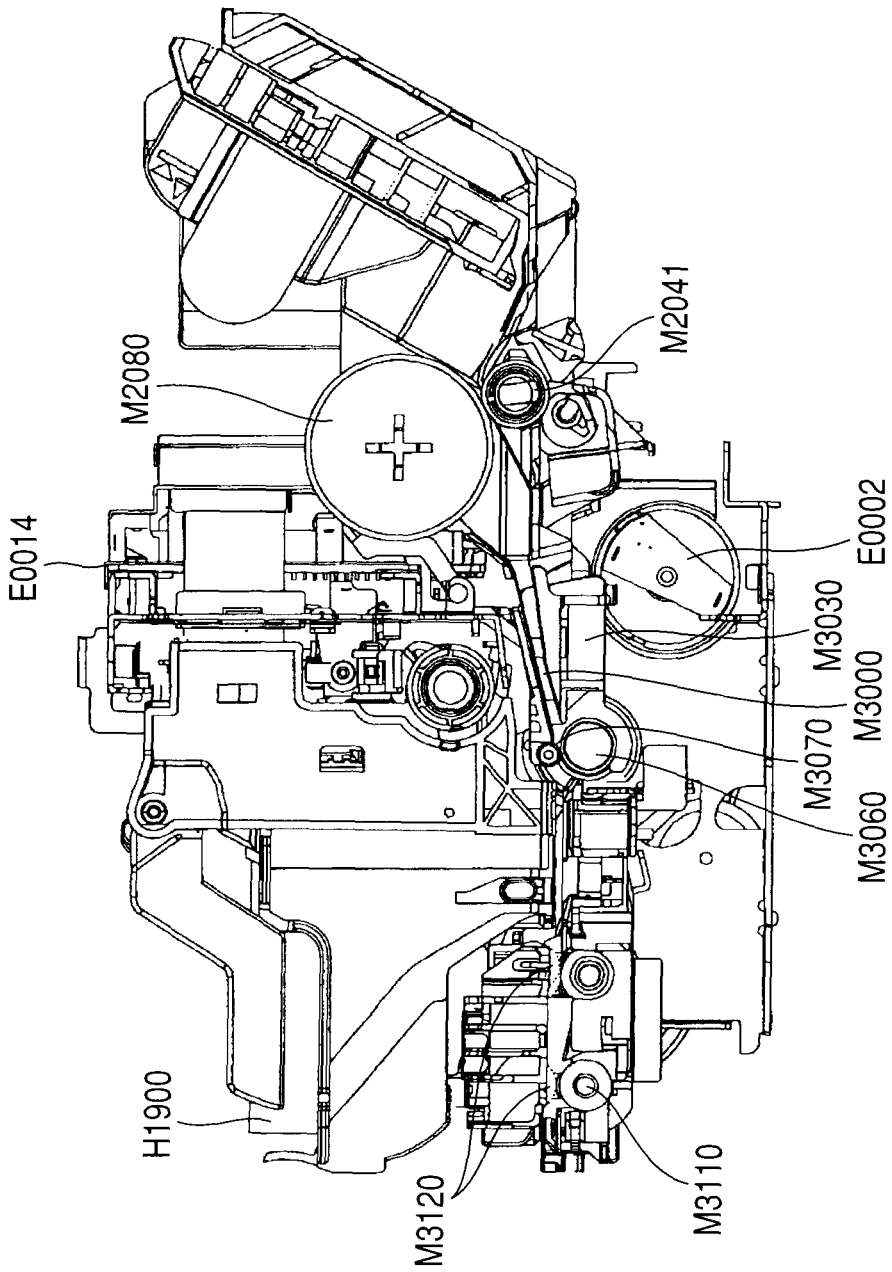
FIG. 4 is a cross-sectional view of the ink jet recording apparatus.

FIG. 2 is a perspective view of the ink jet recording apparatus. In addition, FIGS. 3 and 4 are views for describing the internal mechanism of the ink jet recording apparatus. FIG. 3 is a perspective view seen from an upper right portion, and FIG. 3 is a side sectional view of the ink jet recording apparatus.

Upon feeding of a sheet, only a predetermined number of recording media are sent to a nip portion formed of a sheet feeding roller M2080 and a separating roller M2041 in the sheet feeding portion including a sheet feeding tray M2060. The sent recording media are separated at the nip portion, and only the uppermost recording medium is conveyed. The recording medium conveyed to the conveying portion is guided by a pinch roller holder M3000 and a paper guide flapper M3030 to be conveyed to a roller pair formed of a conveying roller M3060 and a pinch roller M3070. The driving of an LF motor E0002 rotates the roller pair formed of the conveying roller M3060 and the pinch roller M3070, and the rotation causes the recording medium to be conveyed on a platen M3040.

Upon recording of an image on a recording medium, the carriage portion places a recording head H1001 (FIG. 5; a detailed constitution is described later) at a position where a target image is recorded, and ejects ink to the recording medium in accordance with a signal from an electrical substrate E0014. While recording is performed by the recording head H1001, main scanning in which a carriage M4000 scans in a column direction and sub-scanning in which a recording medium is conveyed in a row direction by the conveying roller M3060 are alternately repeated, whereby an image is recorded on the recording medium. The recording medium on which the image has been recorded is conveyed in a state of being sandwiched at a nip between a first sheet discharge roller M3110 and a spur M3120, and is discharged to a sheet discharge tray M3160 in the sheet discharge portion.

It should be noted that the cleaning portion cleans the recording head H1001 before and after image recording. When a pump M5000 is allowed to act in a state where an ejection orifice of the recording head H1001 is capped with a cap M5010, unnecessary ink and the like are sucked from the ejection orifice of the recording head H1001. In addition, the ink and the like remaining in the cap M5010 are sucked with the cap M5010 opened, whereby neither adhesion of the remaining ink nor any other harmful effect occurs.

(Constitution of Recording Head)

Figure 5:
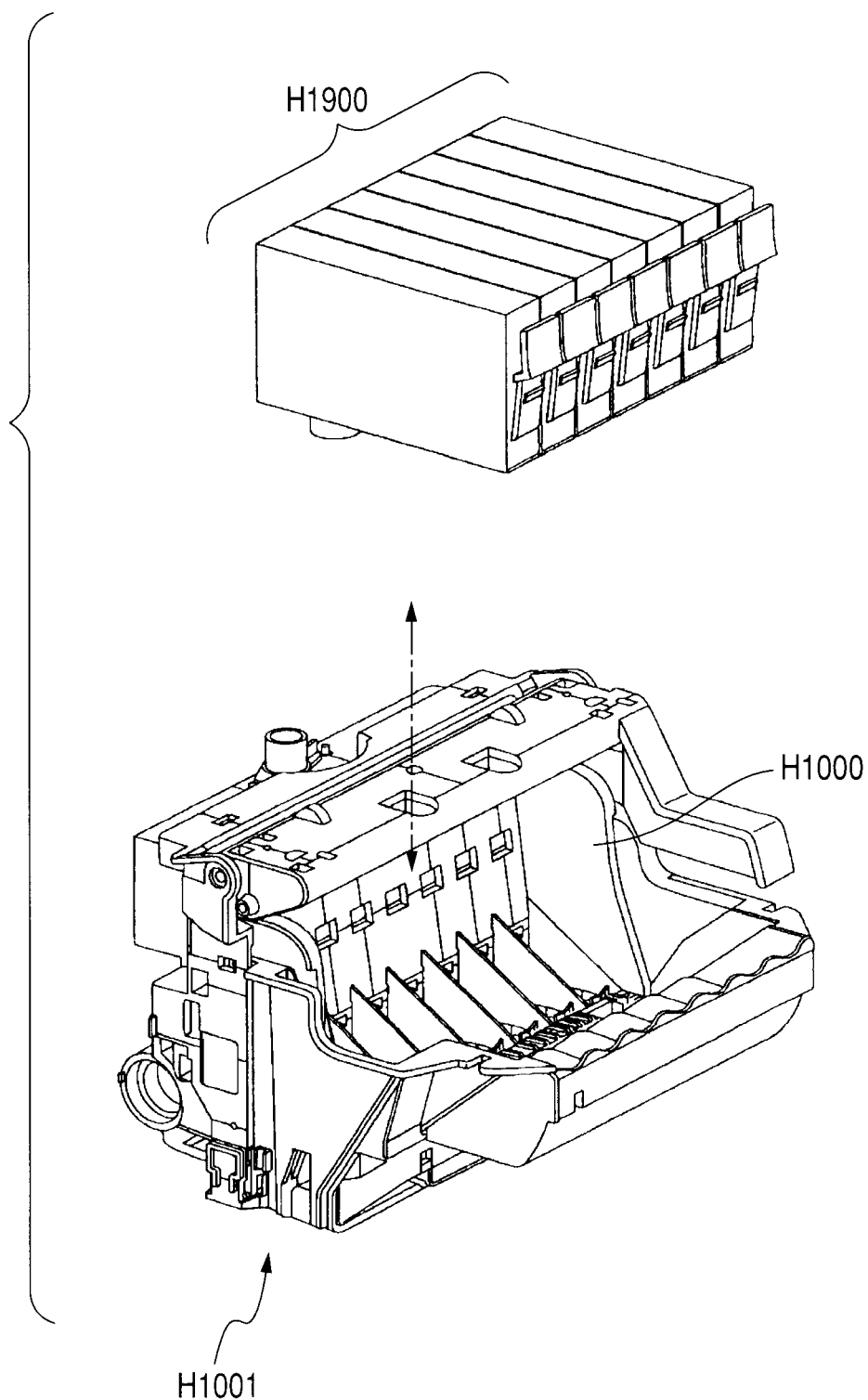
FIG. 5 is a perspective view illustrating a state of attaching an ink cartridge to a head cartridge.

The constitution of a head cartridge H1000 is described. FIG. 5 is a view illustrating the constitution of the head cartridge H1000, and is a view illustrating how ink cartridges H1900 are mounted on the head cartridge H1000. The head cartridge H1000 has the recording head H1001, a unit for mounting the ink cartridges H1900, and a unit for supplying ink from the ink cartridges H1900 to the recording head, and is attachably and detachably mounted on the carriage M4000.

The ink jet recording apparatus records an image with yellow, magenta, cyan, black, pale magenta, pale cyan, and green inks. Therefore, the ink cartridges H1900 are independently prepared for seven colors. It should be noted that the ink of the present invention is used as at least one of the above inks. In addition, as illustrated in FIG. 5, each of the ink cartridges H1900 is attachable and detachable to the head cartridge H1000. It should be noted that the ink cartridges H1900 can be attached and detached in a state where the head cartridge H1000 is mounted on the carriage M4000.

Figure 6:
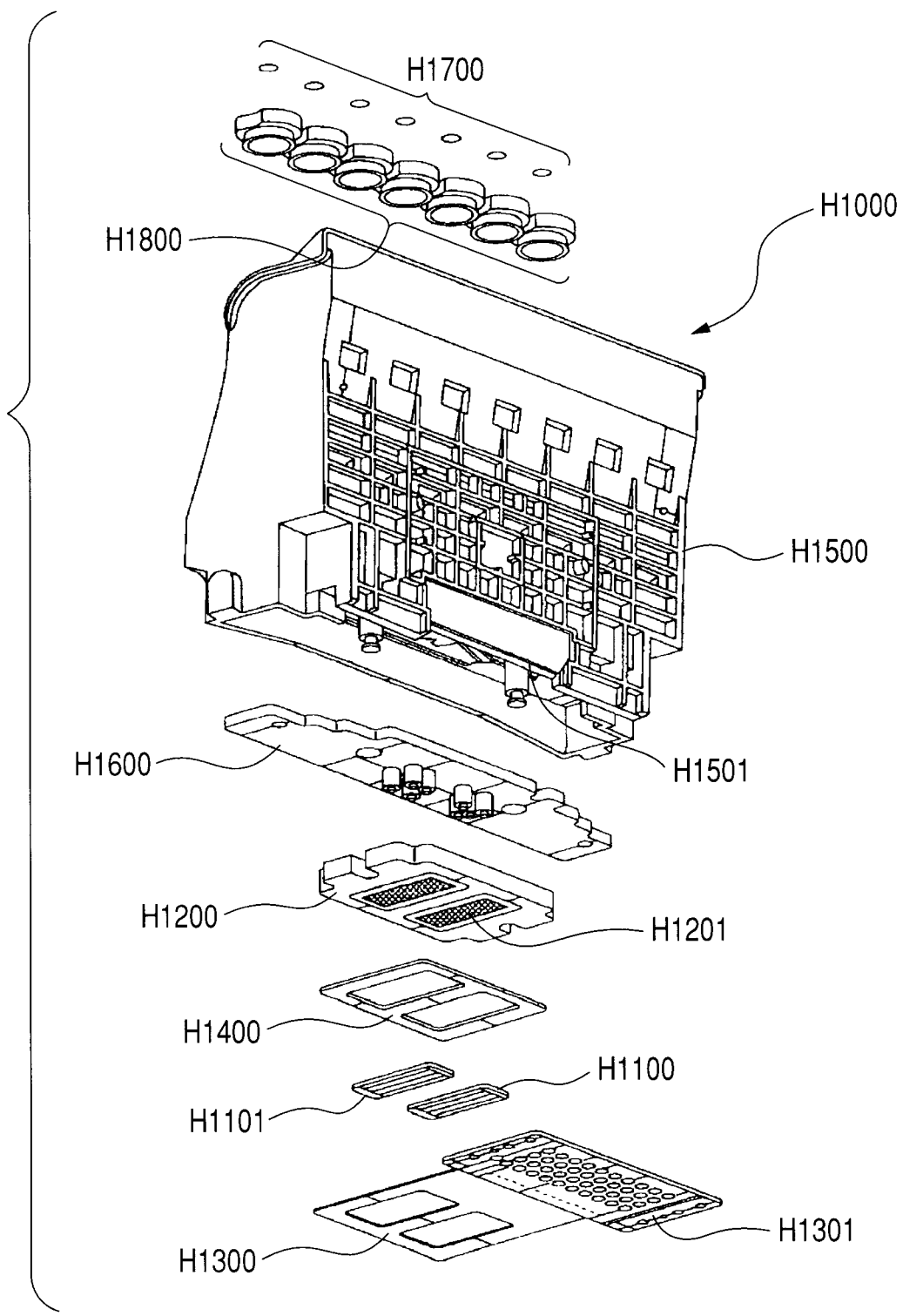
FIG. 6 is an exploded perspective view of the head cartridge.

FIG. 6 is an exploded perspective view of the head cartridge H1000. The head cartridge H1000 is formed of, for example, recording element substrates, plates, an electric wiring substrate H1300, a cartridge holder H1500, a flow path forming member H1600, a filter H1700, and a seal rubber H1800. The recording element substrates are formed of a first recording element substrate H1100 and a second recording element substrate H1101, and the plates are formed of a first plate H1200 and a second plate H1400.

Each of the first recording element substrate H1100 and the second recording element substrate H1101 is an Si substrate having multiple recording elements (nozzles) for ejecting ink formed on one of its surfaces by photolithography. Electric wiring made of Al or the like for supplying power to each recording element is formed by a film formation technique, and multiple ink flow paths corresponding to the individual recording elements are also formed by photolithography. Further, ink supply orifices for supplying ink to the multiple ink flow paths are formed so as to open on the rear surface of each substrate.

Figure 7:
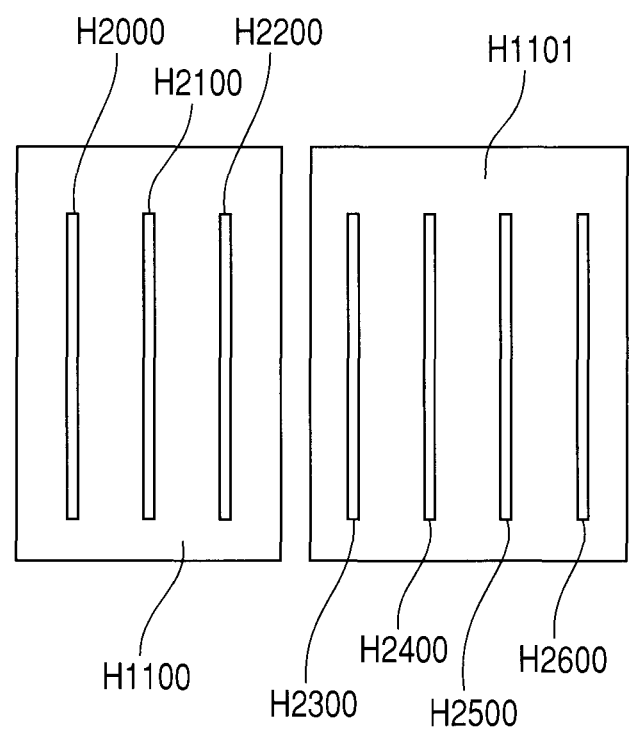
FIG. 7 is a front elevation view illustrating a recording element board in the head cartridge.

FIG. 7 is an enlarged front view for describing the constitution of each of the first recording element substrate H1100 and the second recording element substrate H1101. Reference symbols H2000 to H2600 represent recording element trains (which may hereinafter be referred to as "nozzle trains") corresponding to different ink colors. The first recording element substrate H1100 has nozzle trains for three colors formed in itself: the nozzle train H2000 for the yellow ink, the nozzle train H2100 for the magenta ink, and the nozzle train H2200 for the cyan ink. The second recording element substrate H1101 has nozzle trains for four colors formed in itself: the nozzle train H2300 for the pale cyan ink, the nozzle train H2400 for the black ink, the nozzle train H2500 for the green ink, and the nozzle train H2600 for the pale magenta ink.

Each nozzle train is formed of 768 nozzles arranged at an interval of 1,200 dpi (dot/inch; reference value) in the direction in which a recording medium is conveyed (sub-scanning direction). In addition, each nozzle ejects about 2 pl of ink. Accordingly, an opening area in each ejection orifice is set to about 100 $\mu m^2$.

Hereinafter, description is given with reference to FIGS. 5 and 6. The first recording element substrate H1100 and the second recording element substrate H1101 are bonded and fixed to the first plate H1200. Ink supply orifices H1201 for supplying ink to the first recording element substrate H1100 and the second recording element substrate H1101 are formed in the first plate H1200. Further, the second plate H1400 having openings is bonded and fixed to the first plate H1200. The second plate H1400 holds the electric wiring substrate H1300 so that the electric wiring substrate H1300, the first recording element substrate H1100, and the second recording element substrate H1101 may be electrically connected.

The electric wiring substrate H1300 applies an electrical signal for causing each of the nozzles formed on the first recording element substrate H1100 and the second recording element substrate H1101 to eject ink. The electric wiring substrate H1300 has: electric wiring corresponding to each of the first recording element substrate H1100 and the second recording element substrate H1101; and an external signal input terminal H1301 which is positioned at an end portion of the electric wiring to receive an electrical signal from the ink jet recording apparatus. The external signal input terminal H1301 is positioned and fixed to the back surface side of the cartridge holder H1500.

The flow path forming member H1600 is fixed by, for example, ultrasonic welding to the cartridge holder H1500 that holds the ink cartridges H1900. Thus, an ink flow path H1501 passing from the ink cartridges H1900 to the first plate H1200 is formed. The filter H1700 is provided for an end portion on the ink cartridge side of the ink flow path H1501 engaged with the ink cartridges H1900, so the filter H1700 can prevent dust from entering from the outside to the ink flow path H1501. In addition, the seal rubber H1800 is mounted on the portion at which the ink flow path H1501 is engaged with the ink cartridges H1900 so as to be capable of preventing ink from evaporating from the portion.

Further, as described above, the head cartridge H1000 is formed by connecting a cartridge holder portion and the recording head portion H1001 through bonding or the like. It should be noted that the cartridge holder portion is formed of the cartridge holder H1500, the flow path forming member H1600, the filter H1700, and the seal rubber H1800. In addition, the recording head portion H1001 is formed of the first recording element substrate H1100 and the second recording element substrate H1101, the first plate H1200, the electric wiring substrate H1300, and the second plate H1400.

It should be noted that description has been given here by taking, as an embodiment of a recording head, a recording head according to a thermal ink jet mode that performs recording with an electrothermal transducer (recording element) which generates thermal energy for causing ink to generate film boiling in accordance with an electrical signal. With regard to the representative constitution and principle of the mode, the mode is preferably performed on the basis of basic principles disclosed in, for example, descriptions of U.S. Pat. No. 4,723,129 and U.S. Pat. No. 4,740,796. The mode is applicable to any one of the so-called on-demand type and continuous type recording head.

Particularly effective is the application of the thermal ink jet mode to the on-demand type recording head. In the case of the on-demand type recording head, at least one driving signal which corresponds to recording information and which causes a sudden increase in temperature exceeding nuclear boiling is applied to an electrothermal transducer placed in correspondence with a liquid flow path that holds ink. Thus, the electrothermal transducer is caused to generate thermal energy, and the ink is caused to generate film boiling, whereby an air bubble in the ink can be formed so as to be in one-to-one correspondence with the driving signal. The growth and contraction of the air bubble result in the ejection of the ink through an ejection orifice, whereby at least one droplet is formed. The driving signal is more preferably of a pulse shape because of the following reason: the growth and contraction of an air bubble are performed immediately and properly, so the ejection of the ink particularly excellent in responsiveness can be performed.

In addition, the ink of the present invention can be preferably used in such an ink jet recording apparatus utilizing mechanical energy as described below as well as in an ink jet recording apparatus according to the thermal ink jet mode: the ink jet recording apparatus includes a nozzle forming substrate having multiple nozzles, a pressure generating element which is placed so as to be opposed to the nozzles and which is formed of a piezoelectric material and a conductive material, and ink filling the surroundings of the pressure generating element, and the pressure generating element is displaced by an applied voltage so that the ink may be ejected from each nozzle.

The ink jet recording apparatus is not limited to the apparatus as described above in which a recording head and an ink cartridge are separated, and an apparatus in which the recording head and the ink cartridge are integrated so as to be unseparable may be used as the apparatus. Further, the ink cartridge may be separably or unseparably integrated with the recording head to be mounted on the carriage, or may be provided for a fixing site of the ink jet recording apparatus to supply ink to the recording head through an ink supply member such as a tube. In addition, when the ink cartridge is provided with a constitution for applying a preferable negative pressure to the recording head, for example, the following constitution can be adopted: an absorber is placed in an ink storage portion of the ink cartridge, or the ink cartridge has a flexible ink storage bag and a spring portion that applies, to the bag, a bias in the direction in which the internal volume of the bag is expanded. In addition, the ink jet recording apparatus may adopt such a serial recording mode as described above, or may be in the form of a line printer obtained by aligning recording elements over the range corresponding to the entire width of a recording medium.

EXAMPLES

In the following, the present invention is described in more detail by way of Example, Comparative Examples and Reference Examples. The present invention is not limited to the following Examples unless the gist thereof is surpassed. The terms "part" and "%" are based on the mass standard unless stated otherwise.

<Preparation of the Pigment Dispersion>

(Preparation of Pigment Dispersion A)

At first, 0.58 g of p-aminobenzoic acid was added to a solution in which 2.5 g of concentrated hydrochloric acid was dissolved in 5.5 g of water while cooled to 5° C. Then the container containing this solution was placed in an ice bath and the solution was stirred so as to keep the solution always at or below 10° C. and thereto was added a solution in which 0.9 g of sodium nitrite was dissolved in 9 g of water of 5° C. This solution was stirred for further 15 minutes, and 6 g of carbon black having a specific surface area of 220 $m^2/g$ and DBP oil absorption of 105 mL/100 g was added thereto under stirring. Then the mixture was stirred for further 15 minutes. The resultant slurry was filtered with a filter paper (product name: Standard Filter Paper No. 2 manufactured by Advantec) and then the particles were sufficiently washed with water and dried in an oven of 110° C. to prepare self-dispersion carbon black A. Further, water was added to the self-dispersion carbon black A obtained above to disperse the pigment so that the content of the pigment was 10% and thereby to prepare a dispersion. By the method mentioned above, Pigment Dispersion A was obtained in which the self-dispersion carbon black A having —$C_6H_4$—COONa group introduced into the surface of the carbon black particles was dispersed in water. The functional group density of the self-dispersion carbon black A prepared above was 2.0 $\mu mol/m^2$. Here, the functional group density of the self-dispersion carbon black A was determined by measuring sodium ion concentration in Pigment Dispersion A prepared above with an ion meter (manufactured by DKK) and converting the measured value.

(Preparation of Pigment Dispersion B)

At first, 1.3 g of 4-aminophthalic acid was added to a solution in which 5.0 g of concentrated hydrochloric acid was dissolved in 5.5 g of water while cooled to 5° C. Then the container containing this solution was placed in an ice bath and the solution was stirred so as to keep the solution always at or below 10° C. and thereto was added a solution in which 1.8 g of sodium nitrite was dissolved in 9 g of water of 5° C. This solution was stirred for further 15 minutes, and 6 g of carbon black having a specific surface area of 220 $m^2/g$ and DBP oil absorption of 105 mL/100 g was added thereto under stirring. Then the mixture was stirred for further 15 minutes. The resultant slurry was filtered with a filter paper (product name: Standard Filter Paper No. 2 manufactured by Advantec) and then the particles were sufficiently washed with water and dried in an oven of 110° C. to prepare self-dispersion carbon black B. Further, water was added to the self-dispersion carbon black B obtained above to disperse the pigment so that the content of the pigment was 10% and thereby to prepare a dispersion. By the method mentioned above, Pigment Dispersion B was obtained in which the self-dispersion carbon black B having —$C_6H_3$—$(COONa)_2$ group introduced into the surface of the carbon black particles was dispersed in water. The functional group density of the self-dispersion carbon black B prepared above was 1.4 $\mu mol/m^2$ according to the measurement performed by the same method as in the case of self-dispersion carbon black A and dividing the measured value with the number of the ionizable groups per the atomic group.

(Preparation of Pigment Dispersion C)

At first, 1.4 g of 4-aminophthalic acid was added to a solution in which 5.0 g of concentrated hydrochloric acid was dissolved in 5.5 g of water while cooled to 5° C. Then the container containing this solution was placed in an ice bath and the solution was stirred so as to keep the solution always at or below 10° C. and thereto was added a solution in which 1.8 g of sodium nitrite was dissolved in 9 g of water of 5° C. This solution was stirred for further 15 minutes, and 6 g of carbon black having a specific surface area of 220 m²/g and DBP oil absorption of 105 mL/100 g was added thereto under stirring. Then the mixture was stirred for further 15 minutes. The resultant slurry was filtered with a filter paper (product name: Standard Filter Paper No. 2 manufactured by Advantec) and then the particles were sufficiently washed with water and dried in an oven of 110° C. to prepare self-dispersion carbon black C. Further, water was added to the self-dispersion carbon black C obtained above to disperse the pigment so that the content of the pigment was 10% and thereby to prepare a dispersion. By the method mentioned above, Pigment Dispersion C was obtained in which the self-dispersion carbon black C having —C$_6$H$_3$—(COONa)$_2$ group introduced into the surface of the carbon black particles was dispersed in water. The functional group density of the self-dispersion carbon black C prepared above was 1.5 μmol/m² according to the measurement performed by the same method as in the case of the self-dispersion carbon black A and dividing the measured value with the number of the ionizable groups per the atomic group.

(Preparation of Pigment Dispersion D)

At first, 1.46 g of p-aminobenzoic acid was added to a solution in which 5 g of concentrated hydrochloric acid was dissolved in 5.5 g of water while cooled to 5° C. Then the container containing this solution was placed in an ice bath and the solution was stirred so as to keep the solution always at or below 10° C. and thereto was added a solution in which 1.8 g of sodium nitrite was dissolved in 9 g of water of 5° C. This solution was stirred for further 15 minutes, and 6 g of carbon black having a specific surface area of 220 m²/g and DBP oil absorption of 105 mL/100 g was added thereto under stirring. Then the mixture was stirred for further 15 minutes. The resultant slurry was filtered with a filter paper (product name: Standard Filter Paper No. 2 manufactured by Advantec) and then the particles were sufficiently washed with water and dried in an oven of 110° C. to prepare self-dispersion carbon black D. Further, water was added to the self-dispersion carbon black D obtained above to disperse the pigment so that the content of the pigment was 10% and thereby to prepare a dispersion. By the method mentioned above, Pigment Dispersion D was obtained in which the self-dispersion carbon black D having —C$_6$H$_4$—COONa group introduced into the surface of the carbon black particles was dispersed in water. The functional group density of the self-dispersion carbon black D prepared above was 2.5 μmol/m² according to the measurement performed by the same method as in the case of the self-dispersion carbon black A.

(Preparation of Pigment Dispersion E)

At first, 1.55 g of p-aminobenzoic acid was added to a solution in which 5.0 g of concentrated hydrochloric acid was dissolved in 5.5 g of water while cooled to 5° C. Then the container containing this solution was placed in an ice bath and the solution was stirred so as to keep the solution always at or below 10° C. and thereto was added a solution in which 1.8 g of sodium nitrite was dissolved in 9 g of water of 5° C. This solution was stirred for further 15 minutes, and 6 g of carbon black having a specific surface area of 220 m²/g and DBP oil absorption of 105 mL/100 g was added thereto under stirring. Then the mixture was stirred for further 15 minutes. The resultant slurry was filtered with a filter paper (product name: Standard Filter Paper No. 2 manufactured by Advantec) and then the particles were sufficiently washed with water and dried in an oven of 110° C. to prepare self-dispersion carbon black E. Further, water was added to the self-dispersion carbon black E obtained above to disperse the pigment so that the content of the pigment was 10% and thereby to prepare a dispersion. By the method mentioned above, Pigment Dispersion E was obtained in which the self-dispersion carbon black E having —C$_6$H$_4$—COONa group introduced into the surface of the carbon black particles was dispersed in water. The functional group density of the self-dispersion carbon black E prepared above was 2.6 μmol/m² according to the measurement performed by the same method as in the case of the self-dispersion carbon black A.

(Preparation of Pigment Dispersions 1 to 28)

Ten (10) parts of the pigment, 5 parts of either one of Polymers 1-28 (weight average molecular weight of respective polymer is described in Table 1) obtained by copolymerization of the monomer composition described in Table 1 and 85 parts of ion-exchange water were mixed and dispersed in a batch type vertical sand mill for 3 hours to obtain respective dispersions. After the respective dispersions obtained were subjected to pressurized filtration with a filter (product name: HDCII manufactured by Pall Corporation) with a pore size of 2.5 μm, water was added thereto to prepare Pigment Dispersions 1 to 28 having a pigment content of 10% and a polymer content of 5%, respectively. Here, C. I. Pigment Blue 15:3 was used as the pigment. As each of the above polymers, copolymers were neutralized with a 10% potassium hydroxide aqueous solution and used. The monomers abbreviated in Table 1 indicate the following; St: styrene, α-MSt: α-methylstyrene, BZMA: benzyl methacrylate, nBA: n-butyl acrylate, MMA: methyl methacrylate, MA: methacrylate, AA: acrylic acid.

TABLE 1

Main Properties of Polymer in Pigment Dispersions 1 to 28

| | | Polymer No. in pigment dispersion | Weight average molecular weight of polymer | Compositional (mass) ratio of monomers constituting each polymer | | | | | | |
|---|---|---|---|---|---|---|---|---|---|---|
| | | | | St | α-MSt | BZMA | nBA | MMA | MA | AA |
| Pigment Dispersion: | 1 | Polymer 1 | 5,000 | 28 | | | | 58 | | 14 |
| | 2 | Polymer 2 | 15,000 | 12 | | 72 | | | 16 | |
| | 3 | Polymer 3 | 5,000 | | | 83 | | | | 17 |
| | 4 | Polymer 4 | 5,000 | 18 | | | 68 | | | 14 |
| | 5 | Polymer 5 | 5,000 | 33 | | | 44 | | | 23 |
| | 6 | Polymer 6 | 5,000 | 80 | | | 6 | | | 14 |
| | 7 | Polymer 7 | 6,000 | 18 | | | 68 | | | 14 |

TABLE 1-continued

Main Properties of Polymer in Pigment Dispersions 1 to 28

| Polymer No. in pigment dispersion | Weight average molecular weight of polymer | \multicolumn{7}{c}{Compositional (mass) ratio of monomers constituting each polymer} | | | | | | |
|---|---|---|---|---|---|---|---|---|
| | | St | α-MSt | BZMA | nBA | MMA | MA | AA |
| 8 Polymer 8 | 9,000 | 18 | | | 68 | | | 14 |
| 9 Polymer 9 | 10,000 | 18 | | | 68 | | | 14 |
| 10 Polymer 10 | 5,000 | 72 | | | 15 | | | 13 |
| 11 Polymer 11 | 5,000 | 57 | | | 29 | | | 14 |
| 12 Polymer 12 | 5,000 | 65 | | | 22 | | | 13 |
| 13 Polymer 13 | 5,000 | 7 | | | 69 | | | 24 |
| 14 Polymer 14 | 5,000 | 84 | | | 2 | | | 14 |
| 15 Polymer 15 | 5,000 | 14 | | | 75 | | | 11 |
| 16 Polymer 16 | 5,000 | 39 | | | 36 | | | 25 |
| 17 Polymer 17 | 6,000 | 71 | | 8 | | | | 21 |
| 18 Polymer 18 | 6,000 | 48 | 34 | | | | | 18 |
| 19 Polymer 19 | 6,000 | 40 | 35 | | | | | 25 |
| 20 Polymer 20 | 9,000 | 40 | 35 | | | | | 25 |
| 21 Polymer 21 | 9,000 | 48 | 34 | | | | | 18 |
| 22 Polymer 22 | 6,000 | 82 | | | | | | 18 |
| 23 Polymer 23 | 6,000 | 39 | 36 | | | | | 25 |
| 24 Polymer 24 | 5,000 | 48 | 34 | | | | | 18 |
| 25 Polymer 25 | 10,000 | 48 | 34 | | | | | 18 |
| 26 Polymer 26 | 6,000 | 65 | | 17 | | | | 18 |
| 27 Polymer 27 | 6,000 | 49 | 35 | | | | | 16 |
| 28 Polymer 28 | 6,000 | 70 | | 5 | | | | 25 |

(Preparation of Pigment Dispersion 29)

Ten (10) parts of carbon black, 6 parts of glycerin, 10 parts of a polymer (a dispersing agent) and 74 parts of water were charged in a sand mill (manufactured by Kaneda Scientific Co., Ltd.) 70% filled with zirconia beads of 0.6 mm diameter and dispersed at 1,500 rpm for 5 hours. As the carbon black, carbon black having a specific surface area of 220 m$^2$/g and DBP oil absorption of 130 mL/100 g was used. As the polymer, random copolymer having a copolymer ratio (mass ratio) of styrene, methyl acrylate and acrylic acid in 58:25:17, a weight average molecular weight of 4,000 and an acid value of 130 mgKOH/g was used. The above polymer was supplemented with potassium hydroxide equivalent to the acid value mentioned above and water and stirred at a temperature of 80° C. beforehand and used as an aqueous solution. Then the solution was centrifuged at 5,000 rpm for 10 minutes and aggregated components were removed, and the content of the pigment and the content of the polymer were adjusted with water to 2.5% and 2.5%, respectively to obtain Pigment Dispersion 29.

(Preparation of Pigment Dispersion 30)

Pigment Dispersion 30 having a content of the pigment of 2.5% and a content of the polymer of 2.5% was obtained in the same way as in the preparation of Pigment Dispersion 29 except that C. I. Pigment Blue 15:3, which is a cyan pigment was used in substitution for carbon black.

(Preparation of Pigment Dispersion 31)

Pigment Dispersion 31 having a content of the pigment of 2.5% and a content of the polymer of 2.5% was obtained in the same way as in the preparation of Pigment Dispersion 29 except that C. I. Pigment Red 122, which is a magenta pigment was used in substitution for carbon black.

<Hydrogen Bond Parameter (δh) of Polymer Obtained by the Solubility Parameters of Monomers Constituting the Polymer>

The hydrogen bond parameter (δh) of polymer obtained by the solubility parameters of monomers constituting the polymer was found in the following way. First, the hydrogen bond parameter (δh) of each monomer constituting the subject polymer was obtained by the solubility parameter inherent in each monomer constituting the polymer. Then, the hydrogen bond parameter (δh) of each monomer constituting the polymer obtained above was multiplied by the compositional (mass) ratio of each monomer constituting the polymer (compositional ratio when the sum total is defined as 1) to find respective values. Next, the resulting values were summed up to find the hydrogen bond parameter (δh) of polymer obtained by the solubility parameters of monomers constituting the polymer. In respect of each polymer used in preparing the pigment dispersions, the hydrogen bond parameter (δh) of each monomer that was obtained by the solubility parameter inherent in each monomer constituting the polymer is shown in Table 2.

Taking Polymer 1 as an example, which is a copolymer of styrene, methyl acrylate and acrylic acid (compositional (mass) ratio=28:58:14), it will be specifically explained below how to find the hydrogen bond parameter (δh) of polymer obtained by the solubility parameters of monomers constituting the polymer. As is seen from Table 2 below, the hydrogen bond parameters (the unit is cal$^{0.5}$/cm$^{1.5}$) obtained by the solubility parameters of styrene, methyl acrylate and acrylic acid constituting the Polymer 1 are 0.00, 3.93 and 5.81, respectively. Therefore, the hydrogen bond parameter (δh) of Polymer 1 obtained by the solubility parameters of monomers constituting Polymer 1 is found as shown by the following expression.

"Hydrogen bond parameter (δh) of polymer obtained by the solubility parameters of monomers constituting the polymer"=0.00×0.28+3.93×0.58+5.81×0.14=3.09 cal$^{0.5}$/cm$^{1.5}$.

TABLE 2

Hydrogen Bond Parameter of Each Monomer

| Monomer | | Hydrogen bond parameter ($\delta h$) |
|---|---|---|
| Type | Abbr. | $(cal^{0.5}/cm^{1.5})$ *1 |
| Styrene | St | 0.00 |
| α-Methylstyrene | α-MSt | 0.00 |
| Benzyl methacrylate | BZMA | 3.21 |
| n-Butyl acrylate | nBA | 3.44 |
| Methyl methacrylate | MMA | 3.93 |
| Methacrylate | MA | 5.30 |
| Acrylic acid | AA | 5.81 |

*1: Hydrogen bond parameter ($\delta h$) obtained by the solubility parameter inherent in each monomer.

In respect of the polymers in the pigment dispersions 1-28 prepared beforehand, the values of the hydrogen bond parameter ($\delta h$) of polymer obtained by the solubility parameters of monomers constituting the polymer are shown in Table 3. The values of the acid value and weight average molecular weight of each polymer are also shown in Table 3. Further, Table 3 shows the values of the mass ratio of n-butyl acrylate or α-methylstyrene to styrene in the polymers each having, as monomers, styrene and n-butyl acrylate, or styrene and α-methylstyrene. Here, Polymers 1 to 12 in Table 3 correspond to Polymer A described above and Polymers 13 to 16 are comparative compounds thereof. Polymers 17 to 25 in Table 3 correspond to Polymer B described above and Polymers 2 to 28 are comparative compounds thereof.

TABLE 3

Properties of Polymer in Each Pigment Dispersion

| | | Polymer | Hydrogen bond parameter ($\delta h$) of polymer $(cal^{0.5}/cm^{1.5})$ *1 | Acid value of Polymer (mgKOH/g) | Weight average molecular weight of Polymer | nBA/St *2 | α-MSt/St *3 |
|---|---|---|---|---|---|---|---|
| Pigment Dispersion | 1 | Polymer 1 | 3.09 | 90 | 5,000 | — | — |
| | 2 | Polymer 2 | 3.16 | 90 | 15,000 | — | — |
| | 3 | Polymer 3 | 3.65 | 90 | 5,000 | — | — |
| | 4 | Polymer 4 | 3.15 | 90 | 5,000 | 3.78 | — |
| | 5 | Polymer 5 | 2.85 | 150 | 5,000 | 1.33 | — |
| | 6 | Polymer 6 | 1.02 | 90 | 5,000 | 0.08 | — |
| | 7 | Polymer 7 | 3.15 | 90 | 6,000 | 3.78 | — |
| | 8 | Polymer 8 | 3.15 | 90 | 9,000 | 3.78 | — |
| | 9 | Polymer 9 | 3.15 | 90 | 10,000 | 3.78 | — |
| | 10 | Polymer 10 | 1.27 | 90 | 5,000 | 0.21 | — |
| | 11 | Polymer 11 | 1.81 | 90 | 5,000 | 0.51 | — |
| | 12 | Polymer 12 | 1.51 | 90 | 5,000 | 0.34 | — |
| | 13 | Polymer 13 | 3.77 | 150 | 5,000 | 9.86 | — |
| | 14 | Polymer 14 | 0.88 | 90 | 5,000 | 0.02 | — |
| | 15 | Polymer 15 | 3.22 | 80 | 5,000 | 5.36 | — |
| | 16 | Polymer 16 | 2.69 | 160 | 5,000 | 0.92 | — |
| | 17 | Polymer 17 | 1.48 | 160 | 6,000 | — | — |
| | 18 | Polymer 18 | 1.05 | 160 | 6,000 | — | 0.71 |
| | 19 | Polymer 19 | 1.45 | 200 | 6,000 | — | 0.88 |
| | 20 | Polymer 20 | 1.45 | 200 | 9,000 | — | 0.88 |
| | 21 | Polymer 21 | 1.05 | 160 | 9,000 | — | 0.71 |
| | 22 | Polymer 22 | 1.05 | 160 | 6,000 | — | — |
| | 23 | Polymer 23 | 1.45 | 200 | 6,000 | — | 0.92 |
| | 24 | Polymer 24 | 1.05 | 160 | 5,000 | — | 0.71 |
| | 25 | Polymer 25 | 1.05 | 160 | 10,000 | — | 0.71 |
| | 26 | Polymer 26 | 1.59 | 160 | 6,000 | — | — |
| | 27 | Polymer 27 | 0.93 | 160 | 6,000 | — | 0.71 |
| | 28 | Polymer 28 | 1.61 | 210 | 6,000 | — | — |

*1: Hydrogen bond parameter ($\delta h$) of polymer obtained by the solubility parameters of monomers constituting the polymer.
*2: Mass ratio of n-butyl acrylate to styrene in polymer.
*3: Mass ratio of α-methylstyrene to styrene in polymer.

<Synthesis of Silicone Oil>

Silicone oils, Compounds 1 to 12, were synthesized according to the following Synthesis Examples.

(Compound 1)

Using a container made of glass and provided with a thermometer and a stirring means, Compound 1 was synthesized in the following way. In the container, a polysiloxane compound represented by the following Formula (A) and a polyoxyethylene compound represented by the following Formula (B) as main components were subjected to addition reaction in the presence of a platinum catalyst to synthesize Compound 1. Compound 1 thus obtained corresponded to the silicone oil represented by Formula (1), and was found to have a weight average molecular weight of 8,500, an HLB of 5 (theoretical value) and a solubility in water of 1% or less. The Compound 1 had the structure of m=73, n=6, $R_1$=propylene group, a=8, b=0 and $R_2$=hydrogen atom in the Formula (1).

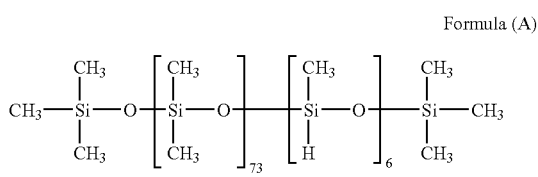

Formula (A)

Formula (B)

(Compound 2)

Using a container made of glass and provided with a thermometer and a stirring means, Compound 2 was synthesized in the following way. In the container, a polysiloxane compound represented by the following Formula (C) and a polyoxyethylene compound represented by the following Formula (D) as main components were subjected to addition reaction in the presence of a platinum catalyst to synthesize Compound 2. Compound 2 thus obtained corresponded to the silicone oil represented by Formula (1), and was found to have a weight average molecular weight of 29,400, an HLB of 5 (theoretical value) and a solubility in water of 1% or less. The Compound 2 had the structure of $m=245$, $n=28$, $R_1$=propylene group, $a=6$, $b=0$ and $R_2$=hydrogen atom in the Formula (1).

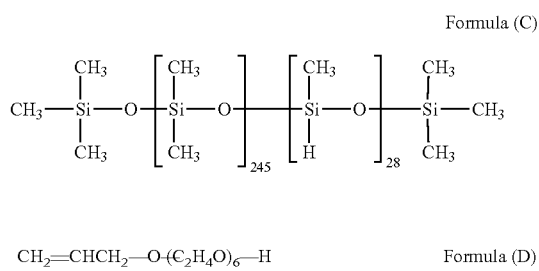

Formula (C)

$$CH_2{=}CHCH_2{-}O{-}(C_2H_4O)_6{-}H$$ Formula (D)

(Compound 3)

Using a container made of glass and provided with a thermometer and a stirring means, Compound 3 was synthesized in the following way. In the container, a polysiloxane compound represented by the following Formula (E) and a polyoxyethylene compound represented by the following Formula (B) as main components were subjected to addition reaction in the presence of a platinum catalyst to synthesize Compound 3. Compound 3 thus obtained was a comparative compound of the silicone oil represented by Formula (1), and was found to have a weight average molecular weight of 7,400, an HLB of 5 (theoretical value) and a solubility in water of 1% or less. The Compound 3 had the structure of $m=65$, $n=5$, $R_1$=propylene group, $a=8$, $b=0$ and $R_2$=hydrogen atom in the Formula (1).

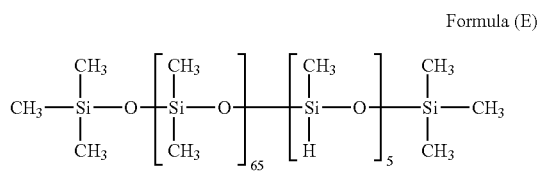

Formula (E)

$$CH_2{=}CHCH_2{-}O{-}(C_2H_4O)_8{-}H$$ Formula (B)

(Compound 4)

Using a container made of glass and provided with a thermometer and a stirring means, Compound 4 was synthesized in the following way. In the container, a polysiloxane compound represented by the following Formula (F) and a polyoxyethylene compound represented by the following Formula (G) as main components were subjected to addition reaction in the presence of a platinum catalyst to synthesize Compound 4. Compound 4 thus obtained corresponded to the silicone oil represented by Formula (2), and was found to have a weight average molecular weight of 47,000, an HLB of 9 (theoretical value) and a solubility in water of 1% or less. The Compound 4 had the structure of $p=349$, $R_3$=hydrogen atom, $R_4$=propylene group, $c=240$ and $d=0$ in the Formula (2).

Formula (F)

$$CH_2{=}CHCH_2{-}O{-}(C_2H_4O)_{240}H$$ Formula (G)

(Compound 5)

Using a container made of glass and provided with a thermometer and a stirring means, Compound 5 was synthesized in the following way. In the container, a polysiloxane compound represented by the following Formula (H) and a polyoxyethylene compound represented by the following Formula (I) as main components were subjected to addition reaction in the presence of a platinum catalyst to synthesize Compound 5. Compound 5 thus obtained was a comparative compound of the silicone oil represented by Formula (2), and was found to have a weight average molecular weight of 7,700, an HLB of 7 (theoretical value) and a solubility in water of 1% or less. The Compound 5 had the structure of $p=64$, $R_3$=hydrogen atom, $R_4$=propylene group, $c=30$ and $d=0$ in the Formula (2).

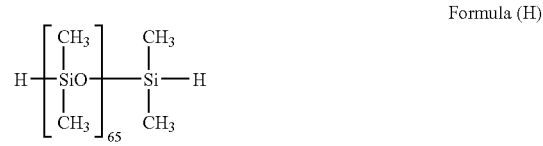

Formula (H)

$$CH_2{=}CHCH_2{-}O{-}(C_2H_4O)_{30}H$$ Formula (I)

(Compound 6)

Using a container made of glass and provided with a thermometer and a stirring means, Compound 6 was synthesized in the following way. In the container, a polysiloxane compound represented by the following Formula (J) and a polyoxyethylene compound represented by the following Formula (K) as main components were subjected to addition reaction in the presence of a platinum catalyst to synthesize Compound 6. Compound 6 thus obtained was a comparative compound of the silicone oil represented by Formula (2), and was found to have a weight average molecular weight of 50,400, an HLB of 7 (theoretical value) and a solubility in water of 1% or less. The Compound 6 had the structure of $p=439$, $R_3$=hydrogen atom, $R_4$=propylene group, $c=200$ and $d=0$ in the Formula (2).

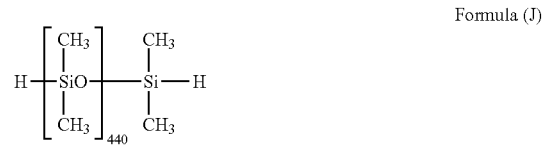

Formula (J)

$$CH_2{=}CHCH_2{-}O{-}(C_2H_4H)_{200}H$$ Formula (K)

(Compound 7)

Using a container made of glass and provided with a thermometer and a stirring means, Compound 7 was synthesized in the following way. In the container, a polysiloxane compound represented by the following Formula (L) and a polyoxyethylene compound represented by the following Formula (M) as main components were subjected to addition reaction in the presence of a platinum catalyst to synthesize Compound 7. Compound 7 thus obtained corresponded to the silicone oil represented by Formula (3), and was found to have a weight average molecular weight of 49,000, an HLB of 6 (theoretical value) and a solubility in water of 1% or less. The Compound 7 had the structure of q=7, $R_5$=propylene group, $R_6$=propylene group, e=6, f=0 and r=52 in the Formula (3).

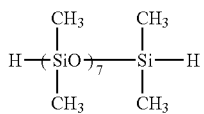
Formula (L)

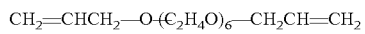
Formula (M)

(Compound 8)

Using a container made of glass and provided with a thermometer and a stirring means, Compound 8 was synthesized in the following way. In the container, a polysiloxane compound represented by the following Formula (N) and a polyoxyethylene compound represented by the following Formula (O) as main components were subjected to addition reaction in the presence of a platinum catalyst to synthesize Compound 8. Compound 8 thus obtained corresponded to the silicone oil represented by Formula (3), and was found to have a weight average molecular weight of 8,800, an HLB of 6 (theoretical value) and a solubility in water of 1% or less. The Compound 8 had the structure of q=23, $R_5$=propylene group, $R_6$=propylene group, e=18, f=0 and r=3 in the Formula (3).

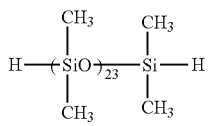
Formula (N)

Formula (O)

(Compound 9)

Using a container made of glass and provided with a thermometer and a stirring means, Compound 9 was synthesized in the following way. In the container, a polysiloxane compound represented by the following Formula (P) and a polyoxyethylene compound represented by the following Formula (O) as main components were subjected to addition reaction in the presence of a platinum catalyst to synthesize Compound 9. Compound 9 thus obtained was a comparative compound of the silicone oil represented by Formula (3), and was found to have a weight average molecular weight of 49,000, an HLB of 7 (theoretical value) and a solubility in water of 1% or less. The Compound 9 had the structure of q=18, $R_5$=propylene group, $R_6$=propylene group, e=18, f=0 and r=21 in the Formula (3).

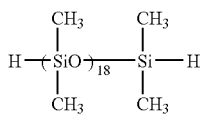
Formula (P)

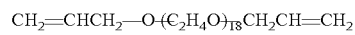
Formula (O)

(Compound 10)

Using a container made of glass and provided with a thermometer and a stirring means, Compound 10 was synthesized in the following way. In the container, a polysiloxane compound represented by the following Formula (Q) and a polyoxyethylene compound represented by the following Formula (O) as main components were subjected to addition reaction in the presence of a platinum catalyst to synthesize Compound 10. Compound 10 thus obtained was a comparative compound of the silicone oil represented by Formula (3), and was found to have a weight average molecular weight of 55,000, an HLB of 6 (theoretical value) and a solubility in water of 1% or less. The Compound 10 had the structure of q=24, $R_5$=propylene group, $R_6$=propylene group, e=18, f=0 and r=20 in the Formula (3).

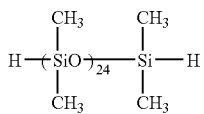
Formula (Q)

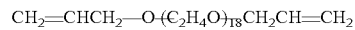
Formula (O)

(Compound 11)

Using a container made of glass and provided with a thermometer and a stirring means, Compound 11 was synthesized in the following way. In the container, a polysiloxane compound represented by the following Formula (R) and a polyoxyethylene compound represented by the following Formula (S) as main components were subjected to addition reaction in the presence of a platinum catalyst to synthesize Compound 11. Compound 11 thus obtained corresponded to the silicone oil represented by Formula (3), and was found to have a weight average molecular weight of 8,800, an HLB of 1 (theoretical value) and a solubility in water of 1% or less. The Compound 11 had the structure of q=16, $R_5$=propylene group, $R_6$=propylene group, e=2, f=0 and r=6 in the Formula (3).

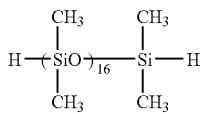
Formula (R)

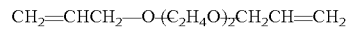
Formula (S)

(Compound 12)

Using a container made of glass and provided with a thermometer and a stirring means, Compound 12 was synthesized in the following way. In the container, a polysiloxane compound represented by the following Formula (T) and a polyoxyethylene compound represented by the following Formula (U) as main components were subjected to addition reaction in the presence of a platinum catalyst to synthesize Compound 12. Compound 12 thus obtained was a comparative compound of the silicone oil represented by Formula (3), and was found to have a weight average molecular weight of 7,800, an HLB of 6 (theoretical value) and a solubility in water of 1% or less. The Compound 12 had the structure of $q=8$, $R_5$=propylene group, $R_6$=propylene group, $e=7$, $f=0$ and $r=7$ in the Formula (3).

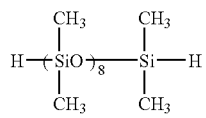

Formula (T)

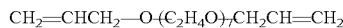

Formula (U)

<Synthesis of Silicone Graft Polymer>

Graft Polymers 1 to 23 serving as silicone graft polymers were each synthesized in accordance with the following procedure. It should be noted that a conventionally known polymerization method can be employed as a method for the synthesis. In the examples, Graft Polymers 1 to 23 were each synthesized by employing the following polymerization method. First, the respective monomers and azobisisobutyronitrile were loaded into a flask provided with a stirring machine, a temperature gauge, and a nitrogen-introducing pipe according to the composition shown in Table 1 below, and the mixture was subjected to a polymerization reaction with 500 parts of 1-methoxy-2-propanol as a solvent under the reflux of a nitrogen gas at a temperature of 110° C. for 4 hours. A solution containing a copolymer thus obtained was dried under reduced pressure, whereby the copolymer was obtained. After 25 parts of methyl ethyl ketone were added as a solvent to dissolve the resultant copolymer, 2 parts of a 30% aqueous solution of potassium hydroxide were added to the solution to neutralize part of the salt-generating groups of the copolymer. Further, 300 parts of ion-exchanged water were added to the mixture, and the whole was stirred. After that, the solvent was removed under reduced pressure at a temperature of 60° C., and furthermore, the residue was concentrated by removing part of water, whereby an aqueous solution of a graft polymer having a solid concentration of 20.0% was obtained. The absolute molecular weight and molecular size of each of Graft Polymers 1 to 23 thus obtained were measured with a combination of a gel permeation chromatography apparatus (manufactured by Shimadzu Corporation) and a multi-angle light scattering detector (manufactured by SHOKO Co.). As a result, in each of the measurements of the graft polymers 1 to 23, the absolute molecular weight and the measured value of the molecular size were largely mutually estranged, and from the structures of the monomers used it was confirmed that each of the graft polymers was of such a structure that a unit having a polysiloxane structure and a nonionic unit branched off from the main chain of the graft polymer to serve as side chains. Here, obtained Graft Polymers 1 to 19 correspond to graft polymer including a nonionic unit and a unit having a polysiloxane structure represented by a General formula (I) described above and Graft Polymers 20 to 23 are comparative compounds thereof.

(*1) to (*6) in Table 4 indicate the following monomers, respectively.

(*1) SILAPLANE FM-0711 (manufactured by CHISSO CORPORATION; a monomer having a polysiloxane structure represented by the general formula (V') with a number-average molecular weight of about 1,000)

(*2) BHEA (product name: manufactured by NIPPON SHOKUBAI CO., LTD.; a nonionic monomer represented by the General formula (I') in which $R_1$ and $R_2$ each represent a hydrogen atom and x represents 1)

(*3) HEMA (product name: manufactured by NIPPON SHOKUBAI CO., LTD.; a nonionic monomer represented by the General formula (I') in which $R_1$ represents a hydrogen atom, $R_2$ represents a methyl group and x represents 1)

(*4) BLEMMER PME-100 (product name: manufactured by NOF Corporation; a nonionic monomer represented by the General formula (I') in which $R_1$ and $R_2$ each represent a methyl group and x represents 2)

(*5) BLEMMER PME-200 (product name: manufactured by NOF Corporation; a nonionic monomer represented by the General formula (I') in which $R_1$ and $R_2$ each represent a methyl group and x represents about 4)

(*6) BLEMMER PME-1000 (product name: manufactured by NOF Corporation; a nonionic monomer represented by the General formula (I') in which $R_1$ and $R_2$ each represent a methyl group and x represents about 23)

TABLE 4

Composition and characteristics of graft polymer

| | | Graft Polymer No. | | | | | | |
|---|---|---|---|---|---|---|---|---|
| | | 1 | 2 | 3 | 4 | 5 | 6 | 7 |
| Monomer [part] | Monomer having polysiloxane structure (*1) | 20.0 | 20.0 | 20.0 | 20.0 | 10.0 | 40.0 | 20.0 |
| | 2-hydroxyethyl acrylate (*2) | 25.0 | | | | | | |
| | 2-hydroxyethyl methacrylate (*3) | 5.0 | 5.0 | 5.0 | 5.0 | 5.0 | 5.0 | 0.8 |
| | Methoxydiethylene glycol monomethacrylate (*4) | | 24.0 | 25.0 | 26.0 | 26.0 | 24.0 | 4.2 |
| | Methoxypolyethylene glycol monomethacrylate (*5) | | | | | | | |
| | Methoxypolyethylene glycol monomethacrylate (*6) | | | | | | | |
| | Acrylic acid | 13.0 | 13.0 | 13.0 | 13.0 | 13.0 | 13.0 | 13.0 |
| | Methyl methacrylate | 19.0 | 19.0 | 19.0 | 18.0 | 23.0 | 9.0 | 30.0 |
| | Butyl methacrylate | 18.0 | 19.0 | 18.0 | 18.0 | 23.0 | 9.0 | 32.0 |
| Polymerization initiator [part] | Azobisisobutyronitrile | 4.0 | 4.0 | 1.5 | 6.0 | 4.0 | 4.0 | 4.0 |
| Characteristics | Weight-average molecular weight | 15,500 | 15,800 | 50,000 | 5,000 | 15,500 | 15,900 | 15,100 |

TABLE 4-continued

Composition and characteristics of graft polymer

| | | | | | | | |
|---|---|---|---|---|---|---|---|
| Acid value [mgKOH/g] | 100 | 99 | 98 | 100 | 98 | 99 | 98 |
| Proportion of unit having polysiloxane structure [%] | 20.0 | 20.0 | 20.0 | 20.0 | 10.0 | 40.0 | 20.0 |
| Proportion of nonionic unit [%] | 30.0 | 29.0 | 30.0 | 31.0 | 31.0 | 29.0 | 5.0 |

| | | Graft Polymer No. | | | | | |
|---|---|---|---|---|---|---|---|
| | | 8 | 9 | 10 | 11 | 12 | 13 |
| Monomer [part] | Monomer having polysiloxane structure (*1) | 20.0 | 20.0 | 20.0 | 50.0 | 20.0 | 20.0 |
| | 2-hydroxyethyl acrylate (*2) | | | | | | |
| | 2-hydroxyethyl methacrylate (*3) | 7.5 | 5.0 | 5.0 | 7.0 | 5.0 | 5.0 |
| | Methoxydiethylene glycol monomethacrylate (*4) | 37.5 | 26.0 | 25.0 | 30.0 | 24.0 | 27.0 |
| | Methoxypolyethylene glycol monomethacrylate (*5) | | | | | | |
| | Methoxypolyethylene glycol monomethacrylate (*6) | | | | | | |
| | Acrylic acid | 13.0 | 10.0 | 22.0 | 13.0 | 13.0 | 13.0 |
| | Methyl methacrylate | 12.0 | 20.0 | 14.0 | | 19.0 | 18.0 |
| | Butyl methacrylate | 10.0 | 19.0 | 14.0 | | 19.0 | 17.0 |
| Polymerization initiator [part] | Azobisisobutyronitrile | 4.0 | 4.0 | 4.0 | 4.0 | 6.5 | 1.0 |
| Characteristics | Weight-average molecular weight | 15,000 | 15,500 | 15,600 | 15,500 | 4,000 | 55,000 |
| | Acid value [mgKOH/g] | 100 | 80 | 150 | 100 | 99 | 102 |
| | Proportion of unit having polysiloxane structure [%] | 20.0 | 20.0 | 20.0 | 50.0 | 20.0 | 20.0 |
| | Proportion of nonionic unit [%] | 45.0 | 31.0 | 30.0 | 37.0 | 29.0 | 32.0 |

| | | Graft Polymer No. | | | | | | |
|---|---|---|---|---|---|---|---|---|
| | | 14 | 15 | 16 | 17 | 18 | 19 | 20 |
| Monomer [part] | Monomer having polysiloxane structure (*1) | 44.0 | 7.0 | 20.0 | 20.0 | 20.0 | 20.0 | 20.0 |
| | 2-hydroxyethyl acrylate (*2) | | | | | | | |
| | 2-hydroxyethyl methacrylate (*3) | 5.0 | 5.0 | 0.7 | 8.0 | 5.0 | 5.0 | |
| | Methoxydiethylene glycol monomethacrylate (*4) | 23.0 | 23.0 | 3.3 | 40.0 | 26.0 | 27.0 | |
| | Methoxypolyethylene glycol monomethacrylate (*5) | | | | | | | |
| | Methoxypolyethylene glycol monomethacrylate (*6) | | | | | | | 30.0 |
| | Acrylic acid | 13.0 | 13.0 | 13.0 | 13.0 | 9.0 | 15.0 | 13.0 |
| | Methyl methacrylate | 8.0 | 26.0 | 31.0 | 10.0 | 20.0 | 16.0 | 19.0 |
| | Butyl methacrylate | 7.0 | 26.0 | 32.0 | 9.0 | 20.0 | 17.0 | 18.0 |
| Polymerization initiator [part] | Azobisisobutyronitrile | 4.0 | 4.0 | 4.0 | 4.0 | 4.0 | 4.0 | 4.0 |
| Characteristics | Weight-average molecular weight | 15,300 | 15,000 | 14,900 | 15,100 | 15,300 | 15,500 | 15,300 |
| | Acid value [mgKOH/g] | 102 | 101 | 99 | 102 | 70 | 160 | 104 |
| | Proportion of unit having polysiloxane structure [%] | 44.0 | 7.0 | 20.0 | 20.0 | 20.0 | 20.0 | 20.0 |
| | Proportion of nonionic unit [%] | 28.0 | 28.0 | 4.0 | 48.0 | 31.0 | 32.0 | 30.0 |

| | | Graft Polymer No. | | |
|---|---|---|---|---|
| | | 21 | 22 | 23 |
| Monomer [part] | Monomer having polysiloxane structure (*1) | | 20.0 | 20.0 |
| | 2-hydroxyethyl acrylate (*2) | | | |
| | 2-hydroxyethyl methacrylate (*3) | | | 5.0 |

TABLE 4-continued

| Composition and characteristics of graft polymer | | | | |
|---|---|---|---|---|
| | | Methoxydiethylene glycol monomethacrylate (*4) | | | 27.0 |
| | | Methoxypolyethylene glycol monomethacrylate (*5) | | | |
| | | Methoxypolyethylene glycol monomethacrylate (*6) | 30.0 | | |
| | | Acrylic acid | 13.0 | 13.0 | 13.0 |
| | | Methyl methacrylate | 19.0 | 33.0 | 28.0 |
| | | Butyl methacrylate | 18.0 | 34.0 | 27.0 |
| | Polymerization initiator [part] | Azobisisobutyronitrile | 4.0 | 4.0 | 4.0 |
| | Characteristics | Weight-average molecular weight | 15,200 | 15,400 | 15,500 |
| | | Acid value [mgKOH/g] | 104 | 97 | 101 |
| | | Proportion of unit having polysiloxane structure [%] | 20.0 | 20.0 | 0.0 |
| | | Proportion of nonionic unit [%] | 29.0 | 0.0 | 32.0 |

<Measurement of Weight Average Molecular Weight>

The weight average molecular weight of each compound obtained as above was measured in the following way. The polymers, silicone oil or silicone graft polymer to be measured was put in tetrahydrofuran (THF) and left standing for several hours to dissolve, preparing a solution so as for the sample to be in a concentration of 0.1 mass %. Thereafter, the solution was filtered with a solvent-resistant membrane filter of 0.45 μm in pore size (trade name: TITAN 2 Syringe Filter, PTFE, 0.45 μm; manufactured by SUN-SRi). Using this sample solution, the weight average molecular weight was measured under the following conditions.

Apparatus: Alliance GPC 2695 (manufactured by Waters Corporation).
Columns: Quaternary column, Shodex KF-806M (manufactured by SHOWA DENKO K.K.).
Mobile phase: Tetrahydrofuran (reagent grade).
Flow rate: 1.0 mL/min.
Oven temperature: 40.0° C.
Injection amount of sample solution: 0.1 mL.
Detector: RI (refractive index).
Polystyrene standard samples: PS-1 and PS-2 (manufactured by Polymer Laboratories Co.) (Molecular weights (17 molecular weights): 7,500,000, 2,560,000, 841,700, 377,400, 320,000, 210,500, 148,000, 96,000, 59,500, 50,400, 28,500, 20,650, 10,850, 5,460, 2,930, 1,300, and 580).

<Preparation of Polymer Aqueous Solution>
(Preparation of Polymer Aqueous Solution A1)

Polymer A1, a random copolymer having a copolymer ratio of styrene, α-methyl styrene and acrylic acid of 72:10:18, a weight average molecular weight of 9,000 and an acid value of 160 mgKOH/g was synthesized by an ordinary method. The obtained Polymer A1 was neutralized with potassium hydroxide equivalent to the acid value mentioned above and the solid content was adjusted with water so that it was 20% and thus a Polymer Aqueous Solution A1 containing Polymer A1 was obtained. The hydrogen bond parameter ($\delta h$) of Polymer A1 obtained by solubility parameters of monomers constituting polymer A1 was $1.046\ cal^{0.5}/cm^{1.5}$.

<Determination Whether the Compound has Adsorptivity to the Self-Dispersion Pigment or Not>

It was determined whether each of the following compounds has adsorptivity to the self-dispersion pigment obtained above or not by the following procedure. Hereinbelow, a polymer and an anti-mold agent not adsorbing to the pigment are referred to as a "free polymer" and a "free anti-mold agent".

(Adsorptivity to Self-Dispersion Pigment of Polymer or Anti-Mold Agent)

At first, the method for determining whether a polymer or an anti-mold agent adsorbs to the self-dispersion pigment is described. Aqueous solutions containing 4.0% of the self-dispersion carbon black A obtained above and 1.0% (value converted to a 20% aqueous solution) of Polymer A1 obtained above or 0.2% of an anti-mold agent (Proxel GXL, manufactured by Avecia was used) were respectively prepared. Next, these aqueous solutions were centrifuged in a condition of 400,000 G for 16 hours and the liquid of the supernatant part was collected. Then, free polymer or free anti-mold agent was collected from each of the obtained liquids by separating from each of the obtained liquids. At this procedure, the free polymer was separated by acid deposition and then the solid content was quantitatively determined whereas the free anti-mold agent was separated by HPLC and then the content was quantitatively determined. Then, in the case of Polymer A1, the free polymer was separated by acid deposition and in the case of anti-mold agent, the free anti-mold agent was separated by HPLC from each of the obtained liquids. Furthermore, in the case of Polymer A1, the obtained free polymer was dried and the content was quantitatively determined. The difference between charged amount of Polymer A1 and the content of the free polymer in the aqueous solution is the content of Polymer A1 adsorbing to the self-dispersion pigment. Here, a minute amount of the pigment was contained in the liquid of the supernatant part collected after centrifugation, but since the pigment was in a very little amount, the polymer solid content obtained by acid deposition in the procedure mentioned above was assumed as the substantial content of free polymer. In the case of the anti-mold agent, the area ratio of the peak attributable to the anti-mold agent for the liquid before and after the centrifugal separation is determined.

The analysis conditions of HPLC are as follows. The aqueous solution before the centrifugal separation or the liquid of the supernatant part after the centrifugal separation were diluted to about 50 times with pure water and analysis by high performance liquid chromatography was performed in the following conditions and the retention time of the main peak and the maximum absorption wavelength of the peak were measured.

Column: Symmetry $C_{18}$ 2.1 mm×150 mm

Column temperature: 40° C.

Flow rate: 0.2 mL/min

PDA: 210 nm to 700 nm

Mobile phase and gradient condition: Table 5

TABLE 5

| Mobile phase and gradient condition | | | |
|---|---|---|---|
| | 0 to 5 minutes | 5 to 40 minutes | 40 to 45 minutes |
| A. Water | 85% | 85% → 0% | 0% |
| B. Methanol | 10% | 10% → 95% | 95% |
| C. 0.02 mol/L Aqueous ammonium acetate solution | 5% | 5% | 5% |

The absorbing amount (mass %) of Polymer A1 and the anti-mold agent measured by the above method was shown in Table 6.

TABLE 6

Adsorption ratio of polymer or anti-mold agent to self-dispersion carbon black A

| Polymer aqueous solution or anti-mold agent added | Content before centrifugal separation (mass %) | Content after centrifugal separation (mass %) | Adsorption ratio to charged amount (mass %) |
|---|---|---|---|
| Polymer aqueous solution A1 | 1.0 (*1) | 0.8 (*1) | 20 |
| Proxel GXL (*2) | 0.2 | 0.15 | 25 |

(*1) Value converted to 20% aqueous solution
(*2) Anti-mold agent(manufactured by Avecia)

(Adsorptivity to Self-Dispersion Pigment of Surfactant or Silicone Oil)

Next, the method for determining whether a surfactant or a silicone oil adsorbs to the self-dispersion pigment is described. At first, liquids [Liquid 1] containing a surfactant or silicone oil described in Table 7 and water in a concentration of 2 mmol/kg for the surfactant or silicone oil were respectively prepared. In addition, liquids [Liquid 2] containing a surfactant or silicone oil described in Table 7, Pigment Dispersions A, B, C, D or E obtained above and water in a concentration of 2 mmol/kg for the surfactant or silicone oil and 4.0% for the self-dispersion pigment were respectively prepared. Specifically, Liquid 1 and Liquid 2 were respectively adjusted by mixing respective components and stirring the mixture at room temperature for about 30 minutes. Here, the self-dispersion pigments used above are self-dispersion carbon black A, B, C, D or E contained in the respective pigment dispersions. The results of measurement of the surface tension for each of Liquid 1 and Liquid 2 described above at room temperature (25° C.) and the difference of the surface tension between Liquid 1 and Liquid 2 are shown in Table 7. The measurement of the surface tension was performed using automatic surface tensiometer CBVP-Z (manufactured by Kyowa Interface Science Co., Ltd). As stated above, when the value of B minus A for the surfactant is larger than the value of B minus A for the modified siloxane compound by 2 or more, it can be determined that the adsorptivity to the self-dispersion pigment of the surfactant is stronger than the adsorptivity to the self-dispersion pigment of the modified siloxane compound.

TABLE 7

Measurement results of surface tension of Liquid 1 and Liquid 2

| | Compound | Surface tension A of Liquid 1 [mN/m] | Surface tension B of Liquid 2 [mN/m] | B − A [mN/m] |
|---|---|---|---|---|
| A | Sodium dodecyl sulfate | 57 | 63 | 6 |
| | Acetylenol E100 | 37 | 45 | 8 |
| | FZ-2104 | 42 | 48 | 6 |
| | BYK333 | 30 | 35 | 5 |
| | FZ-2222 | 40 | 45 | 5 |
| B | Sodium dodecyl sulfate | 57 | 68 | 11 |
| | Acetylenol E100 | 37 | 56 | 19 |
| | FZ-2104 | 42 | 53 | 11 |
| | BYK333 | 30 | 39 | 9 |
| | FZ-2222 | 40 | 48 | 8 |
| C | Sodium dodecyl sulfate | 57 | 66 | 9 |
| | Acetylenol E100 | 37 | 54 | 17 |
| | FZ-2104 | 42 | 51 | 9 |
| | BYK333 | 30 | 37 | 7 |
| | FZ-2222 | 40 | 46 | 6 |
| D | Sodium dodecyl sulfate | 57 | 60 | 3 |
| | Acetylenol E100 | 37 | 41 | 4 |
| | FZ-2104 | 42 | 45 | 3 |
| | BYK333 | 30 | 32 | 2 |
| | FZ-2222 | 40 | 42 | 2 |
| E | Sodium dodecyl sulfate | 57 | 59 | 2 |
| | Acetylenol E100 | 37 | 40 | 3 |
| | FZ-2104 | 42 | 44 | 2 |
| | BYK333 | 30 | 31 | 1 |
| | FZ-2222 | 40 | 41 | 1 |

Sodium dodecyl sulfate (surfactant manufactured by Junsei Chemical Co., Ltd.)
Acetylenol E100 (surfactant manufactured by Kawaken Fine Chemicals Co., Ltd.)
FZ-2104 Silicone oil (manufactured by Dow Corning Toray Co., Ltd.)
BYK 333 Silicone oil (manufactured by BYK Chemie)
FZ-2222 Silicone oil (manufactured by Dow Corning Toray Co., Ltd.)

<Preparation of Ink>

Inks were prepared respectively using respective components shown in the upper section of Tables 8-1 to 8-15 including the pigment dispersions prepared above, polymer aqueous solutions, synthesized or commercially available silicone oils and surfactants. Specifically, respective components shown in the upper section of Tables 8-1 to 8-15 were mixed in compositions shown in the respective tables and sufficiently stirred, and then were subjected to pressurized filtration with a filter (product name: HDCII manufactured by Pall Corporation) with a pore size of 1.2 μm to prepare the respective inks. Characteristics of respective inks are shown in the lower section of Tables 8-1 to 8-15, respectively. Here, MW in Tables 8-2 to 8-15 means a weight average molecular weight. The term "specific water-soluble organic compound" in Tables 8-13 to 8-15 means a water-soluble organic compound of the group consisting of compounds represented by the above general formula (II), the above general formula (III) and the above general formula (IV). In addition, the term "specific graft polymer" in Tables 8-13 to 8-15 means a graft polymer containing a nonionic unit and a unit having a polysiloxane structure represented by the above General formula (I).

[1] In Table 8-1, Inks 2 to 5, 7 and 8 are the first inks used in Example which corresponds to the first ink defined by the present invention whereas Inks 1, 6 and 9 are inks used as the first ink in Comparative Examples out of the above definition.

[2] Inks of the composition shown in Tables 8-2 to 8-14 are inks used as the second inks in Examples, Comparative Examples or Reference Examples. Inks of the composition shown in Tables 8-2 to 8-3 are inks containing a silicone oil represented by Formula (1) above and the above polymer A.

Inks of the composition shown in Table 8-4 are inks containing a silicone oil represented by Formula (1) above or the comparative compounds therefor and the above polymer A or the comparative compounds therefor. Inks of the composition shown in Tables 8-5 to 8-6 are inks containing a silicone oil represented by Formula (2) above and the above polymer A. Inks of the composition shown in Table 8-7 are inks containing a silicone oil represented by Formula (2) above or the comparative compounds therefor and the above polymer A or the comparative compounds therefor. Inks of the composition shown in Tables 8-8 to 8-9 are inks containing a silicone oil represented by Formula (3) above and the above polymer A. Inks of the composition shown in Table 8-10 are inks containing a silicone oil represented by Formula (3) above or the comparative compounds therefor and the above polymer A or the comparative compounds therefor. Inks of the composition shown in Table 8-11 are inks containing a silicone oil represented by Formula (1) above and the above polymer B. Inks of the composition shown in Table 8-12 are inks containing a silicone oil represented by Formula (1) above or the comparative compounds therefor and the above polymer B or the comparative compounds therefor. Inks of the composition shown in Table 8-13 and Table 8-14 are inks containing a graft polymer containing a nonionic unit and a unit having a polysiloxane structure represented by the above General formula (I). Inks of the composition shown in Table 8-15 are inks containing a graft polymer containing a nonionic unit and a unit having a polysiloxane structure represented by the above General formula (I).

TABLE 8-1

Composition of the first ink (Unit of upper section: %)

| | Ink No. | | | | | | | | |
|---|---|---|---|---|---|---|---|---|---|
| | 1 | 2 | 3 | 4 | 5 | 6 | 7 | 8 | 9 |
| Glycerin | 5.0 | 5.0 | 5.0 | 5.0 | 5.0 | 5.0 | 5.0 | 5.0 | 5.0 |
| Polyethylene glycol (*1) | 5.0 | 5.0 | 5.0 | 5.0 | 5.0 | 5.0 | 5.0 | 5.0 | 5.0 |
| Pigment Dispersion A | 40.0 | 40.0 | 40.0 | 40.0 | 40.0 | | | | |
| Pigment Dispersion B | | | | | | 40.0 | | | |
| Pigment Dispersion C | | | | | | | 40.0 | | |
| Pigment Dispersion D | | | | | | | | 40.0 | |
| Pigment Dispersion E | | | | | | | | | 40.0 |
| Polymer aqueous solution A | | 1.0 | | | | | | | |
| Proxel GXL (*2) | | | 0.2 | | | | | | |
| Sodium dodecyl sulfate (*3) | | | | 0.2 | | | | | |
| Acetylenol E100 (*4) | | | | | 0.18 | 0.18 | 0.18 | 0.18 | 0.18 |
| Water | 50.00 | 49.00 | 49.80 | 49.80 | 49.82 | 49.82 | 49.82 | 49.82 | 49.82 |
| Content of pigment P [%] | 4.00 | 4.00 | 4.00 | 4.00 | 4.00 | 4.00 | 4.00 | 4.00 | 4.00 |
| Functional group density on the surface of pigment particles | 2.0 | 2.0 | 2.0 | 2.0 | 2.0 | 1.4 | 1.5 | 2.5 | 2.6 |
| Content of compound adsorptive to self-dispersible pigment A [%] | 0.00 | 0.20 | 0.20 | 0.20 | 0.18 | 0.18 | 0.18 | 0.18 | 0.18 |
| Value of A/P | 0.000 | 0.050 | 0.050 | 0.050 | 0.045 | 0.045 | 0.045 | 0.045 | 0.045 |

(*1) Average molecular weight 1000
(*2) Anti-mold agent (manufactured by Avecia)
(*3) Surfactant manufactured by Junsei Chemical Co., Ltd.
(*4) Surfactant manufactured by Kawaken Fine Chemicals Co., Ltd.

TABLE 8-2

Composition of the second ink (Unit of upper section: %)

| | Ink No. | | | | | | | | | | | | | | |
|---|---|---|---|---|---|---|---|---|---|---|---|---|---|---|---|
| | 10 | 11 | 12 | 13 | 14 | 15 | 16 | 17 | 18 | 19 | 20 | 21 | 22 | 23 | 24 |
| Glycerin | 5.0 | 5.0 | 5.0 | 5.0 | 5.0 | 5.0 | 5.0 | 5.0 | 5.0 | 5.0 | 5.0 | 5.0 | 5.0 | 5.0 | 5.0 |
| Diethylene glycol | 5.0 | 5.0 | 5.0 | 5.0 | 5.0 | 5.0 | 5.0 | 5.0 | 5.0 | 5.0 | 5.0 | 5.0 | 5.0 | 5.0 | 5.0 |
| Polyethylene glycol (Average molecular weight 1,000) | 5.0 | 5.0 | 5.0 | 5.0 | 5.0 | 5.0 | 5.0 | 5.0 | 5.0 | 5.0 | 5.0 | 5.0 | 5.0 | 5.0 | 5.0 |
| Pigment Dispersion 1 | 28.0 | 28.0 | 28.0 | 28.0 | 28.0 | 28.0 | 28.0 | 28.0 | 28.0 | 28.0 | 28.0 | 28.0 | 28.0 | 30.0 | 30.0 |
| Polymer 11 | 2.6 | 2.6 | 2.6 | 2.6 | 2.6 | 2.6 | 2.6 | 2.6 | 2.6 | 2.6 | 1.1 | 1.0 | 2.8 | 1.8 | 2.1 |
| FZ-2104 (manufactured by Dow Corning Toray Co., Ltd.) (MW20,600/HLB9) | 0.5 | | | | | | | | | | | 0.5 | 0.5 | 0.5 | 0.5 | 0.5 |
| FZ-2130 (manufactured by Dow Corning Toray Co., Ltd.) (MW21,500/HLB7) | | 0.5 | | | | | | | | | 0.4 | | | | |
| FZ-2191 (manufactured by Dow Corning Toray Co., Ltd.) (MW18,000/HLB5) | | | 0.5 | | | | | | | | | | | | |
| KF-615A (manufactured by Shin-Etsu Chemical Co., Ltd.) | | | | 0.5 | | | | 2.9 | 3.0 | | | | | | |

TABLE 8-2-continued

| | Composition of the second ink | | | | | | | | | | | | | | |
|---|---|---|---|---|---|---|---|---|---|---|---|---|---|---|---|
| | Ink No. | | | | | | | | | | | | | | (Unit of upper section: %) |
| | 10 | 11 | 12 | 13 | 14 | 15 | 16 | 17 | 18 | 19 | 20 | 21 | 22 | 23 | 24 |
| (MW18,000/HLB10) TSF4452 (manufactured by Momentive Performance Materials Japan Inc.) | | | | | 0.5 | | | | | | | | | | |
| (MW26,000/HLB11) Compound 1 | | | | | | 0.5 | | | | | | | | | |
| (MW8,500/HLB5) Compound 2 | | | | | | | 0.5 | | | | | | | | |
| (MW29,400/HLB5) Water | 53.9 | 53.9 | 53.9 | 53.9 | 53.9 | 53.9 | 53.9 | 51.5 | 51.4 | 54.0 | 55.4 | 55.5 | 53.7 | 52.7 | 52.4 |
| Content of pigment (% by mass) | 2.8 | 2.8 | 2.8 | 2.8 | 2.8 | 2.8 | 2.8 | 2.8 | 2.8 | 2.8 | 2.8 | 2.8 | 2.8 | 3.0 | 3.0 |
| Content of polymer (% by mass) | 4.0 | 4.0 | 4.0 | 4.0 | 4.0 | 4.0 | 4.0 | 4.0 | 4.0 | 4.0 | 2.5 | 2.4 | 4.2 | 3.3 | 3.6 |
| Polymer/pigment (ratio) | 1.4 | 1.4 | 1.4 | 1.4 | 1.4 | 1.4 | 1.4 | 1.4 | 1.4 | 1.4 | 0.89 | 0.86 | 1.5 | 1.1 | 1.2 |

TABLE 8-3

| | Composition of the second ink | | | | | | | | | | |
|---|---|---|---|---|---|---|---|---|---|---|---|
| | Ink No. | | | | | | | | | | (Unit of upper section: %) |
| | 25 | 26 | 27 | 28 | 29 | 30 | 31 | 32 | 33 | 34 | 35 |
| Glycerin | 5.0 | 5.0 | 5.0 | 5.0 | 5.0 | 5.0 | 5.0 | 5.0 | 5.0 | 5.0 | 5.0 |
| Diethylene glycol | 5.0 | 5.0 | 5.0 | 5.0 | 5.0 | 5.0 | 5.0 | 5.0 | 5.0 | 5.0 | 5.0 |
| Polyethylene glycol (Average molecular weight 1,000) | 5.0 | 5.0 | 5.0 | 5.0 | 5.0 | 5.0 | 5.0 | 5.0 | 5.0 | 5.0 | 5.0 |
| Pigment Dispersion 1 | 28.0 | | | | | | | | | | |
| Pigment Dispersion 2 | | 28.0 | | | | | | | | | |
| Pigment Dispersion 3 | | | 28.0 | | | | | | | | |
| Pigment Dispersion 4 | | | | 28.0 | | | | | | | |
| Pigment Dispersion 5 | | | | | 28.0 | | | | | | |
| Pigment Dispersion 6 | | | | | | 28.0 | | | | | |
| Pigment Dispersion 7 | | | | | | | 28.0 | | | | |
| Pigment Dispersion 8 | | | | | | | | 28.0 | | | |
| Pigment Dispersion 9 | | | | | | | | | 28.0 | | |
| Pigment Dispersion 10 | | | | | | | | | | 28.0 | |
| Pigment Dispersion 12 | | | | | | | | | | | 28.0 |
| Polymer 1 | 2.6 | | | | | | | | | | |
| Polymer 2 | | 2.6 | | | | | | | | | |
| Polymer 3 | | | 2.6 | | | | | | | | |
| Polymer 4 | | | | 2.6 | | | | | | | |
| Polymer 5 | | | | | 2.6 | | | | | | |
| Polymer 6 | | | | | | 2.6 | | | | | |
| Polymer 7 | | | | | | | 2.6 | | | | |
| Polymer 8 | | | | | | | | 2.6 | | | |
| Polymer 9 | | | | | | | | | 2.6 | | |
| Polymer 10 | | | | | | | | | | 2.6 | |
| Polymer 12 | | | | | | | | | | | 2.6 |
| FZ-2104 (manufactured by Dow Corning Toray Co., Ltd.) (MW20,600/HLB9) | 0.5 | 0.5 | 0.5 | 0.5 | 0.5 | 0.5 | 0.5 | 0.5 | 0.5 | 0.5 | 0.5 |
| Water | 53.9 | 53.9 | 53.9 | 53.9 | 53.9 | 53.9 | 53.9 | 53.9 | 53.9 | 53.9 | 53.9 |
| Content of pigment (% by mass) | 2.8 | 2.8 | 2.8 | 2.8 | 2.8 | 2.8 | 2.8 | 2.8 | 2.8 | 2.8 | 2.8 |
| Content of polymer (% by mass) | 4.0 | 4.0 | 4.0 | 4.0 | 4.0 | 4.0 | 4.0 | 4.0 | 4.0 | 4.0 | 4.0 |
| Polymer/pigment (ratio) | 1.4 | 1.4 | 1.4 | 1.4 | 1.4 | 1.4 | 1.4 | 1.4 | 1.4 | 1.4 | 1.4 |

TABLE 8-4

Composition of the first ink (Unit of upper section: %)

| | Ink No. | | | | | | | |
|---|---|---|---|---|---|---|---|---|
| | 36 | 37 | 38 | 39 | 40 | 41 | 42 | 43 |
| Glycerin | 5.0 | 5.0 | 5.0 | 5.0 | 5.0 | 5.0 | 5.0 | 5.0 |
| Diethylene glycol | 5.0 | 5.0 | 5.0 | 5.0 | 5.0 | 5.0 | 5.0 | 5.0 |
| Polyethylene glycol (Average molecular weight 1,000) | 5.0 | 5.0 | 5.0 | 5.0 | 5.0 | 5.0 | 5.0 | 5.0 |
| Pigment Dispersion 11 | 28.0 | 28.0 | 28.0 | 28.0 | | | | |
| Pigment Dispersion 13 | | | | | 28.0 | | | |
| Pigment Dispersion 14 | | | | | | | 28.0 | |
| Pigment Dispersion 15 | | | | | | | | 28.0 |
| Pigment Dispersion 16 | | | | | | 28.0 | | |
| Polymer 11 | 2.6 | 2.6 | 2.6 | 2.6 | | | | |
| Polymer 13 | | | | | 2.6 | | | |
| Polymer 14 | | | | | | | 2.6 | |
| Polymer 15 | | | | | | | | 2.6 |
| Polymer 16 | | | | | | 2.6 | | |
| FZ-2104 (manufactured by Dow Corning Toray Co., Ltd.) (MW20,600/HLB9) | | | | | 0.5 | 0.5 | 0.5 | 0.5 |
| FZ-2110 (manufactured by Dow Corning Toray Co., Ltd.) (MW7,200/HLB1) | 0.5 | | | | | | | |
| FZ-2162 (manufactured by Dow Corning Toray Co., Ltd.) (MW4,300/HLB15) | | 0.5 | | | | | | |
| KF-354L (manufactured by Shin-Etsu Chemical Co., Ltd.) | | | 0.5 | | | | | |
| Compound 3 (MW7,400/HLB5) | | | | 0.5 | | | | |
| Water | 53.9 | 53.9 | 53.9 | 53.9 | 53.9 | 53.9 | 53.9 | 53.9 |
| Content of pigment (% by mass) | 2.8 | 2.8 | 2.8 | 2.8 | 2.8 | 2.8 | 2.8 | 2.8 |
| Content of polymer (% by mass) | 4.0 | 4.0 | 4.0 | 4.0 | 4.0 | 4.0 | 4.0 | 4.0 |
| Polymer/pigment (ratio) | 1.4 | 1.4 | 1.4 | 1.4 | 1.4 | 1.4 | 1.4 | 1.4 |

TABLE 8-5

Composition of the second ink (Unit of upper section: %)

| | Ink No. | | | | | | | | | | |
|---|---|---|---|---|---|---|---|---|---|---|---|
| | 44 | 45 | 46 | 47 | 48 | 49 | 50 | 51 | 52 | 53 | 54 |
| Glycerin | 5.0 | 5.0 | 5.0 | 5.0 | 5.0 | 5.0 | 5.0 | 5.0 | 5.0 | 5.0 | 5.0 |
| Diethylene glycol | 5.0 | 5.0 | 5.0 | 5.0 | 5.0 | 5.0 | 5.0 | 5.0 | 5.0 | 5.0 | 5.0 |
| Polyethylene glycol (Average molecular weight 1,000) | 5.0 | 5.0 | 5.0 | 5.0 | 5.0 | 5.0 | 5.0 | 5.0 | 5.0 | 5.0 | 5.0 |
| Pigment Dispersion 11 | 28.0 | 28.0 | 28.0 | 28.0 | 28.0 | 28.0 | 28.0 | 28.0 | 28.0 | 30.0 | 30.0 |
| Polymer 11 | 2.6 | 2.6 | 2.6 | 2.6 | 2.6 | 2.6 | 1.1 | 1.0 | 2.8 | 1.8 | 2.1 |
| BYK333 (manufactured by BYK Chemie.) (MW8,000/HLB10) | 0.5 | | 2.9 | 3.0 | 0.4 | 1.0 | 2.9 | 2.9 | 1.0 | 1.0 | 1.0 |
| Compound 4 (MW47,000/HLB9) | | 0.5 | | | | | | | | | |
| Water | 53.9 | 53.9 | 51.5 | 51.4 | 54.0 | 53.4 | 53.0 | 53.1 | 53.2 | 52.2 | 51.9 |
| Content of pigment (% by mass) | 2.8 | 2.8 | 2.8 | 2.8 | 2.8 | 2.8 | 2.8 | 2.8 | 2.8 | 3.0 | 3.0 |
| Content of polymer (% by mass) | 4.0 | 4.0 | 4.0 | 4.0 | 4.0 | 4.0 | 2.5 | 2.4 | 4.2 | 3.3 | 3.6 |
| Polymer/pigment (ratio) | 1.4 | 1.4 | 1.4 | 1.4 | 1.4 | 1.4 | 0.89 | 0.86 | 1.5 | 1.1 | 1.2 |

TABLE 8-6

Composition of the second ink (Unit of upper section: %)

| | Ink No. | | | | | | | | | | |
|---|---|---|---|---|---|---|---|---|---|---|---|
| | 55 | 56 | 57 | 58 | 59 | 60 | 61 | 62 | 63 | 64 | 65 |
| Glycerin | 5.0 | 5.0 | 5.0 | 5.0 | 5.0 | 5.0 | 5.0 | 5.0 | 5.0 | 5.0 | 5.0 |
| Diethylene glycol | 5.0 | 5.0 | 5.0 | 5.0 | 5.0 | 5.0 | 5.0 | 5.0 | 5.0 | 5.0 | 5.0 |
| Polyethylene glycol (Average molecular weight 1,000) | 5.0 | 5.0 | 5.0 | 5.0 | 5.0 | 5.0 | 5.0 | 5.0 | 5.0 | 5.0 | 5.0 |
| Pigment Dispersion 1 | 28.0 | | | | | | | | | | |
| Pigment Dispersion 2 | | 28.0 | | | | | | | | | |
| Pigment Dispersion 3 | | | 28.0 | | | | | | | | |
| Pigment Dispersion 4 | | | | 28.0 | | | | | | | |
| Pigment Dispersion 5 | | | | | 28.0 | | | | | | |
| Pigment Dispersion 6 | | | | | | 28.0 | | | | | |
| Pigment Dispersion 7 | | | | | | | 28.0 | | | | |
| Pigment Dispersion 8 | | | | | | | | 28.0 | | | |
| Pigment Dispersion 9 | | | | | | | | | 28.0 | | |
| Pigment Dispersion 10 | | | | | | | | | | 28.0 | |
| Pigment Dispersion 12 | | | | | | | | | | | 28.0 |
| Polymer 1 | 2.6 | | | | | | | | | | |
| Polymer 2 | | 2.6 | | | | | | | | | |
| Polymer 3 | | | 2.6 | | | | | | | | |
| Polymer 4 | | | | 2.6 | | | | | | | |
| Polymer 5 | | | | | 2.6 | | | | | | |
| Polymer 6 | | | | | | 2.6 | | | | | |
| Polymer 7 | | | | | | | 2.6 | | | | |
| Polymer 8 | | | | | | | | 2.6 | | | |
| Polymer 9 | | | | | | | | | 2.6 | | |
| Polymer 10 | | | | | | | | | | 2.6 | |
| Polymer 12 | | | | | | | | | | | 2.6 |
| BYK333 (manufactured by BYK Chemie) (MW8,000/HLB10) | 1.0 | 1.0 | 1.0 | 1.0 | 1.0 | 1.0 | 1.0 | 1.0 | 1.0 | 1.0 | 1.0 |
| Water | 53.4 | 53.4 | 53.4 | 53.4 | 53.4 | 53.4 | 53.4 | 53.4 | 53.4 | 53.4 | 53.4 |
| Content of pigment (% by mass) | 2.8 | 2.8 | 2.8 | 2.8 | 2.8 | 2.8 | 2.8 | 2.8 | 2.8 | 2.8 | 2.8 |
| Content of polymer (% by mass) | 4.0 | 4.0 | 4.0 | 4.0 | 4.0 | 4.0 | 4.0 | 4.0 | 4.0 | 4.0 | 4.0 |
| Polymer/pigment (ratio) | 1.4 | 1.4 | 1.4 | 1.4 | 1.4 | 1.4 | 1.4 | 1.4 | 1.4 | 1.4 | 1.4 |

TABLE 8-7

Composition of the second ink (Unit of upper section: %)

| | Ink No. | | | | | | |
|---|---|---|---|---|---|---|---|
| | 66 | 67 | 68 | 69 | 70 | 71 | 72 |
| Glycerin | 5.0 | 5.0 | 5.0 | 5.0 | 5.0 | 5.0 | 5.0 |
| Diethylene glycol | 5.0 | 5.0 | 5.0 | 5.0 | 5.0 | 5.0 | 5.0 |
| Polyethylene glycol (Average molecular weight 1,000) | 5.0 | 5.0 | 5.0 | 5.0 | 5.0 | 5.0 | 5.0 |
| Pigment Dispersion 11 | 28.0 | 28.0 | 28.0 | | | | |
| Pigment Dispersion 13 | | | | 28.0 | | | |
| Pigment Dispersion 14 | | | | | 28.0 | | |
| Pigment Dispersion 15 | | | | | | 28.0 | |
| Pigment Dispersion 16 | | | | 28.0 | | | |
| Polymer 11 | 2.6 | 2.6 | 2.6 | | | | |
| Polymer 13 | | | | 2.6 | | | |
| Polymer 14 | | | | | 2.6 | | |
| Polymer 15 | | | | | | 2.6 | |
| Polymer 16 | | | 2.6 | | | | |
| BYK333 (manufactured by BYK Chemie) (MW8,000/HLB10) | | 1.0 | 1.0 | 1.0 | 1.0 | | |
| X-22-4272 (manufactured by Shin-Etsu Chemical Co., Ltd) (molecular weight 4,200/HLB7) | 0.5 | | | | | | |
| Compound 5 (MW7,700/HLB7) | | 0.5 | | | | | |
| Compound 6 (MW50,400/HLB7) | | | 0.5 | | | | |
| Water | 53.9 | 53.9 | 53.9 | 53.4 | 53.4 | 53.4 | 53.4 |
| Content of pigment (% by mass) | 2.8 | 2.8 | 2.8 | 2.8 | 2.8 | 2.8 | 2.8 |
| Content of polymer (% by mass) | 4.0 | 4.0 | 4.0 | 4.0 | 4.0 | 4.0 | 4.0 |
| Polymer/pigment (ratio) | 1.4 | 1.4 | 1.4 | 1.4 | 1.4 | 1.4 | 1.4 |

TABLE 8-8

Composition of the second ink (Unit of upper section: %)

| | Ink No. | | | | | | | | | | | | |
|---|---|---|---|---|---|---|---|---|---|---|---|---|---|
| | 73 | 74 | 75 | 76 | 77 | 78 | 79 | 80 | 81 | 82 | 83 | 84 | 85 |
| Glycerin | 5.0 | 5.0 | 5.0 | 5.0 | 5.0 | | | 5.0 | 5.0 | 5.0 | 5.0 | 5.0 | 5.0 |
| Diethylene glycol | 5.0 | 5.0 | 5.0 | 5.0 | 5.0 | 5.0 | 5.0 | 5.0 | 5.0 | 5.0 | 5.0 | 5.0 | 5.0 |
| Polyethylene glycol (Average molecular weight 1,000) | 5.0 | 5.0 | 5.0 | 5.0 | 5.0 | 5.0 | 5.0 | 5.0 | 5.0 | 5.0 | 5.0 | 5.0 | 5.0 |
| 2-Pyrrolidone | | | | | | 10.0 | 10.0 | | | | | | |
| Pigment Dispersion 11 | 28.0 | 28.0 | 28.0 | 28.0 | 28.0 | 28.0 | 28.0 | 28.0 | 28.0 | 28.0 | 28.0 | 30.0 | 30.0 |
| Polymer 11 | 2.6 | 2.6 | 2.6 | 2.6 | 2.6 | 2.6 | 2.6 | 2.6 | 1.1 | 1.0 | 2.8 | 1.8 | 2.1 |
| FZ-2203 (manufactured by Dow Corning Toray Co., Ltd.) (MW33,400/HLB1) | 0.5 | | | | | | | | | | | | |
| FZ-2207 (manufactured by Dow Corning Toray Co., Ltd.) (MW29,300/HLB3) | | 0.5 | | | | | | | 0.5 | 0.5 | | | |
| FZ-2222 (manufactured by Dow Corning Toray Co., Ltd.) (MW27,400/HLB5) | | | 0.5 | | | 2.9 | 3.0 | 0.4 | | | 0.5 | 0.5 | 0.5 |
| FZ-2231 (manufactured by Dow Corning Toray Co., Ltd.) (MW29,200/HLB3) | | | | 0.5 | | | | | | | | | |
| Compound 7 (MW49,000/HLB6) | | | | | 0.5 | | | | | | | | |
| Water | 53.9 | 53.9 | 53.9 | 53.9 | 53.9 | 46.5 | 46.4 | 54.0 | 55.4 | 55.5 | 53.7 | 52.7 | 52.4 |
| Content of pigment (% by mass) | 2.8 | 2.8 | 2.8 | 2.8 | 2.8 | 2.8 | 2.8 | 2.8 | 2.8 | 2.8 | 2.8 | 3.0 | 3.0 |
| Content of polymer (% by mass) | 4.0 | 4.0 | 4.0 | 4.0 | 4.0 | 4.0 | 4.0 | 4.0 | 2.5 | 2.4 | 4.2 | 3.3 | 3.6 |
| Polymer/pigment (ratio) | 1.4 | 1.4 | 1.4 | 1.4 | 1.4 | 1.4 | 1.4 | 1.4 | 0.89 | 0.86 | 1.5 | 1.1 | 1.2 |

TABLE 8-9

Composition of the second ink (Unit of upper section: %)

| | Ink No. | | | | | | | | | | | | |
|---|---|---|---|---|---|---|---|---|---|---|---|---|---|
| | 86 | 87 | 88 | 89 | 90 | 91 | 92 | 93 | 94 | 95 | 96 | 97 | 98 |
| Glycerin | 5.0 | 5.0 | 5.0 | 5.0 | 5.0 | 5.0 | 5.0 | 5.0 | 5.0 | 5.0 | 5.0 | 5.0 | 5.0 |
| Diethylene glycol | 5.0 | 5.0 | 5.0 | 5.0 | 5.0 | 5.0 | 5.0 | 5.0 | 5.0 | 5.0 | 5.0 | 5.0 | 5.0 |
| Polyethylene glycol (Average molecular weight 1,000) | 5.0 | 5.0 | 5.0 | 5.0 | 5.0 | 5.0 | 5.0 | 5.0 | 5.0 | 5.0 | 5.0 | 5.0 | 5.0 |
| Pigment Dispersion 1 | 28.0 | | | | | | | | | | | | |
| Pigment Dispersion 2 | | 28.0 | | | | | | | | | | | |
| Pigment Dispersion 3 | | | 28.0 | | | | | | | | | | |
| Pigment Dispersion 4 | | | | 28.0 | | | | | | | | | |
| Pigment Dispersion 5 | | | | | 28.0 | | | | | | | | |
| Pigment Dispersion 6 | | | | | | 28.0 | | | | | | | |
| Pigment Dispersion 7 | | | | | | | 28.0 | | | | | | |
| Pigment Dispersion 8 | | | | | | | | 28.0 | | | | | |
| Pigment Dispersion 9 | | | | | | | | | 28.0 | | | | |
| Pigment Dispersion 10 | | | | | | | | | | 28.0 | | | |
| Pigment Dispersion 11 | | | | | | | | | | | | 28.0 | 28.0 |
| Pigment Dispersion 12 | | | | | | | | | | | 28.0 | | |
| Polymer 1 | 2.6 | | | | | | | | | | | | |
| Polymer 2 | | 2.6 | | | | | | | | | | | |
| Polymer 3 | | | 2.6 | | | | | | | | | | |
| Polymer 4 | | | | 2.6 | | | | | | | | | |
| Polymer 5 | | | | | 2.6 | | | | | | | | |
| Polymer 6 | | | | | | 2.6 | | | | | | | |
| Polymer 7 | | | | | | | 2.6 | | | | | | |
| Polymer 8 | | | | | | | | 2.6 | | | | | |
| Polymer 9 | | | | | | | | | 2.6 | | | | |
| Polymer 10 | | | | | | | | | | 2.6 | | | |
| Polymer 11 | | | | | | | | | | | | 2.6 | 2.6 |
| Polymer 12 | | | | | | | | | | | 2.6 | | |
| FZ-2207 (manufactured by Dow Corning Toray Co., Ltd.) | 0.5 | 0.5 | 0.5 | 0.5 | 0.5 | 0.5 | 0.5 | 0.5 | 0.5 | 0.5 | 0.5 | | |
| Compound 8 (MW8,800/HLB6) | | | | | | | | | | | | 0.5 | |

TABLE 8-9-continued

Composition of the second ink (Unit of upper section: %)

| | Ink No. | | | | | | | | | | | | |
|---|---|---|---|---|---|---|---|---|---|---|---|---|---|
| | 86 | 87 | 88 | 89 | 90 | 91 | 92 | 93 | 94 | 95 | 96 | 97 | 98 |
| Compound 11 (MW8,800/HLB1) | | | | | | | | | | | | | 0.5 |
| Water | 53.9 | 53.9 | 53.9 | 53.9 | 53.9 | 53.9 | 53.9 | 53.9 | 53.9 | 53.9 | 53.9 | 53.9 | 53.9 |
| Content of pigment (% by mass) | 2.8 | 2.8 | 2.8 | 2.8 | 2.8 | 2.8 | 2.8 | 2.8 | 2.8 | 2.8 | 2.8 | 2.8 | 2.8 |
| Content of polymer (% by mass) | 4.0 | 4.0 | 4.0 | 4.0 | 4.0 | 4.0 | 4.0 | 4.0 | 4.0 | 4.0 | 4.0 | 4.0 | 4.0 |
| Polymer/pigment (ratio) | 1.4 | 1.4 | 1.4 | 1.4 | 1.4 | 1.4 | 1.4 | 1.4 | 1.4 | 1.4 | 1.4 | 1.4 | 1.4 |

TABLE 8-10

Composition of the second ink (Unit of upper section: %)

| | Ink No. | | | | | | | | |
|---|---|---|---|---|---|---|---|---|---|
| | 99 | 100 | 101 | 102 | 103 | 104 | 105 | 106 | 107 |
| Glycerin | 5.0 | 5.0 | 5.0 | 5.0 | 5.0 | 5.0 | 5.0 | 5.0 | 5.0 |
| Diethylene glycol | 5.0 | 5.0 | 5.0 | 5.0 | 5.0 | 5.0 | 5.0 | 5.0 | 5.0 |
| Polyethylene glycol (Average molecular weight 1,000) | 5.0 | 5.0 | 5.0 | 5.0 | 5.0 | 5.0 | 5.0 | 5.0 | 5.0 |
| Pigment Dispersion 11 | 28.0 | 28.0 | 28.0 | 28.0 | 28.0 | | | | |
| Pigment Dispersion 13 | | | | | | 28.0 | | | |
| Pigment Dispersion 14 | | | | | | | 28.0 | | |
| Pigment Dispersion 15 | | | | | | | | 28.0 | |
| Pigment Dispersion 16 | | | | | | | | | 28.0 |
| Polymer 11 | 2.6 | 2.6 | 2.6 | 2.6 | 2.6 | | | | |
| Polymer 13 | | | | | | 2.6 | | | |
| Polymer 14 | | | | | | | 2.6 | | |
| Polymer 15 | | | | | | | | 2.6 | |
| Polymer 16 | | | | | | | | | 2.6 |
| FZ-2207(manufactured by Dow Corning Toray Co., Ltd.) (MW29,300/HLB3) | | | | | | 0.5 | 0.5 | 0.5 | 0.5 |
| FZ-2250(manufactured by Dow Corning Toray Co., Ltd.) (MW167,500/HLB1) | 0.5 | | | | | | | | |
| FZ-2208(manufactured by Dow Corning Toray Co., Ltd.) (MW27,500/HLB7) | | 0.5 | | | | | | | |
| Compound 9 (MW49,000/HLB7) | | | 0.5 | | | | | | |
| Compound 10 (MW55,000/HLB6) | | | | 0.5 | | | | | |
| Compound 12 (MW7,800/HLB6) | | | | | 0.5 | | | | |
| Water | 53.9 | 53.9 | 53.9 | 53.9 | 53.9 | 53.9 | 53.9 | 53.9 | 53.9 |
| Content of pigment (% by mass) | 2.8 | 2.8 | 2.8 | 2.8 | 2.8 | 2.8 | 2.8 | 2.8 | 2.8 |
| Content of polymer (% by mass) | 4.0 | 4.0 | 4.0 | 4.0 | 4.0 | 4.0 | 4.0 | 4.0 | 4.0 |
| Polymer/pigment (ratio) | 1.4 | 1.4 | 1.4 | 1.4 | 1.4 | 1.4 | 1.4 | 1.4 | 1.4 |

TABLE 8-11

Composition of the second ink (Unit of upper section: %)

| | Ink No. | | | | | | | | | | | | | |
|---|---|---|---|---|---|---|---|---|---|---|---|---|---|---|
| | 108 | 109 | 110 | 111 | 112 | 113 | 114 | 115 | 116 | 117 | 118 | 119 | 120 | 121 |
| Glycerin | 5.0 | 5.0 | 5.0 | 5.0 | 5.0 | 5.0 | 5.0 | 5.0 | 5.0 | 5.0 | 5.0 | 5.0 | 5.0 | 5.0 |
| Diethylene glycol | 5.0 | 5.0 | 5.0 | 5.0 | 5.0 | 5.0 | 5.0 | 5.0 | 5.0 | 5.0 | 5.0 | 5.0 | 5.0 | 5.0 |
| Polyethylene glycol (Average molecular weight 1,000) | 5.0 | 5.0 | 5.0 | 5.0 | 5.0 | 5.0 | 5.0 | 5.0 | 5.0 | 5.0 | 5.0 | 5.0 | 5.0 | 5.0 |

TABLE 8-11-continued

Composition of the second ink (Unit of upper section: %)

| | Ink No. | | | | | | | | | | | | | |
|---|---|---|---|---|---|---|---|---|---|---|---|---|---|---|
| | 108 | 109 | 110 | 111 | 112 | 113 | 114 | 115 | 116 | 117 | 118 | 119 | 120 | 121 |
| Pigment Dispersion 17 | 28.0 | | | | | | | | | | | | | |
| Pigment Dispersion 18 | | 28.0 | | | | | | | | 28.0 | 28.0 | 28.0 | 30.0 | 30.0 |
| Pigment Dispersion 19 | | | 28.0 | | | | | | | | | | | |
| Pigment Dispersion 20 | | | | 28.0 | | | | | | | | | | |
| Pigment Dispersion 21 | | | | | 28.0 | | | | | | | | | |
| Pigment Dispersion 22 | | | | | | 28.0 | | | | | | | | |
| Pigment Dispersion 23 | | | | | | | 28.0 | | | | | | | |
| Pigment Dispersion 24 | | | | | | | | 28.0 | | | | | | |
| Pigment Dispersion 25 | | | | | | | | | 28.0 | | | | | |
| Polymer 17 | 2.6 | | | | | | | | | | | | | |
| Polymer 18 | | 2.6 | | | | | | | | 1.1 | 1.0 | 2.8 | 1.8 | 2.1 |
| Polymer 19 | | | 2.6 | | | | | | | | | | | |
| Polymer 20 | | | | 2.6 | | | | | | | | | | |
| Polymer 21 | | | | | 2.6 | | | | | | | | | |
| Polymer 22 | | | | | | 2.6 | | | | | | | | |
| Polymer 23 | | | | | | | 2.6 | | | | | | | |
| Polymer 24 | | | | | | | | 2.6 | | | | | | |
| Polymer 25 | | | | | | | | | 2.6 | | | | | |
| FZ-2104(manufactured by Dow Corning Toray Co., Ltd.) (MW20,600/HLB9) | 0.5 | 0.5 | 0.5 | 0.5 | 0.5 | 0.5 | 0.5 | 0.5 | 0.5 | 0.5 | 0.5 | 0.5 | 0.5 | 0.5 |
| Water | 53.9 | 53.9 | 53.9 | 53.9 | 53.9 | 53.9 | 53.9 | 53.9 | 53.9 | 55.4 | 55.5 | 53.7 | 52.7 | 52.4 |
| Content of pigment (% by mass) | 2.8 | 2.8 | 2.8 | 2.8 | 2.8 | 2.8 | 2.8 | 2.8 | 2.8 | 2.8 | 2.8 | 2.8 | 3.0 | 3.0 |
| Content of polymer (% by mass) | 4.0 | 4.0 | 4.0 | 4.0 | 4.0 | 4.0 | 4.0 | 4.0 | 4.0 | 2.5 | 2.4 | 4.2 | 3.3 | 3.6 |
| Polymer/pigment (ratio) | 1.4 | 1.4 | 1.4 | 1.4 | 1.4 | 1.4 | 1.4 | 1.4 | 1.4 | 0.89 | 0.86 | 1.5 | 1.1 | 1.2 |

TABLE 8-12

Composition of the second ink (Unit of upper section: %)

| | Ink No. | | | | | |
|---|---|---|---|---|---|---|
| | 122 | 123 | 124 | 125 | 126 | 127 |
| Glycerin | 5.0 | 5.0 | 5.0 | 5.0 | 5.0 | 5.0 |
| Diethylene glycol | 5.0 | 5.0 | 5.0 | 5.0 | 5.0 | 5.0 |
| Polyethylene glycol (Average molecular weight 1,000) | 5.0 | 5.0 | 5.0 | 5.0 | 5.0 | 5.0 |
| Pigment Dispersion 11 | | | 28.0 | 28.0 | 28.0 | |
| Pigment Dispersion 26 | 28.0 | | | | | |
| Pigment Dispersion 27 | | | | | | 28.0 |
| Pigment Dispersion 28 | | 28.0 | | | | |
| Polymer 11 | | | 2.6 | 2.6 | 2.6 | |
| Polymer 26 | 2.6 | | | | | |
| Polymer 27 | | | | | | 2.6 |
| Polymer 28 | | 2.6 | | | | |
| FZ-2104(manufactured by Dow Corning Toray Co., Ltd.) (MW20,600/HLB9) | 0.5 | 0.5 | | | | 0.5 |
| BYK307(manufactured by BYK Chemie) (MW31,500) | | | 2.9 | | | |
| BYK347(manufactured by BYK Chemie) (MW1,500) | | | | 2.9 | | |
| BYK348(manufactured by BYK Chemie) (MW2,800) | | | | | 2.9 | |
| Water | 53.9 | 53.9 | 51.5 | 51.5 | 51.5 | 53.9 |
| Content of pigment (% by mass) | 2.8 | 2.8 | 2.8 | 2.8 | 2.8 | 2.8 |
| Content of polymer (% by mass) | 4.0 | 4.0 | 4.0 | 4.0 | 4.0 | 4.0 |
| Polymer/pigment (ratio) | 1.4 | 1.4 | 1.4 | 1.4 | 1.4 | 1.4 |

TABLE 8-13

Composition of ink (Unit of upper section: %)

| | Ink No. | | | | | | | | | |
|---|---|---|---|---|---|---|---|---|---|---|
| | 128 | 129 | 130 | 131 | 132 | 133 | 134 | 135 | 136 | 137 |
| Pigment Dispersion 29 | 40.0 | 40.0 | 40.0 | 40.0 | 40.0 | 40.0 | 40.0 | 40.0 | 40.0 | 40.0 |
| Graft polymer 1 | 2.0 | | | | | | | | | |
| Graft polymer 2 | | 2.0 | | | | | | | | |
| Graft polymer 3 | | | 2.0 | | | | | | | |
| Graft polymer 4 | | | | 2.0 | | | | | | |

TABLE 8-13-continued

| Composition of ink | | | | | | | | | | |
|---|---|---|---|---|---|---|---|---|---|---|
| (Unit of upper section: %) | | | | | | | | | | |
| Graft polymer 5 | | | | | 2.0 | | | | | |
| Graft polymer 6 | | | | | | 2.0 | | | | |
| Graft polymer 7 | | | | | | | 2.0 | | | |
| Graft polymer 8 | | | | | | | | 2.0 | | |
| Graft polymer 9 | | | | | | | | | 2.0 | |
| Graft polymer 10 | | | | | | | | | | 2.0 |
| Graft polymer 11 | | | | | | | | | | |
| Graft polymer 12 | | | | | | | | | | |
| Graft polymer 13 | | | | | | | | | | |
| Graft polymer 14 | | | | | | | | | | |
| Graft polymer 15 | | | | | | | | | | |
| Graft polymer 16 | | | | | | | | | | |
| Graft polymer 17 | | | | | | | | | | |
| Graft polymer 18 | | | | | | | | | | |
| Graft polymer 19 | | | | | | | | | | |
| Glycerin | 15.0 | 15.0 | 15.0 | 15.0 | 15.0 | 15.0 | 15.0 | 15.0 | 15.0 | 15.0 |
| Polyethylene glycol (*1) | 5.0 | 5.0 | 5.0 | 5.0 | 5.0 | 5.0 | 5.0 | 5.0 | 5.0 | 5.0 |
| Acetylenol E100 (*2) | 1.0 | 1.0 | 1.0 | 1.0 | 1.0 | 1.0 | 1.0 | 1.0 | 1.0 | 1.0 |
| Ethylene urea | | | | | | | | | | |
| 2-Pyrrolidone | 2.0 | 2.0 | 2.0 | 2.0 | 2.0 | 2.0 | 2.0 | 2.0 | 2.0 | 2.0 |
| N-Methyl-2-pyrrolidone | | | | | | | | | | |
| 1,2-Hexanediol | 2.0 | 2.0 | 2.0 | 2.0 | 2.0 | 2.0 | 2.0 | 2.0 | 2.0 | 2.0 |
| Pure water | 33.0 | 33.0 | 33.0 | 33.0 | 33.0 | 33.0 | 33.0 | 33.0 | 33.0 | 33.0 |
| Content of pigment (%) | 1.0 | 1.0 | 1.0 | 1.0 | 1.0 | 1.0 | 1.0 | 1.0 | 1.0 | 1.0 |
| Content of specific graft polymer (%) | 2.0 | 2.0 | 2.0 | 2.0 | 2.0 | 2.0 | 2.0 | 2.0 | 2.0 | 2.0 |
| Content of specific water-soluble organic compound (%) | 4.0 | 4.0 | 4.0 | 4.0 | 4.0 | 4.0 | 4.0 | 4.0 | 4.0 | 4.0 |
| Content of pigment/Content of specific graft polymer | 0.5 | 0.5 | 0.5 | 0.5 | 0.5 | 0.5 | 0.5 | 0.5 | 0.5 | 0.5 |
| Content of specific water-soluble organic compound/ Content of specific graft polymer | 2.0 | 2.0 | 2.0 | 2.0 | 2.0 | 2.0 | 2.0 | 2.0 | 2.0 | 2.0 |

| | Ink No. | | | | | | | | |
|---|---|---|---|---|---|---|---|---|---|
| | 138 | 139 | 140 | 141 | 142 | 143 | 144 | 145 | 146 |
| Pigment Dispersion 29 | 40.0 | 40.0 | 40.0 | 40.0 | 40.0 | 40.0 | 40.0 | 40.0 | 40.0 |
| Graft polymer 1 | | | | | | | | | |
| Graft polymer 2 | | | | | | | | | |
| Graft polymer 3 | | | | | | | | | |
| Graft polymer 4 | | | | | | | | | |
| Graft polymer 5 | | | | | | | | | |
| Graft polymer 6 | | | | | | | | | |
| Graft polymer 7 | | | | | | | | | |
| Graft polymer 8 | | | | | | | | | |
| Graft polymer 9 | | | | | | | | | |
| Graft polymer 10 | | | | | | | | | |
| Graft polymer 11 | 2.0 | | | | | | | | |
| Graft polymer 12 | | 2.0 | | | | | | | |
| Graft polymer 13 | | | 2.0 | | | | | | |
| Graft polymer 14 | | | | 2.0 | | | | | |
| Graft polymer 15 | | | | | 2.0 | | | | |
| Graft polymer 16 | | | | | | 2.0 | | | |
| Graft polymer 17 | | | | | | | 2.0 | | |
| Graft polymer 18 | | | | | | | | 2.0 | |
| Graft polymer 19 | | | | | | | | | 2.0 |
| Glycerin | 15.0 | 15.0 | 15.0 | 15.0 | 15.0 | 15.0 | 15.0 | 15.0 | 15.0 |
| Polyethylene glycol (*1) | 5.0 | 5.0 | 5.0 | 5.0 | 5.0 | 5.0 | 5.0 | 5.0 | 5.0 |
| Acetylenol E100 (*2) | 1.0 | 1.0 | 1.0 | 1.0 | 1.0 | 1.0 | 1.0 | 1.0 | 1.0 |
| Ethylene urea | | | | | | | | | |
| 2-Pyrrolidone | 2.0 | 2.0 | 2.0 | 2.0 | 2.0 | 2.0 | 2.0 | 2.0 | 2.0 |
| N-Methyl-2-pyrrolidone | | | | | | | | | |
| 1,2-Hexanediol | 2.0 | 2.0 | 2.0 | 2.0 | 2.0 | 2.0 | 2.0 | 2.0 | 2.0 |
| Pure water | 33.0 | 33.0 | 33.0 | 33.0 | 33.0 | 33.0 | 33.0 | 33.0 | 33.0 |
| Content of pigment (%) | 1.0 | 1.0 | 1.0 | 1.0 | 1.0 | 1.0 | 1.0 | 1.0 | 1.0 |
| Content of specific graft polymer (%) | 2.0 | 2.0 | 2.0 | 2.0 | 2.0 | 2.0 | 2.0 | 2.0 | 2.0 |
| Content of specific water-soluble organic compound (%) | 4.0 | 4.0 | 4.0 | 4.0 | 4.0 | 4.0 | 4.0 | 4.0 | 4.0 |
| Content of pigment/Content of specific graft polymer | 0.5 | 0.5 | 0.5 | 0.5 | 0.5 | 0.5 | 0.5 | 0.5 | 0.5 |
| Content of specific water-soluble organic compound/ Content of specific graft polymer | 2.0 | 2.0 | 2.0 | 2.0 | 2.0 | 2.0 | 2.0 | 2.0 | 2.0 |

(*1) Average molecular weight 1000

(*2) Surfactant manufactured by Kawaken Fine Chemicals Co., Ltd.

TABLE 8-14

Composition of ink (Unit of upper section: %)

| | Ink No. | | | | | | | | | | |
|---|---|---|---|---|---|---|---|---|---|---|---|
| | 147 | 148 | 149 | 150 | 151 | 152 | 153 | 154 | 155 | 156 | 157 |
| Pigment Dispersion 29 | 40.0 | 40.0 | 40.0 | 40.0 | 40.0 | 40.0 | 40.0 | 40.0 | 40.0 | 40.0 | 40.0 |
| Pigment Dispersion 30 | | | | | | | | | | | |
| Pigment Dispersion 31 | | | | | | | | | | | |
| Graft polymer 2 | 0.5 | 5.0 | 2.0 | 2.0 | 2.0 | 2.0 | 2.0 | 2.0 | 0.5 | 0.5 | 0.5 |
| Glycerin | 15.0 | 15.0 | 15.0 | 15.0 | 15.0 | 15.0 | 15.0 | 15.0 | 15.0 | 15.0 | 15.0 |
| Polyethylene glycol (*1) | 5.0 | 5.0 | 5.0 | 5.0 | 5.0 | 5.0 | 5.0 | 5.0 | 5.0 | 5.0 | 5.0 |
| Acetylenol E100 (*2) | 1.0 | 1.0 | 1.0 | 1.0 | 1.0 | 1.0 | 1.0 | 1.0 | 1.0 | 1.0 | 1.0 |
| Ethylene urea | | | 4.0 | | | | | | | | |
| 2-Pyrrolidone | 2.0 | 2.0 | | 4.0 | | | | 6.0 | 2.0 | 2.5 | 5.0 |
| N-Methyl-2-pyrrolidone | | | | | 4.0 | | | | | | |
| 1,2-Hexanediol | 2.0 | 2.0 | | | | 4.0 | | 10.0 | | 2.5 | 5.0 |
| Pure water | 34.5 | 30.0 | 33.0 | 33.0 | 33.0 | 33.0 | 37.0 | 21.0 | 36.5 | 33.5 | 28.5 |
| Content of pigment (%) | 1.0 | 1.0 | 1.0 | 1.0 | 1.0 | 1.0 | 1.0 | 1.0 | 1.0 | 1.0 | 1.0 |
| Content of specific graft polymer (%) | 0.5 | 5.0 | 2.0 | 2.0 | 2.0 | 2.0 | 2.0 | 2.0 | 0.5 | 0.5 | 0.5 |
| Content of specific water-soluble organic compound (%) | 4.0 | 4.0 | 4.0 | 4.0 | 4.0 | 4.0 | 0.0 | 16.0 | 2.0 | 5.0 | 10.0 |
| Content of pigment/Content of specific graft polymer | 2.0 | 0.2 | 0.5 | 0.5 | 0.5 | 0.5 | 0.5 | 0.5 | 2.0 | 2.0 | 2.0 |
| Content of specific water-soluble organic compound/Content of specific graft polymer | 8.0 | 0.8 | 2.0 | 2.0 | 2.0 | 2.0 | 0.0 | 8.0 | 4.0 | 10.0 | 20.0 |

| | Ink No. | | | | | | | | | |
|---|---|---|---|---|---|---|---|---|---|---|
| | 158 | 159 | 160 | 161 | 162 | 163 | 164 | 165 | 166 | 167 |
| Pigment Dispersion 29 | 40.0 | 0.0 | | | 40.0 | 40.0 | 40.0 | 40.0 | 40.0 | 40.0 |
| Pigment Dispersion 30 | | | 40.0 | | | | | | | |
| Pigment Dispersion 31 | | | | 40.0 | | | | | | |
| Graft polymer 2 | 0.5 | 3.0 | 2.0 | 2.0 | 0.4 | 10.0 | 2.0 | 2.0 | 0.5 | 3.0 |
| Glycerin | 15.0 | 15.0 | 15.0 | 15.0 | 15.0 | 15.0 | 15.0 | 15.0 | 15.0 | 15.0 |
| Polyethylene glycol (*1) | 5.0 | 5.0 | 5.0 | 5.0 | 5.0 | 5.0 | 5.0 | 5.0 | 5.0 | 5.0 |
| Acetylenol E100 (*2) | 1.0 | 1.0 | 1.0 | 1.0 | 1.0 | 1.0 | 1.0 | 1.0 | 1.0 | 1.0 |
| Ethylene urea | | | | | | | | | | |
| 2-Pyrrolidone | 10.0 | 3.0 | 2.0 | 2.0 | 2.0 | 2.0 | 1.5 | 8.0 | 1.0 | 11.0 |
| N-Methyl-2-pyrrolidone | | | | | | | | | | |
| 1,2-Hexanediol | 10.0 | 3.0 | 2.0 | 2.0 | 2.0 | 2.0 | 1.5 | 8.0 | 0.5 | 11.0 |
| Pure water | 18.5 | 30.0 | 33.0 | 33.0 | 34.6 | 25.0 | 34.0 | 21.0 | 37.0 | 14.0 |
| Content of pigment (%) | 1.0 | 1.0 | 1.0 | 1.0 | 1.0 | 1.0 | 1.0 | 1.0 | 1.0 | 1.0 |
| Content of specific graft polymer (%) | 0.5 | 3.0 | 2.0 | 2.0 | 0.4 | 10.0 | 2.0 | 2.0 | 0.5 | 3.0 |
| Content of specific water-soluble organic compound (%) | 20.0 | 6.0 | 4.0 | 4.0 | 4.0 | 4.0 | 3.0 | 16.0 | 1.5 | 22.0 |
| Content of pigment/Content of specific graft polymer | 2.0 | 0.3 | 0.5 | 0.5 | 2.5 | 0.1 | 0.5 | 0.5 | 2.0 | 0.3 |
| Content of specific water-soluble organic compound/Content of specific graft polymer | 40.0 | 2.0 | 2.0 | 2.0 | 10.0 | 0.4 | 1.5 | 8.0 | 3.0 | 7.3 |

(*1) Average molecular weight 1000
(*2) Surfactant manufactured by Kawaken Fine Chemicals Co., Ltd.

TABLE 8-15

Composition of ink (Unit of upper section: %)

| | Ink No. | | | | | |
|---|---|---|---|---|---|---|
| | 168 | 169 | 170 | 171 | 172 | 173 |
| Pigment Dispersion 29 | 40.0 | 40.0 | 40.0 | 40.0 | | |
| Pigment Dispersion 30 | | | | | 40.0 | |
| Pigment Dispersion 31 | | | | | | 40.0 |
| Graft polymer 20 | 2.0 | | | 2.0 | 2.0 | 2.0 |
| Graft polymer 21 | | 2.0 | | | | |
| Graft polymer 22 | | | 2.0 | | | |
| Graft polymer 23 | | | | 2.0 | | |
| Glycerin | 15.0 | 15.0 | 15.0 | 15.0 | 15.0 | 15.0 |
| Polyethylene glycol (*1) | 5.0 | 5.0 | 5.0 | 5.0 | 5.0 | 5.0 |
| Acetylenol E100 (*2) | 1.0 | 1.0 | 1.0 | 1.0 | 1.0 | 1.0 |
| Ethylene urea | | | | | | |
| 2-Pyrrolidone | 2.0 | 2.0 | 2.0 | 2.0 | 2.0 | 2.0 |
| N-Methyl-2-pyrrolidone | | | | | | |
| 1,2-Hexanediol | 2.0 | 2.0 | 2.0 | 2.0 | 2.0 | 2.0 |
| Pure water | 33.0 | 33.0 | 33.0 | 33.0 | 33.0 | 33.0 |
| Content of pigment (%) | 1.0 | 1.0 | 1.0 | 1.0 | 1.0 | 1.0 |
| Content of specific graft polymer (%) | 0.0 | 0.0 | 0.0 | 0.0 | 0.0 | 0.0 |
| Content of specific water-soluble organic compound (%) | 4.0 | 4.0 | 4.0 | 4.0 | 4.0 | 4.0 |
| Content of pigment/Content of specific graft polymer | — | — | — | — | — | — |
| Content of specific water-soluble organic compound/Content of specific graft polymer | — | — | — | — | — | — |

(*1) Average molecular weight 1000
(*2) Surfactant manufactured by Kawaken Fine Chemicals Co., Ltd.

<Constitution of the Ink Set>

Respective inks obtained above were used in combinations shown in Table 9 to form respective ink sets. Each of the inks which constituted these ink sets was filled in the ink cartridge and the following evaluation was performed. Here in the ink sets of Examples 1 to 90, Comparative Examples 1 to 9 and Reference Examples 1 to 30, inks containing a silicone oil as the second ink are used. In the ink sets of Examples 91 to 130, Comparative Examples 10 to 18 and Reference Examples 31 to 36, inks containing a silicone graft polymer as the second ink are used.

<Evaluation>

(Scratch Resistance of Images of Secondary Color)

The first ink and the second ink constituting the respective ink sets obtained above were set to the PBk ink position and the PC ink position of an ink jet recording apparatus (product name: BJF 900, manufactured by Canon, Inc.). Images of the secondary color were recorded on fine art paper premium mat (manufactured by Canon, Inc.) by 4-pass reciprocal recording at a resolution of 1,200 dpi×1,200 dpi. The images of the secondary color were recorded in a condition of the recording duty of the ink set at the PBk ink position being 50%, the recording duty of the ink set at the PC ink position being 50%, and the total recording duty being 100%. After the obtained recorded samples were left untouched at room temperature for one day, lens-cleaning paper was put on the images and a weight having a surface pressure of 40 g/cm$^2$ was put thereon and the images and the lens-cleaning paper were rubbed with each other. Then, the lens-cleaning paper and the weight were removed and the smudge on the solid image and non-recorded parts were visually observed and the scratch resistance of the images of the secondary color was evaluated. The criterion for evaluation of the scratch resistance of the images of the secondary color was as follows. The results of evaluation are shown in Table 9. The levels of C or higher in the following criterion for evaluation were assumed as acceptable level of the scratch resistance of the images of the secondary color.

A: No smudge on the non-recorded part and no scraping of the solid image

B: Some smudge on the non-recorded part and some scraping of the solid image observed C: Some smudge on the non-recorded part and some scraping of the solid image observed but in acceptable level D: Smudge on the non-recorded part and scraping of the solid image significantly observed (Image Density of Images of the Primary Color Recorded with the First Ink)

The ink corresponding to the first ink constituting the respective ink sets obtained above was filled in an ink cartridge of an ink jet recording apparatus (product name: BJF 900, manufactured by Canon, Inc.) and the ink cartridge was set to the PBk ink position of this ink jet recording apparatus. Images of the primary color were recorded on fine art paper premium mat (manufactured by Canon, Inc.) by 4-pass reciprocal recording at a resolution of 1,200 dpi×1,200 dpi in a condition of the recording duty being 100%. After the obtained recorded samples were left untouched at room temperature for one day, the image density of images was measured with a spectral photometer (product name: Spectrolino, manufactured by GretagMacbeth) and the image density of the images was evaluated. The criterion for evaluation of the image density of images was as follows. The results of evaluation are shown in Table 9. The level A in the following criterion for evaluation was assumed as acceptable level of the image density.

A: Image density of 1.38 or more

B: Image density less than 1.38

(Storage Stability)

Respective inks corresponding to the first ink and the second ink (containing only silicone oil as a modified siloxane compound) constituting the respective ink sets obtained above were respectively put in a container made of Teflon (registered trademark) and store at a temperature of 60° C. for one month. The particle size of the pigment in the ink before and after preservation was measured respectively using a laser zeta electrometer (product name: ELS8000, manufactured by Otsuka Electronics Co., Ltd.) and the storage stability was evaluated. The criterion for evaluation of the storage stability was as follows. The results of evaluation are shown in Table 9. The levels of B or higher in the following criterion for evaluation were assumed as acceptable level of the storage stability.

A: The particle size of the pigment after the preservation was less than 1.1 times of the particle size of the pigment before the preservation.

B: The particle size of the pigment after the preservation was 1.1 times or more of the particle size of the pigment before the preservation but no aggregated pigment occurred in the container.

C: The particle size of the pigment after the preservation was 1.1 times or more of the particle size of the pigment before the preservation, and aggregated pigment occurred in the container.

(Glossiness of the Image of the Primary Color Recorded with Second Ink)

The respective ink corresponding to the second ink (ink containing a silicone graft polymer as a modified siloxane compound) constituting the respective ink sets obtained above was set to the C ink position of an ink jet recording apparatus (product name: BJF 900, manufactured by Canon, Inc.). Images of the primary color were recorded on Mitsubishi photo glossy paper (manufactured by Mitsubishi) by 8-pass reciprocal recording at a resolution of 1,200 dpi×1,200 dpi in a condition of the recording duty being 100%. After the obtained recorded samples were left untouched at room temperature for one day, the glossiness (20° gloss value) in the image area of the obtained recorded sample were measured with a Gardner microhazemeter (manufactured by BYK-Gardner) and the glossiness were evaluated. The criterion for evaluation of the glossiness was as follows. The results of evaluation are shown in Table 9. The level A or higher in the following criterion for evaluation was assumed as acceptable level of the glossiness in the present invention.

AA: 20° gloss value was 40 or more.

A: 20° gloss value was from 35 or more and less than 40.

B: 20° gloss value was from 30 or more and less than 35.

C: 20° gloss value was less than 30.

(Scratch Resistance of the Images of the Primary Color Recorded with the Second Ink)

The respective ink corresponding to the second ink constituting the respective ink sets obtained above was set to the PC ink position of an ink jet recording apparatus (product name: BJF 900, manufactured by Canon, Inc.). Images of the primary color were recorded on Mitsubishi photo glossy paper (manufactured by Mitsubishi) by 8-pass reciprocal recording at a resolution of 1,200 dpi×1,200 dpi in a condition of the recording duty being 100%. After the obtained recorded samples were left untouched at room temperature for one day, the images were scratched with a nail of a person with a strong pressure so that the non-record part of the recording medium was damaged. The recorded samples were visually observed and the scratch resistance of the images of the primary color was evaluated. The criterion for evaluation of the scratch resistance of the images of the primary color was as follows.

The results of evaluation are shown in Table 9. The levels of C or higher in the following criterion for evaluation were assumed as acceptable level of the scratch resistance of the images of the primary color.

AAA: No nail trace was left on the surface of the images.
AA: Little nail trace was left on the surface of the images.
A: Although a little nail trace was left on the surface of the images, no coloring material did fall off from the recording medium.
B: Although some nail trace was left on the surface of the images, no coloring material did fall off from the recording medium.
C: Nail trace was left on the surface of the images, and coloring material slightly fell off from the recording medium.
D: Although the surface of the recording medium was not exposed, coloring material apparently fell off.
E: It was a level without problem as long as the images were gently touched but when the images were scratched with a strong pressure so that the recording medium was damaged, coloring material fell off and the surface of the recording medium was exposed.

(Ejection Properties of the Second Ink: Condition of the Orifice Face, Ejection Stability)

The respective ink corresponding to the second ink constituting the respective ink sets obtained above was set to the C ink position of a modified ink jet recording apparatus (product name: PIXUS 850i, manufactured by Canon, Inc.). An image of 18 cm×24 cm in a condition of the recording duty being 50% were recorded on 3 sheets of office planner (manufactured by Canon, Inc.) in a default mode. At this procedure, cleaning operation of the recording head surface was performed with a wiper blade of PIXUS 850i at a frequency of once per recording on one sheet. Then, the nozzle check pattern of PIXUS 850i was recorded. The condition of the recording head surface at this time was visually observed and the condition of the orifice face was evaluated. The criterion for evaluation of the condition of the orifice face was as follows. The results of evaluation are shown in Table 9. In addition, the nozzle check pattern obtained above was visually observed and the ejection stability was evaluated. The criterion for evaluation of the ejection stability was as follows. The results of evaluation are shown in Table 9. The levels of B or higher in the following criterion for evaluation were assumed as acceptable level of the ejection properties.

[Condition of the Orifice Face]
A: Almost no ink was present around ejection orifices
B: Ink was somewhat present around ejection orifices
C: A belt-like ink films were present around ejection orifices

[Ejection Stability]
A: Recording was normally performable without disruption in the nozzle check pattern.
B: Disruption was somewhat seen in the nozzle check pattern, but there was not non-ejection.
C: Obvious non-ejection and disruption in the nozzle check pattern and normal recording was not performable.

TABLE 9-1

| | | Abrasion resistance of images of secondary color | First ink | | | Second ink | | | |
|---|---|---|---|---|---|---|---|---|---|
| | | | Ink No. | Image density | Storage stability | Ink No. | Abrasion resistance of images | Storage stability | Condition of orifice face | Ejection stability |
| Example | 1 | C | 2 | A | A | 10 | B | A | B | A |
| | 2 | C | 3 | A | A | 11 | C | A | B | A |
| | 3 | B | 4 | A | A | 12 | B | A | B | A |
| | 4 | A | 5 | A | A | 13 | B | A | B | A |
| | 5 | A | 5 | A | A | 14 | B | A | B | A |
| | 6 | A | 5 | A | A | 15 | C | A | B | A |
| | 7 | A | 5 | A | A | 16 | C | A | B | A |
| | 8 | A | 5 | A | A | 17 | B | A | B | B |
| | 9 | A | 5 | A | A | 18 | B | B | B | B |
| | 10 | A | 5 | A | A | 19 | C | A | B | A |
| | 11 | A | 5 | A | A | 20 | B | A | B | A |
| | 12 | A | 5 | A | A | 21 | C | A | B | A |
| | 13 | A | 5 | A | A | 22 | B | A | B | B |
| | 14 | A | 5 | A | A | 23 | C | A | B | A |
| | 15 | A | 5 | A | A | 24 | B | A | B | A |
| | 16 | A | 5 | A | A | 25 | B | A | A | A |
| | 17 | A | 5 | A | A | 26 | C | A | A | A |
| | 18 | A | 5 | A | A | 27 | B | A | A | A |
| | 19 | A | 5 | A | A | 28 | B | A | A | A |
| | 20 | A | 5 | A | A | 29 | C | A | A | A |
| | 21 | A | 5 | A | A | 30 | AAA | A | B | B |
| | 22 | A | 5 | A | A | 31 | B | A | A | A |
| | 23 | A | 5 | A | A | 32 | B | A | A | A |
| | 24 | A | 5 | A | A | 33 | B | A | A | A |
| | 25 | A | 5 | A | A | 34 | B | A | B | A |
| | 26 | A | 5 | A | A | 35 | B | A | B | A |
| | 27 | A | 5 | A | A | 44 | C | A | B | A |
| | 28 | A | 5 | A | A | 45 | C | A | B | A |
| | 29 | A | 5 | A | A | 46 | AAA | A | B | B |
| | 30 | A | 5 | A | A | 47 | AAA | B | B | B |

TABLE 9-2

| | | Abrasion resistance of images of secondary color | First ink | | | Second ink | | | | |
|---|---|---|---|---|---|---|---|---|---|---|
| | | | Ink No. | Image density | Storage stability | Ink No. | Abrasion resistance of images | Storage stability | Ejection characteristics | |
| | | | | | | | | | Condition of orifice face | Ejection stability |
| Example | 31 | A | 5 | A | A | 48 | C | A | B | A |
| | 32 | A | 5 | A | A | 49 | B | A | B | A |
| | 33 | A | 5 | A | A | 50 | B | A | A | A |
| | 34 | A | 5 | A | A | 51 | C | A | A | A |
| | 35 | A | 5 | A | A | 52 | B | A | B | B |
| | 36 | A | 5 | A | A | 53 | C | A | B | A |
| | 37 | A | 5 | A | A | 54 | B | A | B | A |
| | 38 | A | 5 | A | A | 55 | C | A | A | A |
| | 39 | A | 5 | A | A | 56 | C | A | A | A |
| | 40 | A | 5 | A | A | 57 | C | A | A | A |
| | 41 | A | 5 | A | A | 58 | B | A | A | A |
| | 42 | A | 5 | A | A | 59 | C | A | A | A |
| | 43 | A | 5 | A | A | 60 | B | A | B | B |
| | 44 | A | 5 | A | A | 61 | B | A | A | A |
| | 45 | A | 5 | A | A | 62 | B | A | A | A |
| | 46 | A | 5 | A | A | 63 | B | A | A | A |
| | 47 | A | 5 | A | A | 64 | B | A | B | A |
| | 48 | A | 5 | A | A | 65 | B | A | B | A |
| | 49 | A | 5 | A | A | 73 | B | B | B | A |
| | 50 | A | 5 | A | A | 74 | AAA | A | B | A |
| | 51 | A | 5 | A | A | 75 | C | A | B | A |
| | 52 | A | 5 | A | A | 76 | B | A | B | A |
| | 53 | A | 5 | A | A | 77 | C | A | B | A |
| | 54 | A | 5 | A | A | 78 | B | A | B | B |
| | 55 | A | 5 | A | A | 79 | B | B | B | B |
| | 56 | A | 5 | A | A | 80 | C | A | B | A |
| | 57 | A | 5 | A | A | 81 | B | A | A | A |
| | 58 | A | 5 | A | A | 82 | C | A | A | A |
| | 59 | A | 5 | A | A | 83 | C | A | B | B |
| | 60 | A | 5 | A | A | 84 | C | A | B | A |

TABLE 9-3

| | | Abrasion resistance of images of secondary color | First ink | | | Second ink | | | | |
|---|---|---|---|---|---|---|---|---|---|---|
| | | | Ink No. | Image density | Storage stability | Ink No. | Abrasion resistance of images | Storage stability | Ejection characteristics | |
| | | | | | | | | | Condition of orifice face | Ejection stability |
| Example | 61 | A | 5 | A | A | 85 | C | A | B | A |
| | 62 | A | 5 | A | A | 86 | B | A | A | A |
| | 63 | A | 5 | A | A | 87 | C | A | A | A |
| | 64 | A | 5 | A | A | 88 | B | A | A | A |
| | 65 | A | 5 | A | A | 89 | B | A | A | A |
| | 66 | A | 5 | A | A | 90 | C | A | A | A |
| | 67 | A | 5 | A | A | 91 | AAA | A | B | B |
| | 68 | A | 5 | A | A | 92 | B | A | A | A |
| | 69 | A | 5 | A | A | 93 | B | A | A | A |
| | 70 | A | 5 | A | A | 94 | B | A | A | A |
| | 71 | A | 5 | A | A | 95 | AAA | A | B | A |
| | 72 | A | 5 | A | A | 96 | AAA | A | B | A |
| | 73 | A | 5 | A | A | 97 | C | A | B | A |
| | 74 | A | 5 | A | A | 98 | C | B | B | A |
| | 75 | A | 5 | A | A | 108 | C | A | A | A |
| | 76 | A | 5 | A | A | 109 | B | A | B | A |
| | 77 | A | 5 | A | A | 110 | C | A | A | A |
| | 78 | A | 5 | A | A | 111 | C | A | A | A |
| | 79 | A | 5 | A | A | 112 | B | A | B | A |
| | 80 | A | 5 | A | A | 113 | C | A | B | A |
| | 81 | A | 5 | A | A | 114 | C | A | A | A |
| | 82 | A | 5 | A | A | 115 | C | A | B | A |
| | 83 | A | 5 | A | A | 116 | C | A | B | A |
| | 84 | A | 5 | A | A | 117 | C | A | A | A |
| | 85 | A | 5 | A | A | 118 | C | A | A | A |
| | 86 | A | 5 | A | A | 119 | B | A | B | B |

TABLE 9-3-continued

| | | Results of evaluation | | | | | | | |
|---|---|---|---|---|---|---|---|---|---|
| | Abrasion | | First ink | | | Second ink | | | |
| | resistance of | | | | | Abrasion | | Ejection characteristics | |
| | images of secondary color | Ink No. | Image density | Storage stability | Ink No. | resistance of images | Storage stability | Condition of orifice face | Ejection stability |
| | 87 | A | 5 | A | A | 120 | C | A | A | A |
| | 88 | A | 5 | A | A | 121 | C | A | A | A |
| | 89 | A | 7 | A | A | 10 | B | A | B | A |
| | 90 | A | 8 | A | A | 11 | C | A | B | A |

TABLE 9-4

| | | Results of evaluation | | | | | | | | |
|---|---|---|---|---|---|---|---|---|---|---|
| | | Abrasion | | First ink | | | Second ink | | | |
| | | resistance of | | | | | Abrasion | | Ejection characteristics | |
| | | images of secondary color | Ink No. | Image density | Storage stability | Ink No. | resistance of images | Glossiness | Condition of orifice face | Ejection stability |
| Example | 91 | C | 2 | A | A | 128 | AA | AA | A | A |
| | 92 | C | 3 | A | A | 129 | AA | AA | A | A |
| | 93 | B | 4 | A | A | 130 | AA | AA | B | B |
| | 94 | A | 5 | A | A | 131 | A | A | A | A |
| | 95 | A | 5 | A | A | 132 | A | A | A | A |
| | 96 | A | 5 | A | A | 133 | AAA | A | A | A |
| | 97 | A | 5 | A | A | 134 | AA | AA | B | A |
| | 98 | A | 5 | A | A | 135 | A | AA | A | A |
| | 99 | A | 5 | A | A | 136 | AAA | A | B | A |
| | 100 | A | 5 | A | A | 137 | AA | AA | B | A |
| | 101 | A | 5 | A | A | 138 | C | AA | B | A |
| | 102 | A | 5 | A | A | 139 | C | A | A | A |
| | 103 | A | 5 | A | A | 140 | C | A | B | B |
| | 104 | A | 5 | A | A | 141 | C | A | B | A |
| | 105 | A | 5 | A | A | 142 | C | A | A | A |
| | 106 | A | 5 | A | A | 143 | A | A | A | A |
| | 107 | A | 5 | A | A | 144 | C | AA | A | A |
| | 108 | A | 5 | A | A | 145 | B | A | B | B |
| | 109 | A | 5 | A | A | 146 | C | A | B | B |
| | 110 | A | 5 | A | A | 147 | A | A | A | A |
| | 111 | A | 5 | A | A | 148 | C | A | B | A |
| | 112 | A | 5 | A | A | 149 | A | A | A | A |
| | 113 | A | 5 | A | A | 150 | A | A | A | A |
| | 114 | A | 5 | A | A | 151 | A | A | A | A |
| | 115 | A | 5 | A | A | 152 | A | A | A | A |
| | 116 | A | 5 | A | A | 153 | C | A | B | A |
| | 117 | A | 5 | A | A | 154 | AA | AA | B | A |
| | 118 | A | 5 | A | A | 155 | B | A | B | A |
| | 119 | A | 5 | A | A | 156 | AA | A | B | A |
| | 120 | A | 5 | A | A | 157 | B | A | B | B |
| | 121 | A | 5 | A | A | 158 | C | A | B | B |
| | 122 | A | 5 | A | A | 159 | A | A | A | A |
| | 123 | A | 5 | A | A | 160 | A | A | A | A |
| | 124 | A | 5 | A | A | 161 | A | A | A | A |
| | 125 | A | 5 | A | A | 162 | C | A | A | A |
| | 126 | A | 5 | A | A | 163 | C | A | B | A |
| | 127 | A | 5 | A | A | 164 | B | A | A | A |
| | 128 | A | 5 | A | A | 165 | A | A | A | A |
| | 129 | A | 5 | A | A | 166 | C | A | A | A |
| | 130 | A | 5 | A | A | 167 | A | A | B | B |

TABLE 9-5

Results of evaluation

| | | Abrasion resistance of images of secondary color | First ink | | | Second ink | | | |
|---|---|---|---|---|---|---|---|---|---|
| | | | | | | | | Ejection characteristics | |
| | | | Ink No. | Image density | Storage stability | Ink No. | Abrasion resistance of images | Storage stability | Condition of orifice face | Ejection stability |
| Comparative Example | 1 | D | 1 | A | A | 10 | B | A | B | A |
| | 2 | A | 6 | A | B | 11 | C | A | B | A |
| | 3 | A | 9 | B | A | 12 | B | A | B | A |
| | 4 | D | 1 | A | A | 13 | B | A | B | A |
| | 5 | A | 6 | A | B | 14 | B | A | B | A |
| | 6 | A | 9 | B | A | 15 | C | A | B | A |
| | 7 | D | 1 | A | A | 16 | C | A | B | A |
| | 8 | A | 6 | A | B | 17 | B | A | B | B |
| | 9 | A | 9 | B | A | 18 | B | B | B | B |

TABLE 9-6

Results of evaluation

| | | Abrasion resistance of images of secondary color | First ink | | | Second ink | | | | |
|---|---|---|---|---|---|---|---|---|---|---|
| | | | Ink No. | Image density | Storage stability | Ink No. | Abrasion resistance of images | Glossiness | Condition of orifice face | Ejection stability |
| Comparative Example | 10 | D | 1 | A | A | 128 | AA | AA | A | A |
| | 11 | A | 6 | A | B | 129 | AA | AA | A | A |
| | 12 | A | 9 | B | A | 130 | AA | AA | B | B |
| | 13 | D | 1 | A | A | 131 | A | A | A | A |
| | 14 | A | 6 | A | B | 132 | A | A | A | A |
| | 15 | A | 9 | B | A | 133 | AAA | A | B | A |
| | 16 | D | 1 | A | A | 134 | AA | AA | B | A |
| | 17 | A | 6 | A | B | 135 | A | AA | A | A |
| | 18 | A | 9 | B | A | 136 | AAA | A | B | A |

TABLE 9-7

Results of evaluation

| | | Abrasion resistance of images of secondary color | First ink | | | Second ink | | | | |
|---|---|---|---|---|---|---|---|---|---|---|
| | | | Ink No. | Image density | Storage stability | Ink No. | Abrasion resistance of images | Storage stability | Condition of orifice face | Ejection stability |
| Reference Example | 1 | A | 5 | A | A | 36 | E | A | B | A |
| | 2 | A | 5 | A | A | 37 | E | A | B | A |
| | 3 | A | 5 | A | A | 38 | E | A | B | A |
| | 4 | A | 5 | A | A | 39 | D | A | B | A |
| | 5 | A | 5 | A | A | 40 | D | A | A | A |
| | 6 | A | 5 | A | A | 41 | D | A | A | A |
| | 7 | A | 5 | A | A | 42 | AAA | A | C | C |
| | 8 | A | 5 | A | A | 43 | C | C | C | B |
| | 9 | A | 5 | A | A | 66 | E | A | B | A |
| | 10 | A | 5 | A | A | 67 | D | A | B | A |
| | 11 | A | 5 | A | A | 68 | D | A | B | B |
| | 12 | A | 5 | A | A | 69 | D | A | A | A |
| | 13 | A | 5 | A | A | 70 | D | A | A | A |
| | 14 | A | 5 | A | A | 71 | B | A | C | C |
| | 15 | A | 5 | A | A | 72 | B | C | C | B |
| | 16 | A | 5 | A | A | 99 | D | A | B | A |
| | 17 | A | 5 | A | A | 100 | D | A | B | A |
| | 18 | A | 5 | A | A | 101 | D | A | B | A |
| | 19 | A | 5 | A | A | 102 | D | A | B | A |
| | 20 | A | 5 | A | A | 103 | D | A | B | A |
| | 21 | A | 5 | A | A | 104 | D | A | A | A |
| | 22 | A | 5 | A | A | 105 | D | A | A | A |
| | 23 | A | 5 | A | A | 106 | AAA | A | C | C |
| | 24 | A | 5 | A | A | 107 | C | C | C | B |

TABLE 9-7-continued

Results of evaluation

| | | Abrasion resistance of images of secondary color | First ink | | | Second ink | | | |
|---|---|---|---|---|---|---|---|---|---|
| | | | Ink No. | Image density | Storage stability | Ink No. | Abrasion resistance of images | Storage stability | Ejection characteristics | |
| | | | | | | | | | Condition of orifice face | Ejection stability |
| | 25 | A | 5 | A | A | 122 | D | A | A | A |
| | 26 | A | 5 | A | A | 123 | D | A | A | A |
| | 27 | A | 5 | A | A | 124 | E | A | B | A |
| | 28 | A | 5 | A | A | 125 | E | A | B | A |
| | 29 | A | 5 | A | A | 126 | E | A | B | A |
| | 30 | A | 5 | A | A | 127 | B | A | C | C |

TABLE 9-8

Results at evaluation

| | | Abrasion resistance of images of secondary color | First ink | | | Second ink | | | |
|---|---|---|---|---|---|---|---|---|---|
| | | | Ink No. | Image density | Storage stability | Ink No. | Abrasion resistance of images | Glossiness | Ejection characteristics | |
| | | | | | | | | | Condition of orifice face | Ejection stability |
| Reference | 31 | A | 5 | A | A | 168 | D | A | A | A |
| Example | 32 | A | 5 | A | A | 169 | D | A | A | A |
| | 33 | A | 5 | A | A | 170 | A | C | B | A |
| | 34 | A | 5 | A | A | 171 | E | A | A | A |
| | 35 | A | 5 | A | A | 172 | D | B | A | A |
| | 36 | A | 5 | A | A | 173 | D | B | A | A |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-205649, filed Aug. 8, 2008, which is hereby incorporated by reference herein in its entirety.

What is claimed is:

1. An ink set to be used for ink jet recording, the ink set comprising plural inks having a first ink and a second ink independently,
wherein (i) the first ink comprises a pigment having functional groups on a surface of pigment particles and a compound having adsorptivity to the pigment, (ii) the functional group density on the surface of the pigment particles is 1.5 μmol/m² or more and less than 2.6 μmol/m², and (iii) the second ink comprises a modified siloxane compound and a pigment dispersed by a polymer, and
wherein the first ink does not contain any kind of modified siloxane compounds.

2. The ink set according to claim 1, wherein the compound having adsorptivity to the pigment is a surfactant.

3. The ink set according to claim 2, wherein an adsorptivity of the surfactant to the pigment having functional groups on the surface of the pigment particles is stronger than an adsorptivity of the modified siloxane compound to the pigment having functional groups on the surface of the pigment particles.

4. The ink set according to claim 1, wherein the modified siloxane compound is at least one kind of silicone oil selected from a group consisting of a silicone oil represented by the following Formula (1), a silicone oil represented by the following Formula (2), and a silicone oil represented by the following Formula (3), and
wherein the second ink further comprises a polymer which is at least one polymer selected from Polymer group A: polymers having an acid value of 90 mgKOH/g or more and 150 mgKOH/g or less and a hydrogen bond parameter (δh) obtained by solubility parameters of monomers constituting the polymer of 1.0 cal$^{0.5}$/cm$^{1.5}$ or more and 3.7 cal$^{0.5}$/cm$^{1.5}$ or less; and Polymer group B: polymers having an acid value of more than 150 mgKOH/g and 200 mgKOH/g or less and a hydrogen bond parameter (δh) obtained by solubility parameters of monomers constituting the polymer of 1.0 cal$^{0.5}$/cm$^{1.5}$ or more and 1.5 cal$^{0.5}$/cm$^{1.5}$ or less:

Formula (1)

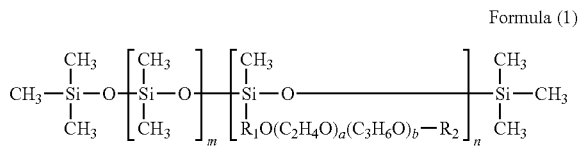

wherein the silicone oil represented by Formula (1) has a weight average molecular weight of 8,000 or more and 30,000 or less and $R_1$ is an alkylene group having 1 or more and 20 or less carbon atom(s), $R_2$ is a hydrogen atom or an alkyl group having 1 or more and 20 or less carbon atom(s), m is 1 or more and 250 or less, n is 1 or more and 100 or less, a is 1 or more and 100 or less, and b is 0 or more and 100 or less;

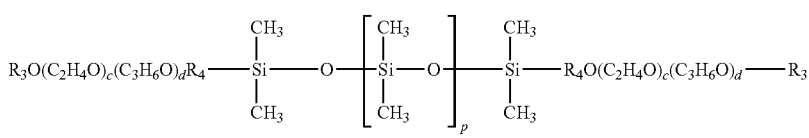

Formula (2)

wherein the silicone oil represented by Formula (2) has a weight average molecular weight of 8,000 or more and less than 50,000 and $R_3$'s are each independently a hydrogen atom or an alkyl group having 1 or more and 20 or less carbon atom(s), $R_4$'s are each independently an alkylene group having 1 or more and 20 or less carbon atom(s), p is 1 or more and 450 or less, c is 1 or more and 250 or less, and d is 0 or more and 100 or less;

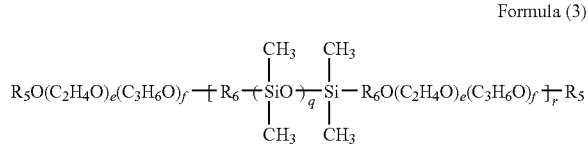

Formula (3)

wherein the silicone oil represented by Formula (3) has a weight average molecular weight of 8,000 or more and less than 50,000 and an HLB of 1 or more and less than 7 and $R_5$'s are each independently a hydrogen atom or an alkyl group having 1 or more and 20 or less carbon atom(s), $R_6$'s are each independently an alkylene group having 1 or more and 20 or less carbon atom(s), q is 1 or more and 100 or less, r is 1 or more and 100 or less, e is 1 or more and 100 or less, and f is 0 or more and 100 or less.

5. The ink set according to claim 1, wherein the modified siloxane compound is a graft polymer which includes at least a nonionic unit represented by the following General formula (I) and a unit having a polysiloxane structure:

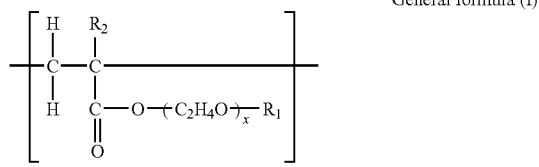

General formula (I)

wherein in General formula (I), $R_1$ and $R_2$ are each independently a hydrogen atom or a methyl group and x is 1 or 2.

6. An ink jet recording method for performing recording on a recording medium by ejecting plural inks respectively from a recording head, wherein the plural inks contain a combination of the first ink and the second ink constituting the ink set according to claim 1.

7. An ink jet recording apparatus for performing recording on a recording medium by ejecting plural inks contained in an ink cartridge respectively from a recording head, wherein the plural inks contain a combination of the first ink and the second ink constituting the ink set according to claim 1.

8. The ink set according to claim 1, wherein the ratio of the content (mass percent) of the compound having adsorptivity to the pigment to the content (mass percent) of the pigment in the first ink is equal to or less than 0.05.

9. The ink set according to claim 1, wherein a scratch resistance of an image recorded with both the first ink and the second ink is higher than it would be if the first ink did not contain the compound having adsorptivity to the pigment.

10. The ink set according to claim 1, wherein the compound having adsorptivity to the pigment is at least one selected from the group consisting of a surfactant, a preservative, an anti-mold agent, and a water-soluble polymer having a hydrophobic unit.

11. The ink set according to claim 1, wherein the compound having adsorptivity to the pigment is at least one selected from the group consisting of an anionic surfactant and a nonionic surfactant.

12. The ink set according to claim 1, wherein the compound having adsorptivity to the pigment is a nonionic surfactant.

\* \* \* \* \*